US008272460B2

(12) United States Patent
Song et al.

(10) Patent No.: US 8,272,460 B2
(45) Date of Patent: Sep. 25, 2012

(54) TWO-WHEELED VEHICLE

(75) Inventors: Michael M. Song, Maple Grove, MN (US); Scott A. Orpen, Spirit Lake, IA (US); Daniel L. Burt, II, North Branch, MN (US); Mark W. Chevalier, Andover, MN (US); James Arthur John Holroyd, Stillwater, MN (US)

(73) Assignee: Polaris Industries Inc., Medina, MN (US)

( * ) Notice: Subject to any disclaimer, the term of this patent is extended or adjusted under 35 U.S.C. 154(b) by 398 days.

(21) Appl. No.: 12/478,682

(22) Filed: Jun. 4, 2009

(65) Prior Publication Data

US 2010/0307853 A1 Dec. 9, 2010

(51) Int. Cl.
*B60K 17/30* (2006.01)
(52) U.S. Cl. ..... 180/6.24; 180/219; 180/227; 280/304.3; 280/304.5; 280/160.1
(58) Field of Classification Search .......... 180/219, 180/227, 90.6; 29/428; 280/291, 304.3, 280/304.5, 160.1, 384; 297/423.25; 296/75, 296/78.1; 362/475, 476, 523
See application file for complete search history.

(56) References Cited

U.S. PATENT DOCUMENTS

| | | | |
|---|---|---|---|
| 2,755,873 A | 7/1956 | Klaue | |
| 3,866,946 A | 2/1975 | Robison | |
| 3,935,445 A | 1/1976 | Preisler | |
| D242,031 S | 10/1976 | Hartlaub | |
| 4,260,170 A | 4/1981 | Terai et al. | |
| 4,580,706 A | 4/1986 | Jackson et al. | |
| 4,615,556 A | 10/1986 | Stahel | |
| 4,624,470 A | 11/1986 | Love | |
| 4,793,293 A | 12/1988 | Minami | |
| 4,887,687 A | 12/1989 | Asai et al. | |
| 5,025,883 A | 6/1991 | Morinaka et al. | |
| 5,107,949 A | 4/1992 | Gotoh et al. | |
| D361,311 S | 8/1995 | Lindby | |
| 5,608,957 A | 3/1997 | Hanagan | |
| 5,839,536 A | 11/1998 | Tanaka | |
| 6,007,150 A | 12/1999 | Clerkin et al. | |
| 6,068,075 A | 5/2000 | Saiki | |
| 6,203,093 B1 * | 3/2001 | Suzuki et al. | 296/78.1 |
| D442,892 S | 5/2001 | Timmermann | |
| 6,223,960 B1 | 5/2001 | Powell et al. | |
| 6,224,081 B1 | 5/2001 | Wayman et al. | |
| 6,234,266 B1 | 5/2001 | Saiki | |
| 6,276,482 B1 | 8/2001 | Moriya et al. | |
| D447,985 S | 9/2001 | Ino et al. | |
| 6,394,214 B1 * | 5/2002 | Hahm | 180/230 |
| 6,419,039 B1 | 7/2002 | Wagner | |
| 6,481,522 B1 | 11/2002 | Adachi | |

(Continued)

OTHER PUBLICATIONS

Polaris Sales Inc., Victory 2004 Accelerating the Art of the American Cruiser brochure, 2003, pp. 1-36, Medina, Minnesota, USA.

(Continued)

*Primary Examiner* — Paul N Dickson
*Assistant Examiner* — Jacob Knutson
(74) *Attorney, Agent, or Firm* — Faegre Baker Daniels

(57) ABSTRACT

A two-wheeled vehicle is disclosed. The two-wheeled vehicle may include highway bars. The two-wheeled vehicle may include a steering axis which is tilted relative to a fork axis. The two-wheeled vehicle may be configured in a faring configuration and in a non-fairing configuration.

19 Claims, 44 Drawing Sheets

U.S. PATENT DOCUMENTS

| | | | |
|---|---|---|---|
| 6,484,855 | B1 * | 11/2002 | Yaple .......................... 192/13 R |
| D470,097 | S | 2/2003 | Song |
| 6,619,415 | B1 | 9/2003 | Hasumi et al. |
| D484,074 | S | 12/2003 | Henneberry |
| 6,655,740 | B1 | 12/2003 | Hanagan |
| 6,796,030 | B2 | 9/2004 | Mochizuki et al. |
| 6,832,710 | B2 | 12/2004 | Galbraith et al. |
| 6,896,279 | B2 | 5/2005 | Galvagno |
| 6,951,417 | B2 | 10/2005 | Ito et al. |
| 6,969,083 | B2 * | 11/2005 | Egan ............................ 280/291 |
| D513,719 | S | 1/2006 | Egan |
| 6,991,290 | B1 | 1/2006 | Wiertzema |
| 7,207,470 | B2 | 4/2007 | Akita et al. |
| 7,278,560 | B2 | 10/2007 | Aron |
| 7,311,232 | B2 | 12/2007 | Watanabe et al. |
| D567,715 | S | 4/2008 | Brew et al. |
| 7,360,963 | B1 | 4/2008 | Burns |
| D574,299 | S | 8/2008 | Kouchi et al. |
| D576,921 | S | 9/2008 | Tong |
| 7,537,281 | B2 | 5/2009 | Riondato |
| 7,543,673 | B2 | 6/2009 | Lachapelle et al. |
| D597,891 | S | 8/2009 | Andoh |
| D624,853 | S | 10/2010 | Song et al. |
| 2004/0164113 | A1 | 8/2004 | Thomas et al. |
| 2004/0206566 | A1 * | 10/2004 | Katsura ........................ 180/219 |
| 2005/0150703 | A1 * | 7/2005 | Nakagome et al. ........... 180/219 |
| 2005/0150921 | A1 | 7/2005 | Schneider |
| 2005/0174787 | A1 | 8/2005 | Uemoto et al. |
| 2007/0018420 | A1 | 1/2007 | Hoshi |
| 2007/0057484 | A1 | 3/2007 | Gilman |
| 2007/0151789 | A1 | 7/2007 | Bracy et al. |
| 2008/0093146 | A1 * | 4/2008 | Kobayashi .................... 180/219 |
| 2008/0169134 | A1 | 7/2008 | Tomolillo et al. |
| 2008/0169149 | A1 | 7/2008 | Holroyd et al. |
| 2008/0173122 | A1 | 7/2008 | Bagnariol |
| 2008/0203782 | A1 | 8/2008 | Bigolin |
| 2008/0246250 | A1 * | 10/2008 | LaCour ...................... 280/288.4 |
| 2010/0012695 | A1 | 1/2010 | Demilio |
| 2010/0025140 | A1 | 2/2010 | Takenaka et al. |
| 2010/0025443 | A1 | 2/2010 | Racz et al. |

OTHER PUBLICATIONS

Polaris Sales Inc., Victory Motorcycles 2005 the New American Motorcycle brochure, 2004, pp. 1-22, Medina, Minnesota, USA.

Polaris Sales Inc., Victory 2006 brochure, 2005, pp. 1-28, Medina, Minnesota, USA.

Polaris Sales, Inc., Victory the New American Motorcycle 2007 brochure, 2006, pp. 1-15, Medina, Minnesota, USA.

Polaris Sales Inc., Victory the New American Motorcycle 2008 brochure, 2007, pp. 1-14, Medina, Minnesota, USA.

Polaris Sales Inc., Celebrating 10 Years of Victory the New American Motorcycle 2009 brochure, 2008, pp. 1-16, Medina, Minnesota, USA.

Victory Motorcycle 2005 Models, retrieved from http://www.bikernet.com/news/PageViewer.asp?PageID=246>, Oct. 15, 2009, 20 pages.

Harley-Davidson, Genuine Motor Accessories, Adjustable Highway Peg Mounting Kit—360 Degrees webpage, 1 page.

Harley-Davidson, FLHR Road King, 2008, 1 page.

Harley-Davidson,, FLHX Street Glide, 2008, 1 page.

Harley-Davidson, FLH, 1 page.

Harley-Davidson, Genuine Motor Accessories, Adjustable Highway Peg Mounting Kit—Long Offset webpage, 1 page.

Harley-Davidson, Genuine Motor Accessories, Adjustable Highway Peg Mounting Kit—Short Offset webpage, 1 page.

Harley-Davidson, Genuine Motor Accessories, Adjustable Highway Peg Mounting Kit—Short Angled webpage, 1 page.

Harley-Davidson, Genuine Motor Accessories, Adjustable Highway Peg Mounting Kit—Long Angled webpage, 1 page.

* cited by examiner

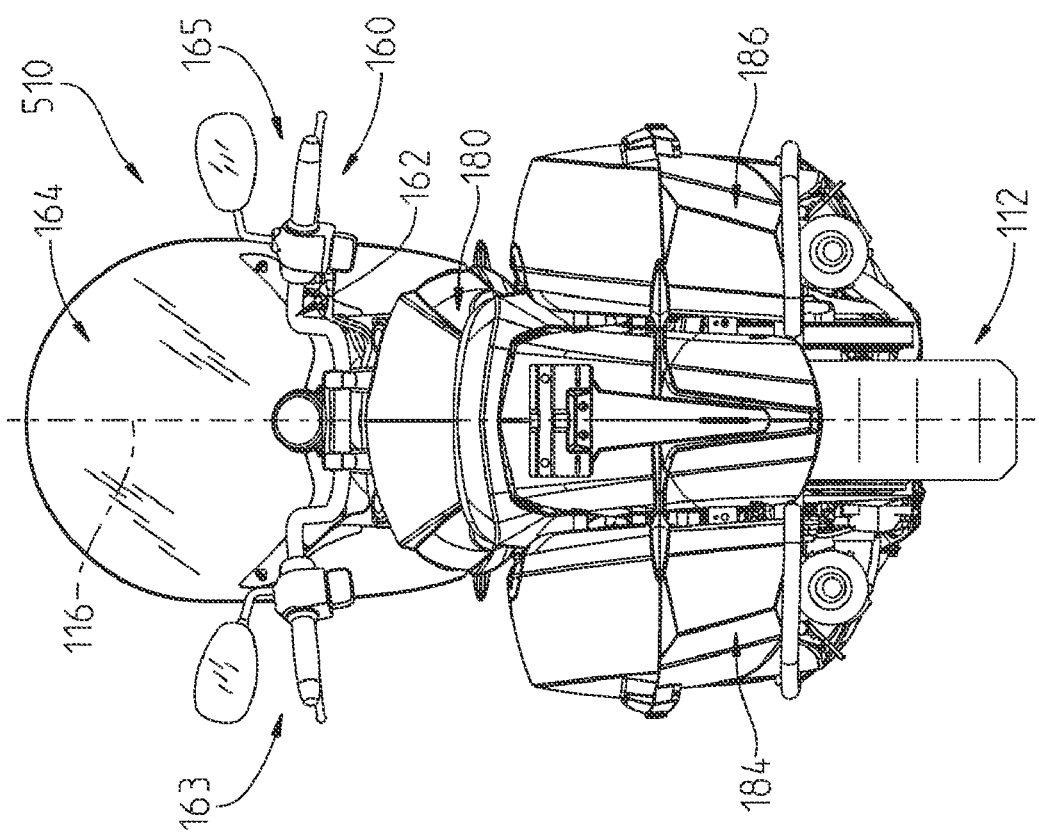
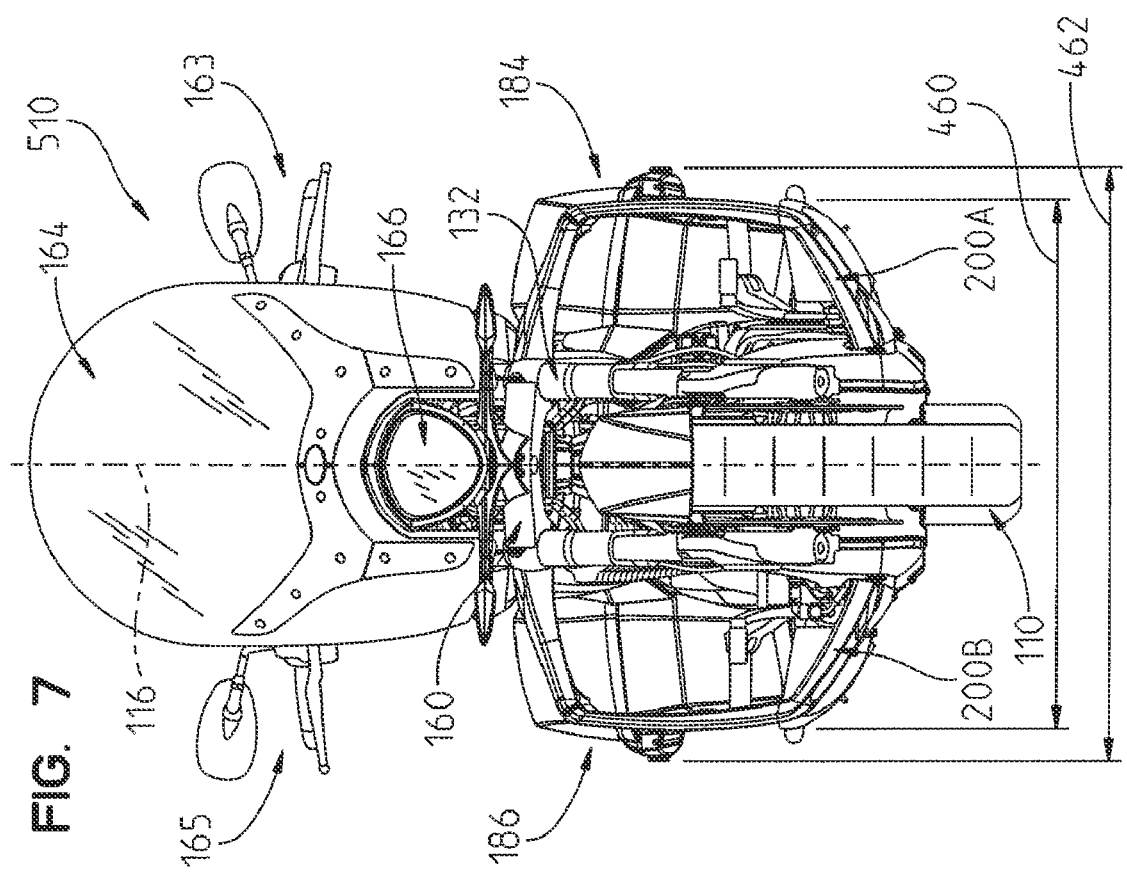

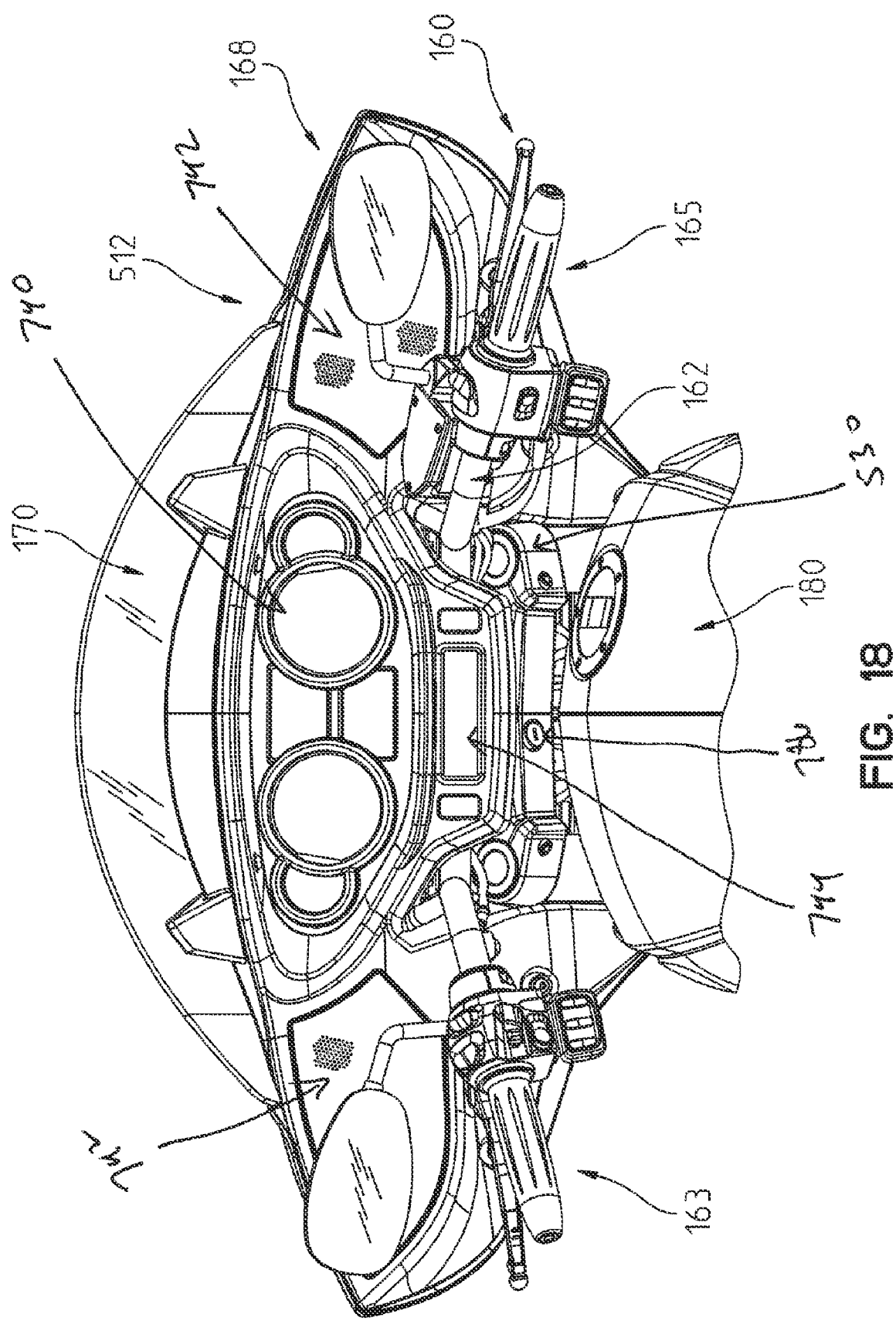

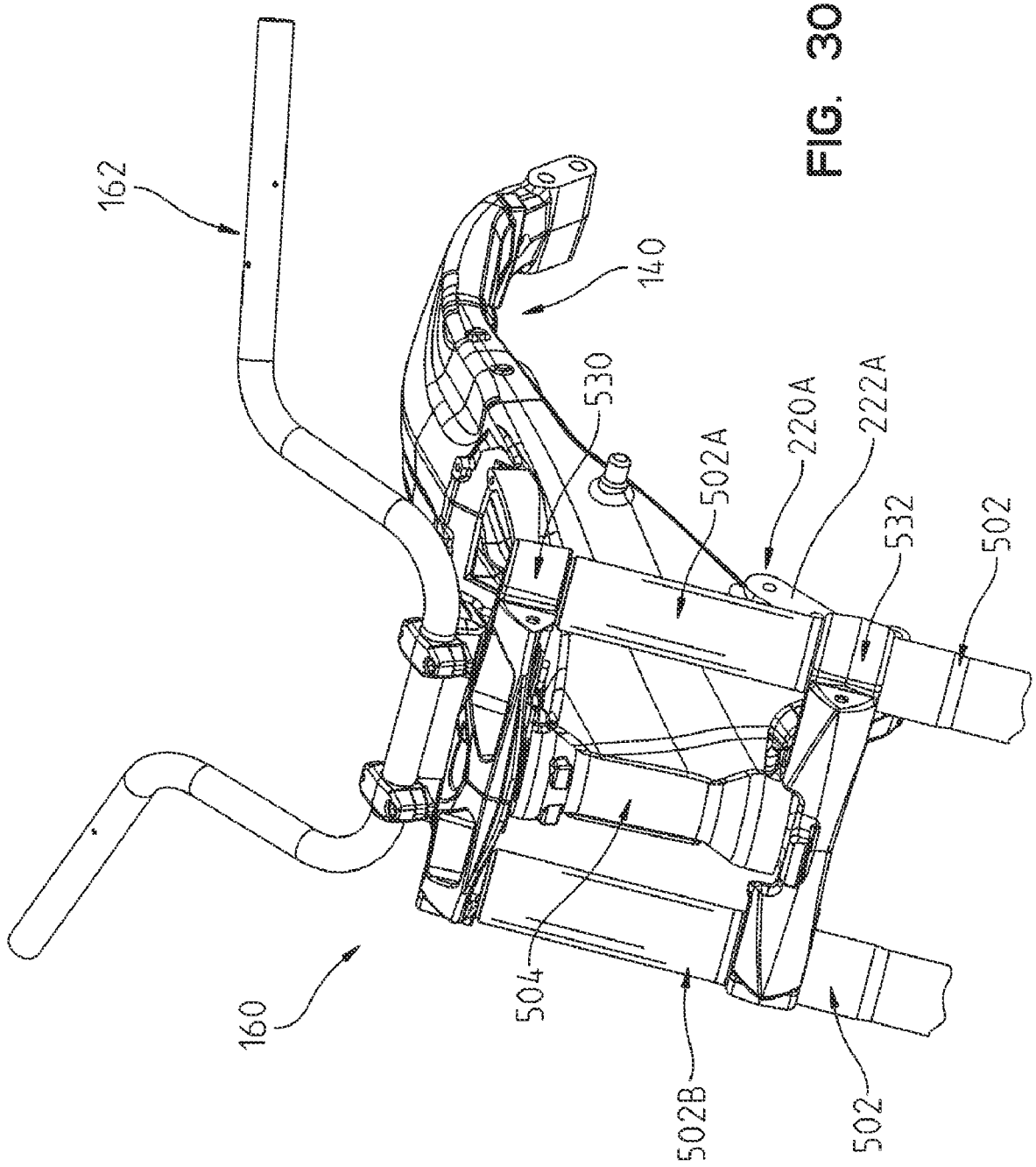

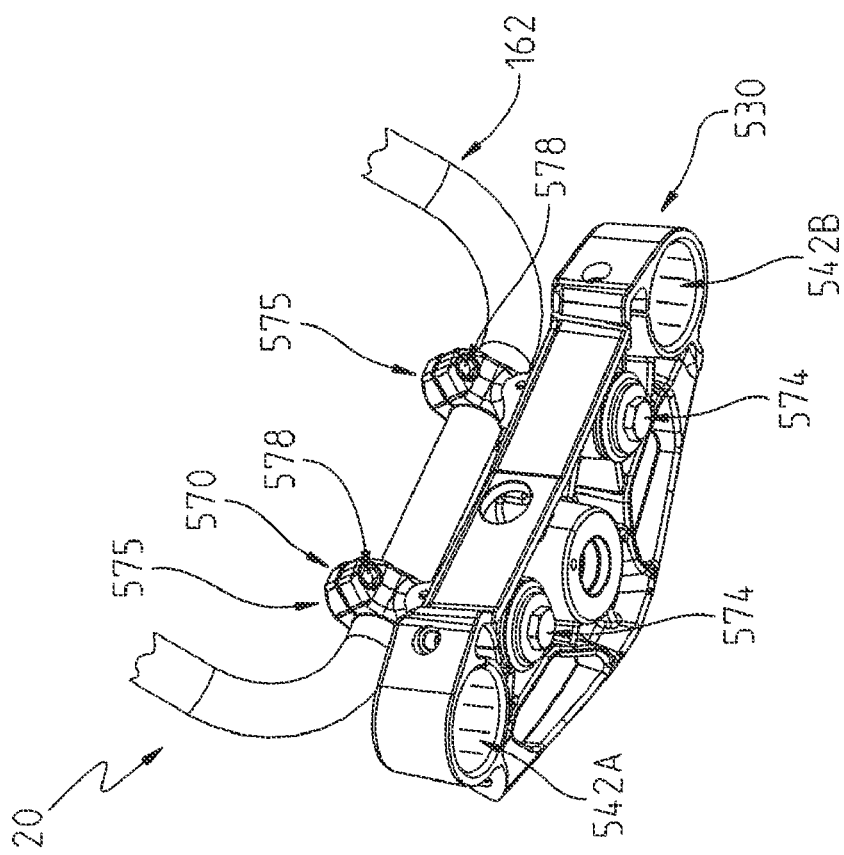
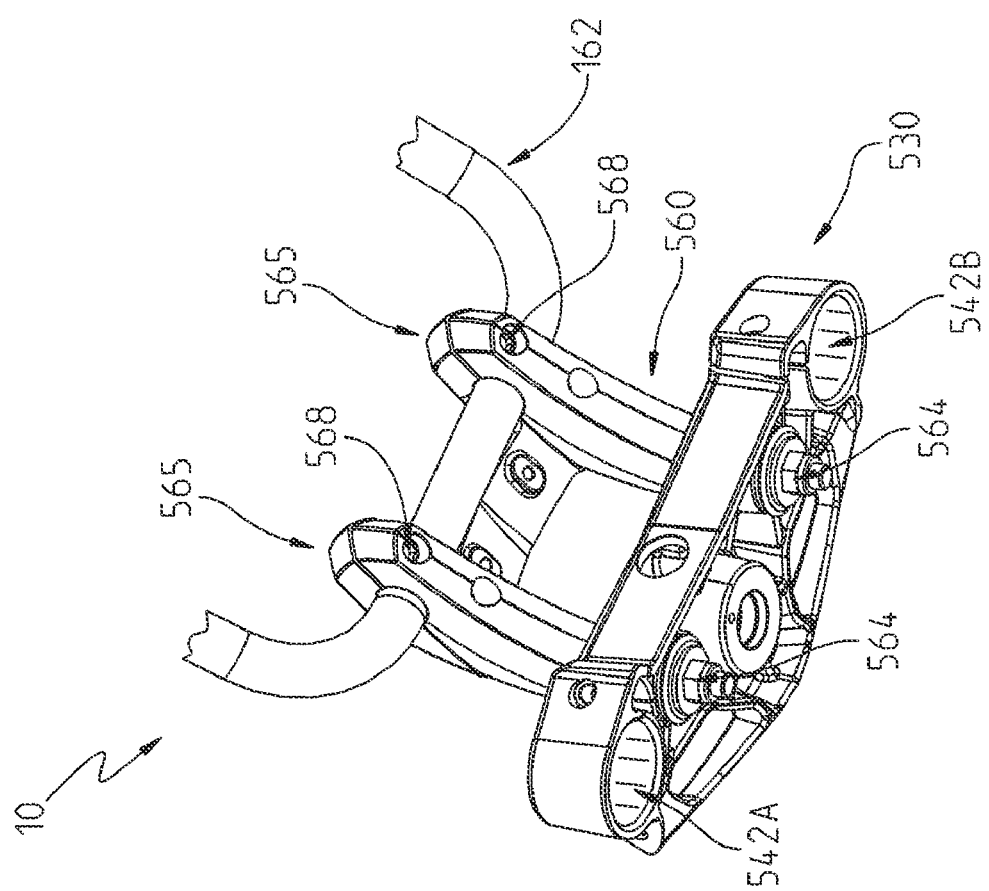

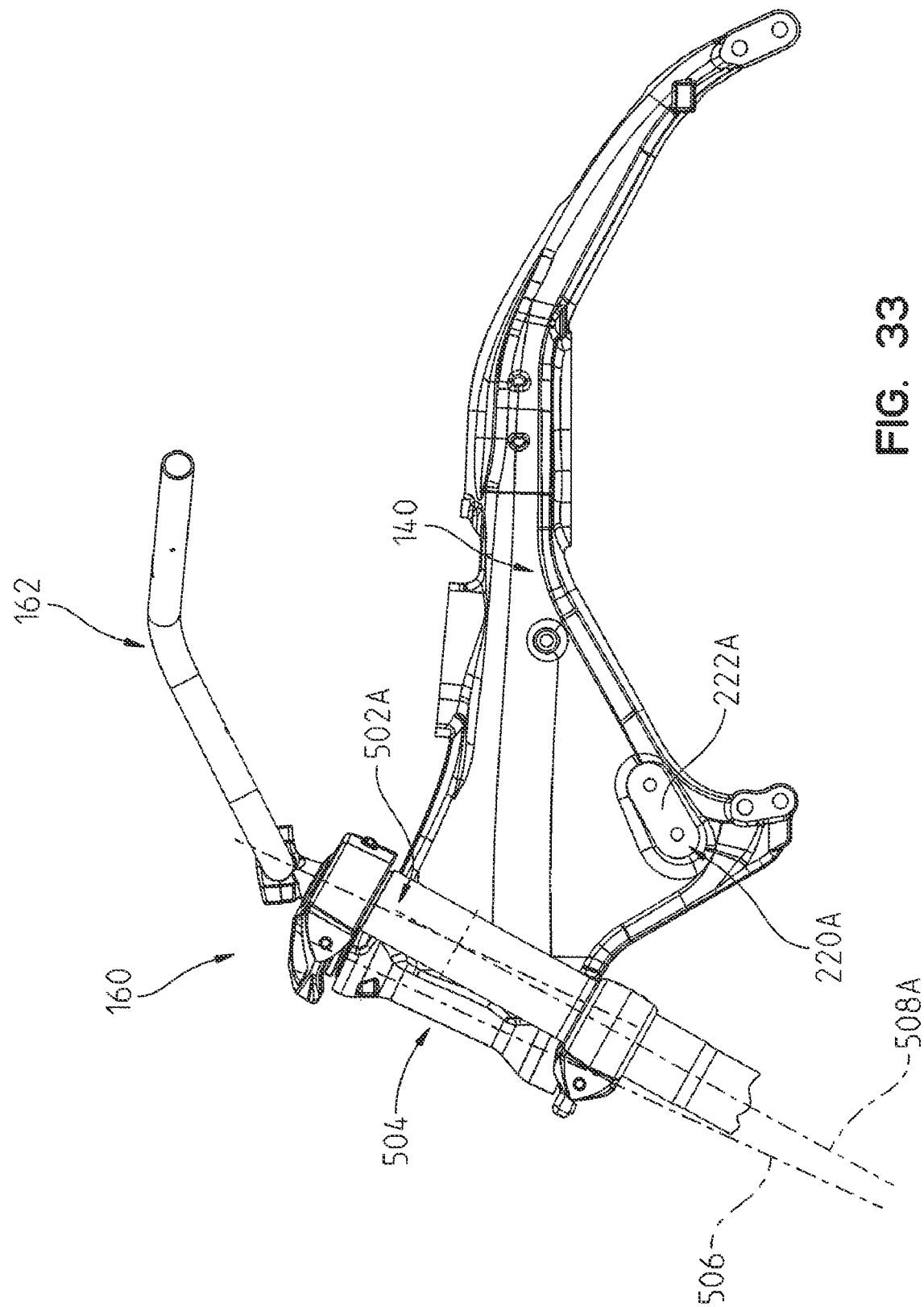

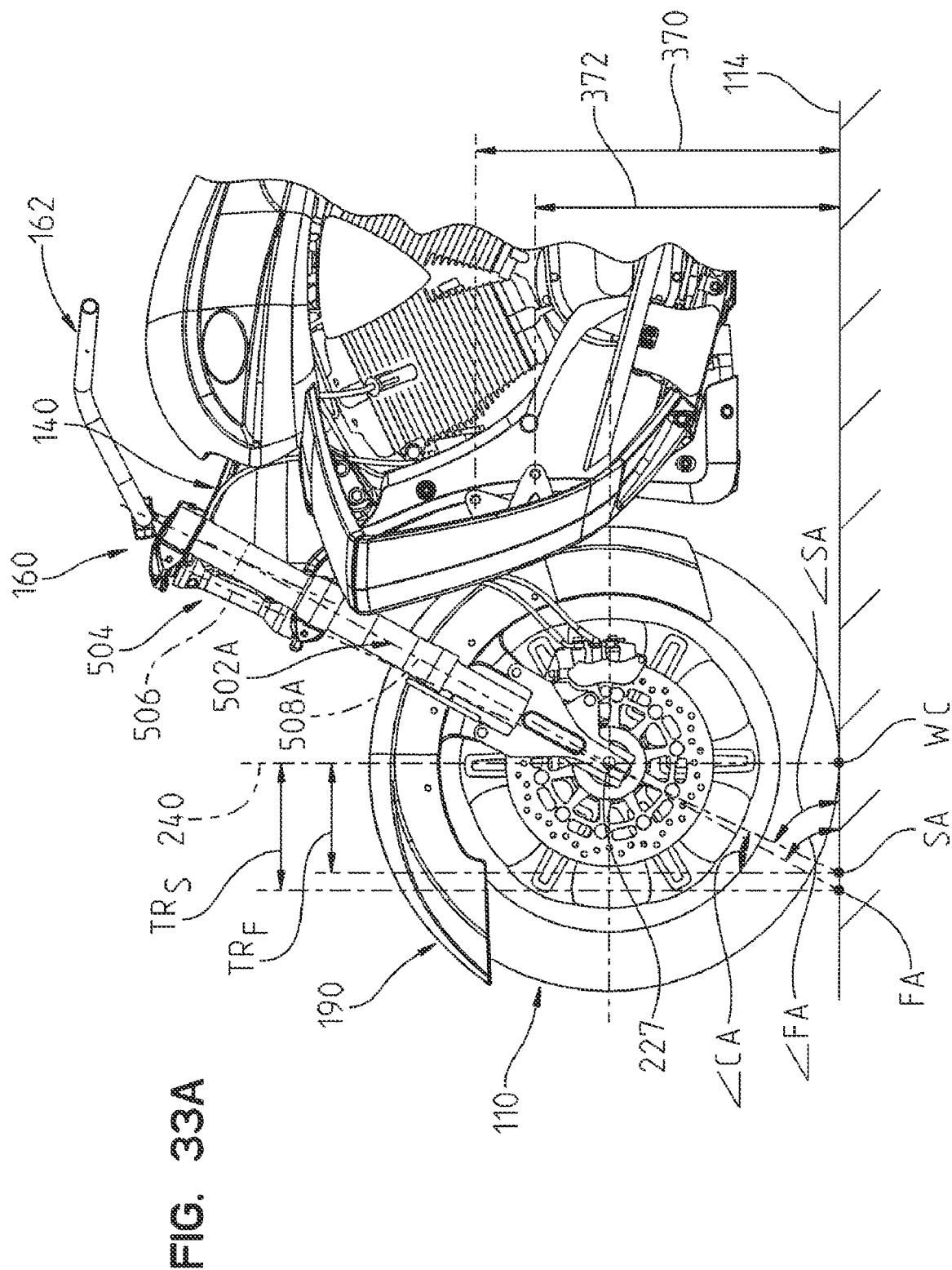

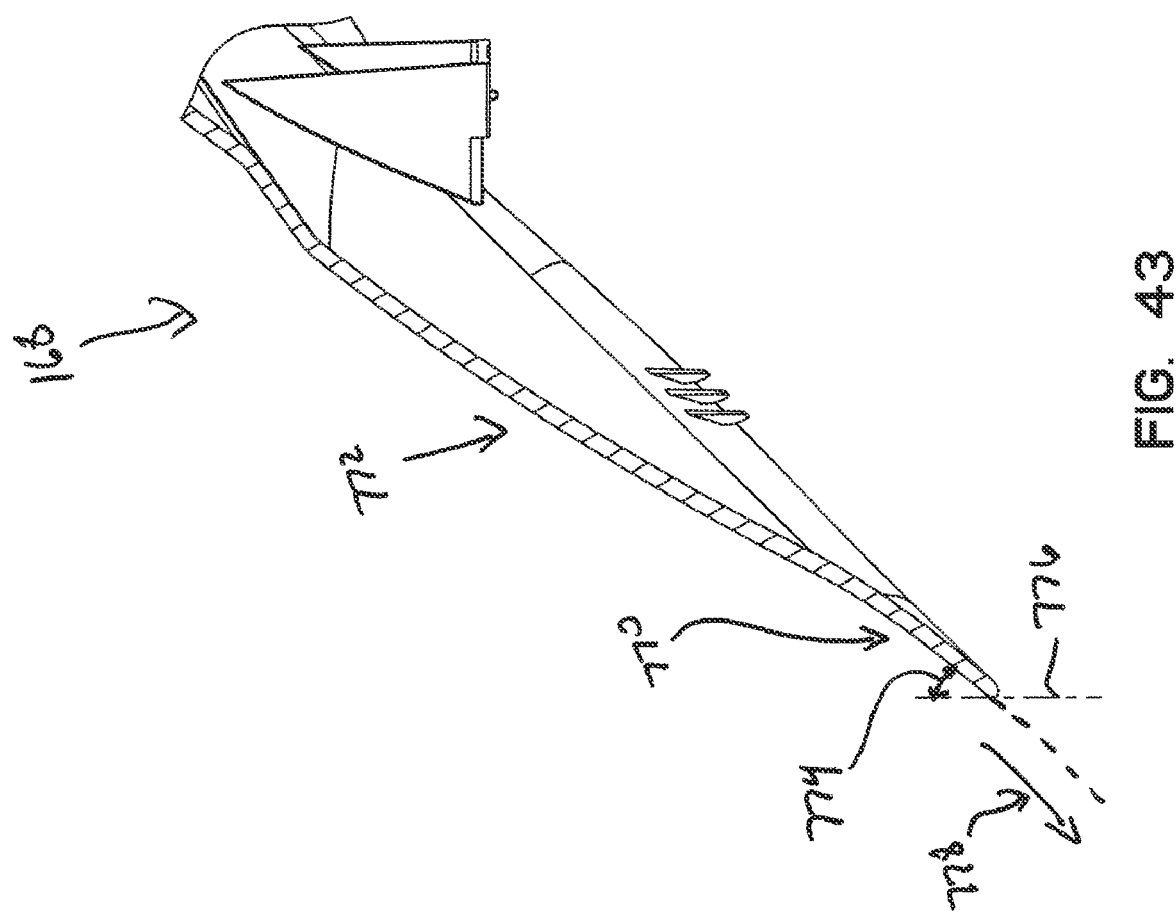

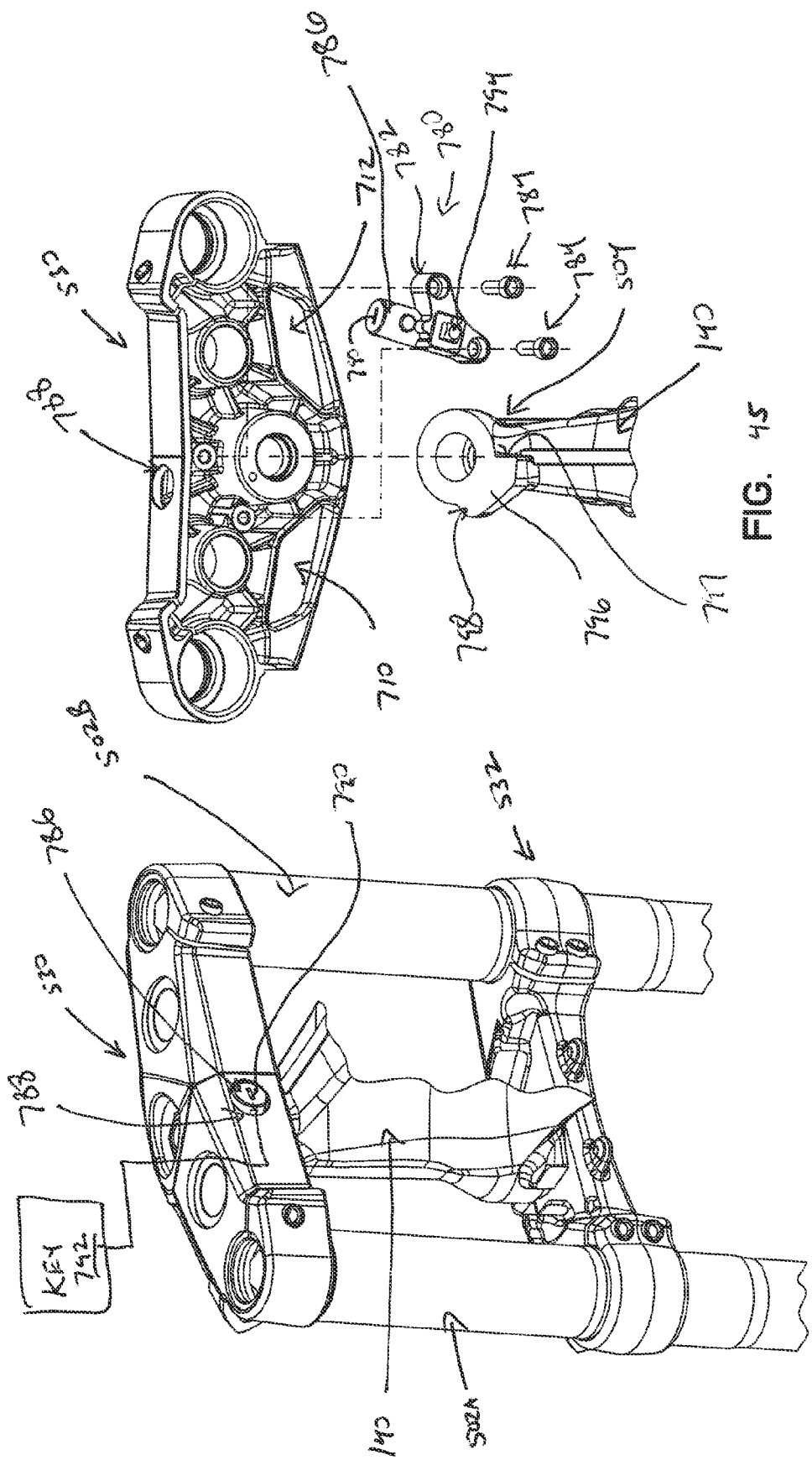

TWO-WHEELED VEHICLE

CROSS-REFERENCE TO RELATED APPLICATIONS

This application relates to U.S. patent application Ser. No. 12/478,621, filed Jun. 4, 2009, titled "TWO-WHEELED VEHICLE," and U.S. Design patent application Ser. No. 29/338,099 filed Jun. 4, 2009, titled "MOTORCYCLE," the disclosures of which are expressly incorporated by reference herein.

FIELD

The present invention relates generally to a vehicle and in particular to a two-wheeled vehicle.

BACKGROUND

Two-wheeled vehicles, such as motorcycles, are known. Motorcycles are known which include tubular highway bars which extend laterally from the motorcycle. These types of highway bars are non-structural. It is known to mount accessories to these tubular highway bars. Typically, the accessories are mounted to the tubular highway bars with clamps that surround a circumference of the tubular highway bar. It is known to have non-parallel steering axis and forks.

SUMMARY

The present disclosure relates to two-wheeled vehicles, including motorcycles. The present disclosure relates to highway bars for a vehicle. The present disclosure relates to the arrangement of a steering axis of the vehicle relative to a fork axis.

In an exemplary embodiment of the present disclosure, a two-wheeled vehicle is disclosed including highway bars including at least one solid cross-section. In another exemplary embodiment of the present disclosure, a two-wheeled vehicle is disclosed including a left side highway bar and a right side highway bar, at least one of the highway bars having a removable cover removably coupled thereto. In yet another exemplary embodiment of the present disclosure, a two-wheeled vehicle is disclosed including a left side highway bar and a right side highway bar, at least one of the highway bars having a guide for a flexible connector. In still another exemplary embodiment of the present disclosure, a two-wheeled vehicle is disclosed including a left side highway bar and a right side highway bar, at least one of the highway bars having a first accessory mounted thereto a location completely not visible from a side view of the two-wheeled vehicle. In a further exemplary embodiment of the present disclosure, a two-wheeled vehicle is disclosed wherein a steering axis is angled relative to a fork axis. In still a further exemplary embodiment of the present disclosure, a two-wheeled vehicle is disclosed wherein a steering post, a first fork member, and a second form member are coupled to a first coupling member the steering post being forward of the first fork member and the second fork member.

In another exemplary embodiment of the present disclosure, a two-wheeled vehicle is disclosed. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; a steering system rotatably coupled to the frame and coupled to the front wheel; and a pair of highway bars. Each of the highway bars having a first solid cross-section at a first height defined by an intersection with one of a first horizontal plane passing through the first axis, a second horizontal plane passing through a top of the front wheel, and a third horizontal plane located halfway between the first horizontal plane and the second horizontal plane. Each of the highway bars being coupled to the frame and positioned rearward of a vertical plane passing through the first axis of the front wheel and forward of the rear wheel. In one example, each of the highway bars includes a second solid cross-section at a second height defined by another one of the first horizontal plane, the second horizontal plane, and the third horizontal plane. In a variation of the example, each of the highway bars includes a third solid cross-section at a third height defined by the last of the first horizontal plane, the second horizontal plane, and the third horizontal plane. In another variation, at least one of the cross-sections is concave. In another example, each of the highway bars is solid between a pair of the first horizontal plane, the second horizontal plane, and the third horizontal plane. In yet another example, the pair of highway bars include a first highway bar positioned on a first side of the longitudinal plane and extending laterally from the frame and a second highway bar positioned on a second side of the longitudinal plane and extending laterally from the frame. The first highway bar being coupled to the frame at a first location. The second highway bar being coupled to the frame at a second location. The second location being spaced apart from the first location. In a variation of the example, the first highway bar and the second highway bar are angled towards the front wheel of the two-wheeled vehicle. In another variation of the example, the first highway bar and the second highway bar are each forged. In a refinement thereof, the first highway bar includes a first forged component coupled to the frame and a second forged component coupled to the first forged component. In still another variation of the example, the first cross section of the first highway bar and the second highway bar are non-cylindrical. In yet still another variation of the example, the vehicle further comprises a first removable cover coupled to the first highway bar and a second removable cover coupled to the second highway bar.

In yet another exemplary embodiment of the present disclosure, a two-wheeled vehicle is disclosed. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; a steering system rotatably coupled to the frame and coupled to the front wheel; a first highway bar coupled to the frame, positioned rearward of a vertical plane passing through the first axis of the front wheel and forward of the rear wheel, positioned on a first side of the longitudinal plane and extending from the frame in a first direction away from the longitudinal plane; a second highway bar coupled to the frame, positioned rearward of a vertical plane passing through the first axis of the front wheel and forward of the rear wheel, positioned on a second side of the longitudinal plane and extending from the frame in a second direction away from the longitudinal plane; and a first removable cover removably coupled to the first highway bar. In an example, the vehicle further comprises a first accessory mounted to the first highway bar. The first accessory being operatively coupled to an operator input of the vehicle through at least a first wire. The first wire being at least partially covered by the first removable cover. In a variation of the example, the vehicle further comprises a second removable cover removably coupled to the second highway bar and a second accessory mounted to the second highway bar. The second accessory being operatively coupled to the operator input of the vehicle through at least a second wire. The second wire being at least partially covered by the second removable cover. In another variation of the example, the first wire is located between the first highway bar and the first removable cover in a channel provided in one of the first highway bar and the first removable cover. In another example, the first removable cover is made of a polymeric material.

In still another exemplary embodiment of the present disclosure, a two-wheeled vehicle is disclosed. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a power train supported by the frame and operably coupled to the rear wheel to power the rear wheel; a straddle seat supported by the frame, the straddle seat having a support surface; a steering system rotatably coupled to the frame and coupled to the front wheel, the steering system including a handlebar supporting an operator input; and a pair of highway bars coupled to the frame and positioned rearward of a vertical plane passing through the first axis of the front wheel and forward of the rear wheel. At least a first highway bar includes a guide for receiving a flexible connector which is operatively coupled to the operator input and operatively coupled to the power train. In an example, the operator input is a throttle input, the flexible connector is a throttle connector, and the power train including a prime mover having a throttle control device, the throttle input being operatively coupled to the throttle control device through the throttle connector. In a variation of the example, the guide is provided in a top portion of the first highway bar. In a further variation, the guide captures the throttle cable between the frame and the first highway bar.

In yet still another exemplary embodiment of the present disclosure, a two-wheeled vehicle is disclosed. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; a steering system rotatably coupled to the frame and coupled to the front wheel; a pair of accessories supported by the front wheel and the rear wheel; and a pair of highway bars coupled to the frame and positioned rearward of a vertical plane passing through the first axis of the front wheel and forward of the rear wheel. A first accessory of the pair of accessories is mounted to a left side highway bar of the pair of highway bars at a location completely not visible from a left side view of the two-wheeled vehicle. In an example, the first accessory includes a bracket. The bracket is mounted to the left side highway bar at the location completely not visible from the left side view of the two-wheeled vehicle. The first accessory is coupled to the bracket. In a variation of the example, the first accessory is a foot peg. In a further variation thereof, the foot peg is moveable between a stored position and a use position, wherein in the use position the foot peg extends laterally outward from the left highway bar. In another variation thereof, the bracket is mounted to the left side highway bar in a first orientation to position the foot peg at a first height and is mounted to the left side highway bar in a second orientation to position the foot peg at a second height, the second height being different from the first height. In another example, the first accessory is a lighting assembly.

In still yet another exemplary embodiment of the present disclosure, a two-wheeled vehicle is disclosed. The two-wheeled vehicle comprising a front wheel; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; and a steering system rotatably coupled to the frame. The frame including a cast frame member. The steering system including a steering post passing through an interior of the cast frame member of the frame, a first fork member positioned to a first side of the longitudinal plane and coupled to the front wheel, a second fork member positioned to a second side of the longitudinal plane and coupled to the front wheel, and at least one coupling member which couples the steering post to the first fork member and to the second fork member. A steering axis defined by the steering post is angled upward relative to horizontal by a first angle and a fork axis defined by the first fork member is angled upward relative to horizontal by a second angle. In one example, the second angle being less than the first angle and both the first angle and the second angle being acute. In an example, the steering post is coupled to a first coupling member at a first location of the first coupling member and the first fork member is coupled to the first coupling member at a second location of the first coupling member. The first location of the first coupling member being forward of the second location of the first coupling member. In a variation of the example, the first coupling member is a triple clamp and is positioned above the frame. In a further variation, the vehicle further comprises handlebars which are supported by the triple clamp. In another variation of the example, the two-wheeled vehicle may be configured in a non-fairing configuration and in a fairing configuration. The non-fairing configuration having a first center of mass and the fairing configuration having a second center of mass. In a variation thereof, the steering axis is forward of the first center of mass. In a further variation thereof, the steering axis is rearward of the second center of mass.

In yet still another exemplary embodiment of the present disclosure, a two-wheeled vehicle is disclosed. The two-wheeled vehicle comprising a front wheel; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; and a steering system rotatably coupled to the frame, the steering system including a steering post coupled to the frame, a first fork member positioned to a first side of the longitudinal plane and coupled to the front wheel, a second fork member positioned to a second side of the longitudinal plane and coupled to the front wheel, and at least one coupling member which couples the steering post to the first fork member and to the second fork member. The steering post is coupled to a first coupling member at a first location of the first coupling member and the first fork member is coupled to the first coupling member at a second location of the first coupling member, the first location of the first coupling member being forward of the second location of the first coupling member. In an example, the frame extends between the first fork member and the second fork member. In another example, the first coupling member is a first triple clamp positioned above the frame, the first triple clamp is coupled to the steering post, the first fork member and the second fork member. The vehicle further comprising a second triple clamp positioned on an opposite side of the frame from the first triple clamp, the second triple clamp also being coupled to the steering post, the first fork member and the second fork member. In a variation thereof, a steering axis defined by the steering post is angled relative to a fork axis defined by the first fork member. In a further variation, the steering axis is angled upward relative to horizontal by a first angle and the fork axis is angled upward relative to horizontal by a second angle, the second angle being less than the first angle. Both the first angle and the second angle being acute.

In a further exemplary embodiment of the present disclosure, a method for assembling a steering system including a left fork member, a right fork member, a steering post, a first triple clamp, and a second triple clamp to a frame of a two-wheeled vehicle is provided. The method comprising the steps of: coupling the steering post, the left fork member and the right fork member to the first triple clamp; subsequently coupling the steering post to the frame, such that the steering post is rotatable relative to the frame about a steering axis, the steering axis being non-parallel to a fork axis of the left fork member; positioning the upper triple clamp so that the steering post is received in an oversized opening in the upper triple clamp; coupling the upper triple clamp to the steering post; coupling the left fork member and the right fork member to the upper triple clamp. In an example, the step of coupling the upper triple clamp to the steering post includes the steps of: centering the upper triple clamp relative to the steering post; and subsequently coupling the upper triple clamp to the steering post while the upper triple clamp is in the centered position relative to the steering post. In another example, the step of coupling the upper triple clamp to the steering post includes the steps of: centering the upper triple clamp relative to the steering post; and simultaneously coupling the upper triple clamp to the steering post.

In yet another exemplary embodiment of the present disclosure, a two-wheeled vehicle is provided. The two-wheeled vehicle comprising: a front wheel; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface; and a steering system rotatably coupled to the frame. The steering system including a steering post coupled to the frame defining a steering axis. The steering system including a first fork member defining a fork axis positioned to a first side of the longitudinal plane and coupled to the front wheel. The steering system including a second fork member positioned to a second side of the longitudinal plane and coupled to the front wheel. The steering system including a first triple clamp which couples the first fork member, the second fork member, and the steering post together and a second triple clamp which also couples the first fork member, the second fork member, and the steering post together. The steering system including a means for centering the second triple clamp relative the steering post. The steering axis is angled relative to the fork axis. In an example, the means for centering includes a coupler having a chamfered surface that rests against the second triple clamp and through the contact with the second triple clamp centers the second triple clamp relative to the steering post. In another example, the means for centering includes a hat-shaped spacer which is placed over the steering post and is sized to center the steering post in an opening in the second triple clamp. The hat-shaped spacer keeping the steering post spaced apart from the second triple clamp.

The above mentioned and other features, and the manner of attaining them, will become more apparent and will be better understood by reference to the following description of embodiments taken in conjunction with the accompanying drawings.

BRIEF DESCRIPTION OF THE DRAWINGS

FIG. 7 illustrates a front view of the two-wheeled vehicle of FIG. 1;

FIG. 8 illustrates a rear view of the two-wheeled vehicle of FIG. 1;

FIG. 18 illustrates a view from the perspective of an operator of the vehicle FIG. 10 positioned on a seat of the vehicle;

FIG. 30 illustrates a front, perspective view of a portion of the steering system coupled to the frame of the vehicle;

FIG. 31 illustrates the connection of a handle bar for the vehicle configuration of FIG. 1 to a handlebar riser member of the steering system of FIG. 29;

FIG. 32 illustrates the connection of a handle bar for the vehicle configuration of FIG. 10 to a handlebar riser member of the steering system of FIG. 29;

FIG. 33 illustrates a side view of the assembly of FIG. 31;

FIG. 33A illustrates the left side view of FIG. 3 with the windshield and lighting assembly removed;

FIG. 43 illustrates a sectional view along lines 43-43 in FIG. 41 of a front side fairing member;

FIG. 44 illustrates a steering lock coupled to the upper triple clamp;

FIG. 45 illustrates an exploded view of portions of FIG. 44;

Corresponding reference characters indicate corresponding parts throughout the several views. Unless stated otherwise the drawings are proportional.

DETAILED DESCRIPTION OF THE DRAWINGS

Figure 1:
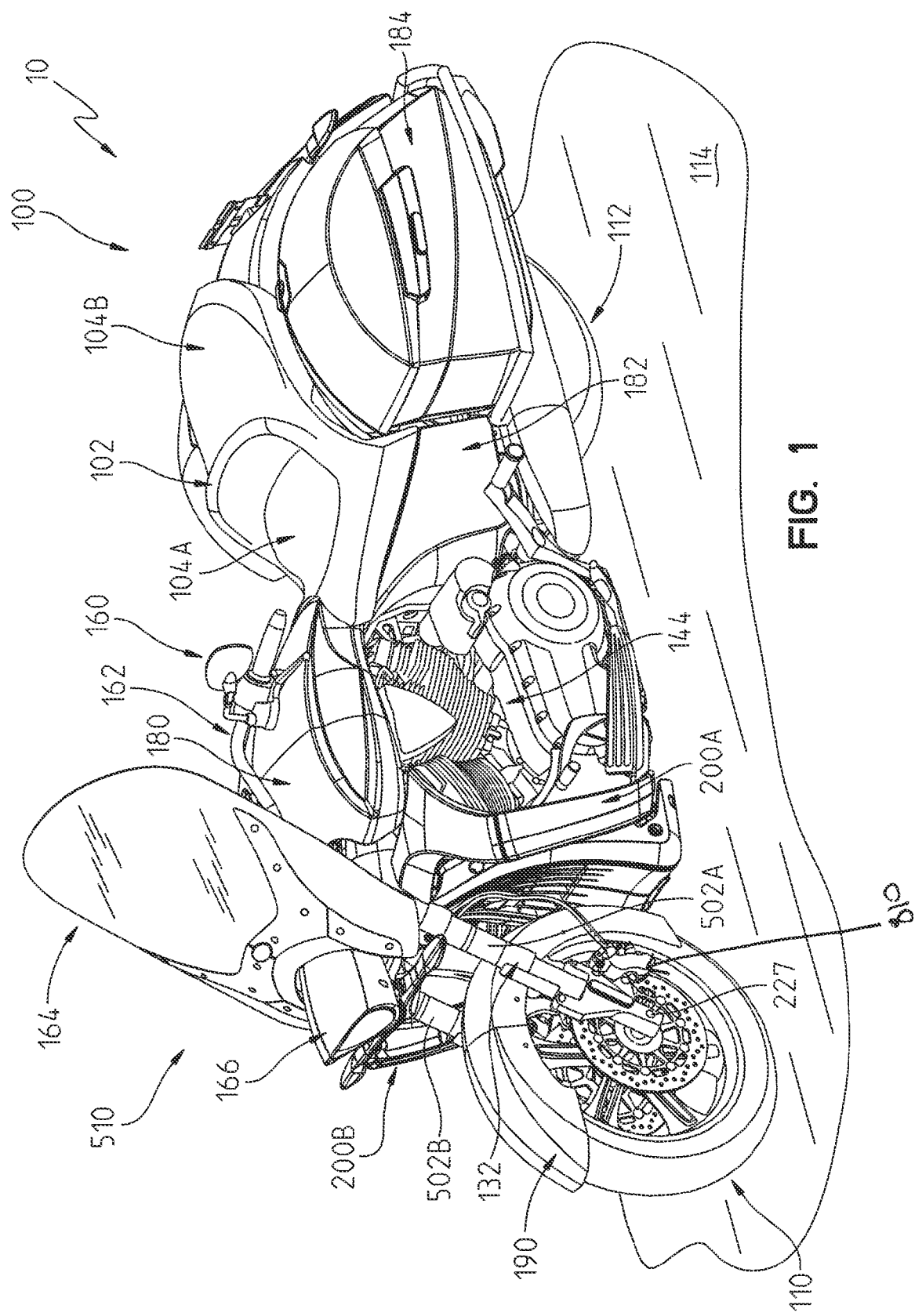
FIG. 1 illustrates a front, left side, perspective view of an illustrative embodiment of a two-wheeled vehicle.
Figure 2:
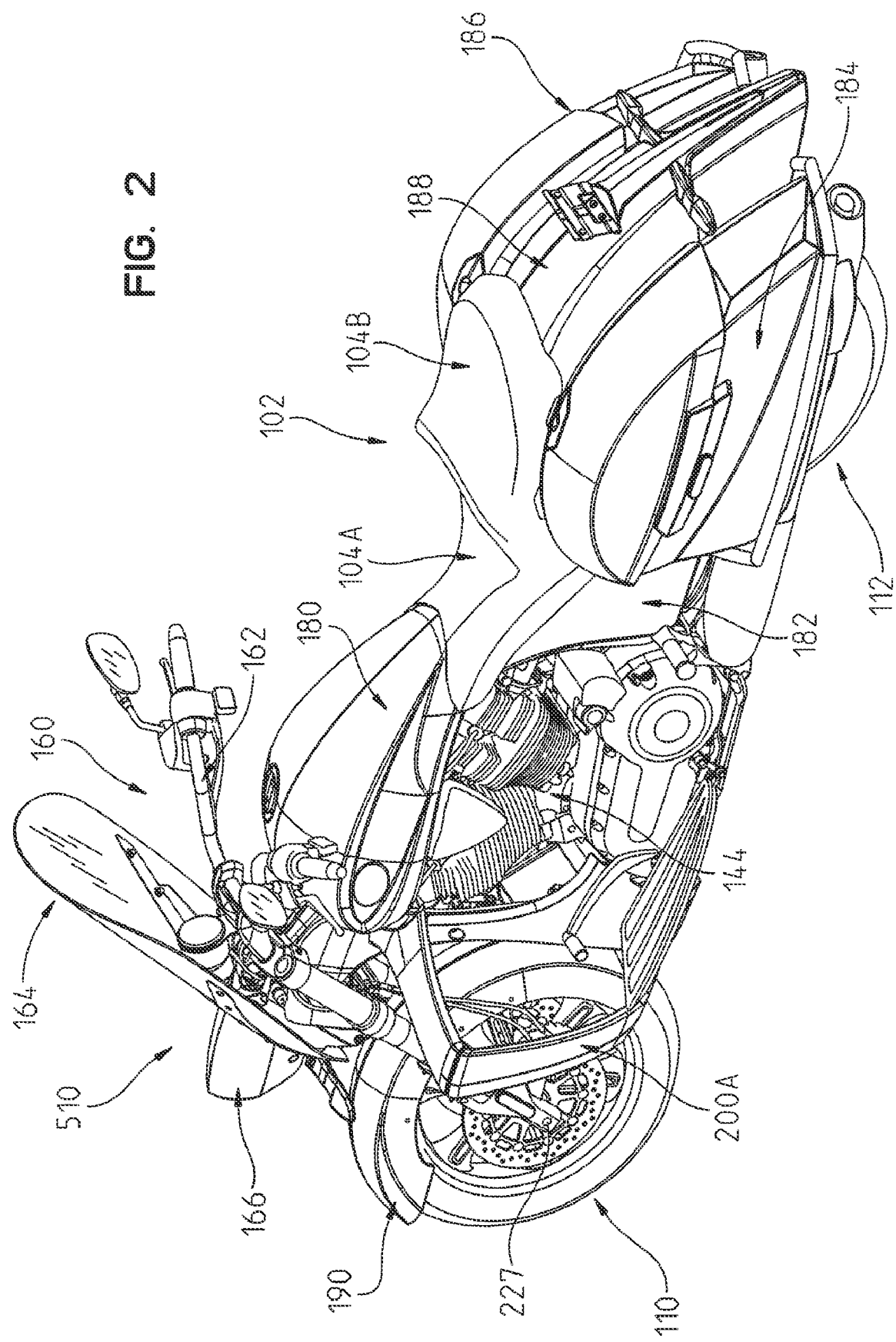
FIG. 2 illustrates a rear, left side, perspective view of the two-wheeled vehicle of FIG. 1.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, watercraft, utility vehicles, scooters, golf carts, three-wheeled vehicles, and mopeds.

Throughout this disclosure, two embodiments of a two-wheeled vehicle 100 are disclosed. Referring generally to FIGS. 1-9, a first illustrative embodiment 10 of two-wheeled vehicle 100 is shown. Referring generally to FIGS. 10-17, a second illustrative embodiment 20 of two-wheeled vehicle 100 is shown. Vehicle 10 is a motorcycle without a front fairing. The steering system of vehicle 10 supports a headlight assembly and a removable front windshield. Vehicle 20 is a motorcycle with a front fairing. The steering assembly of vehicle 20 supports the fairing assembly. Both of vehicle 10 and vehicle 20 share many similarities and the following disclosure generally applies to both vehicle 10 and vehicle 20 even though only discussed relative to one of vehicle 10 and vehicle 20. In general vehicle 10 and vehicle 20 differ in the components supported by the steering assembly.

Additional details about vehicle 100 are disclosed in U.S. patent application Ser. No. 12/478,621, filed Jun. 4, 2009, titled "TWO-WHEELED VEHICLE," and U.S. Design patent application Ser. No. 29/338,099 filed Jun. 4, 2009, titled "MOTORCYCLE," the disclosures of which are expressly incorporated by reference herein.

Referring to FIG. 1, vehicle 10 as illustrated is a motorcycle including a straddle seat 102 for supporting an operator in position 104A on a support surface and a passenger in position 104B on a support surface. In the illustrated embodiment, the support surface corresponding to position 104B is elevated relative to the support surface corresponding to position 104A. Vehicle 10 further includes a front ground engaging member, illustratively wheel 110, and a rear ground engaging member, illustratively wheel 112. Vehicle 10 travels relative to the ground 114 on front wheel 110 and rear wheel 112.

Figure 3:
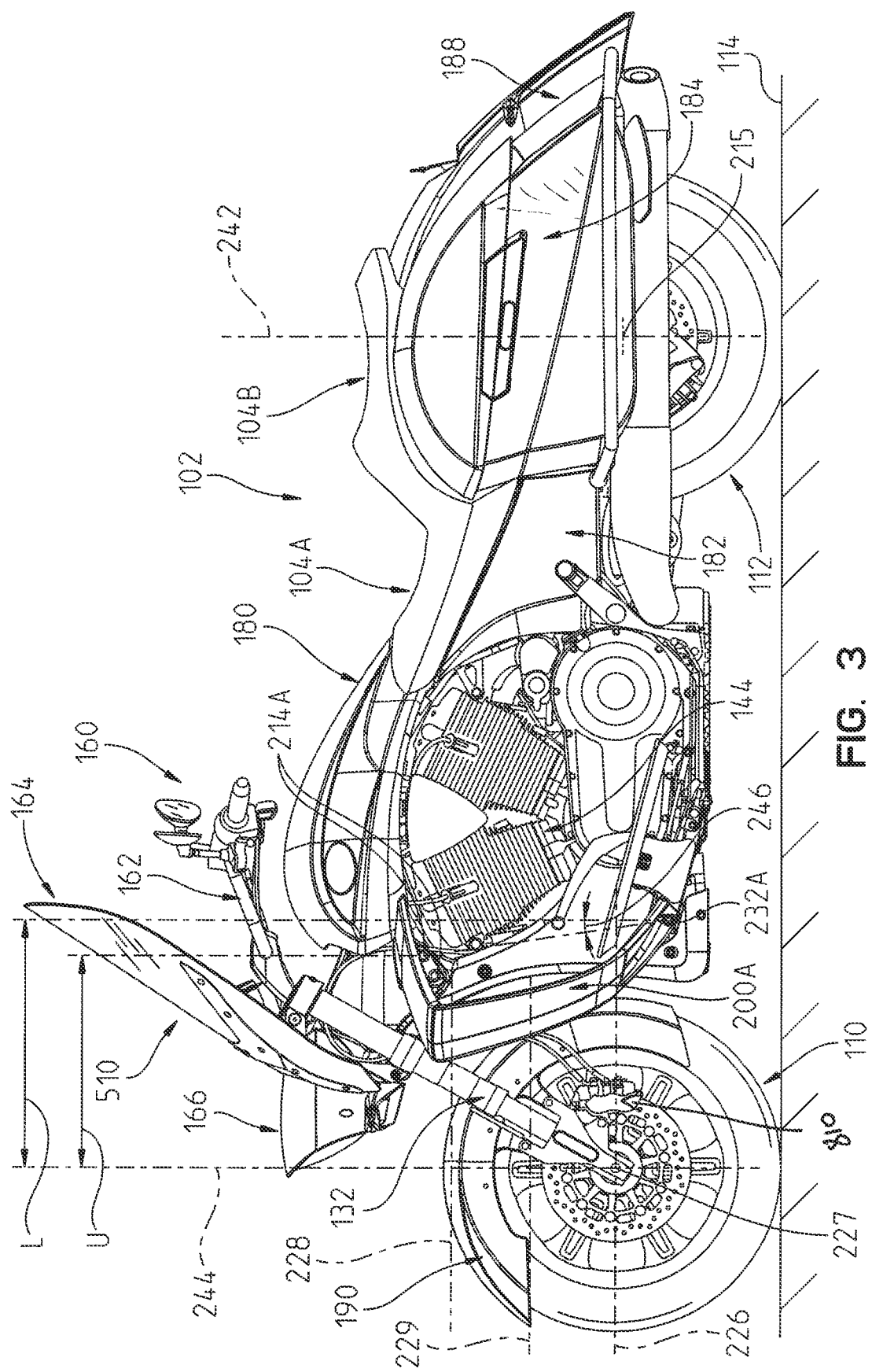
FIG. 3 illustrates a left side view of the two-wheeled vehicle of FIG. 1.
Figure 4:
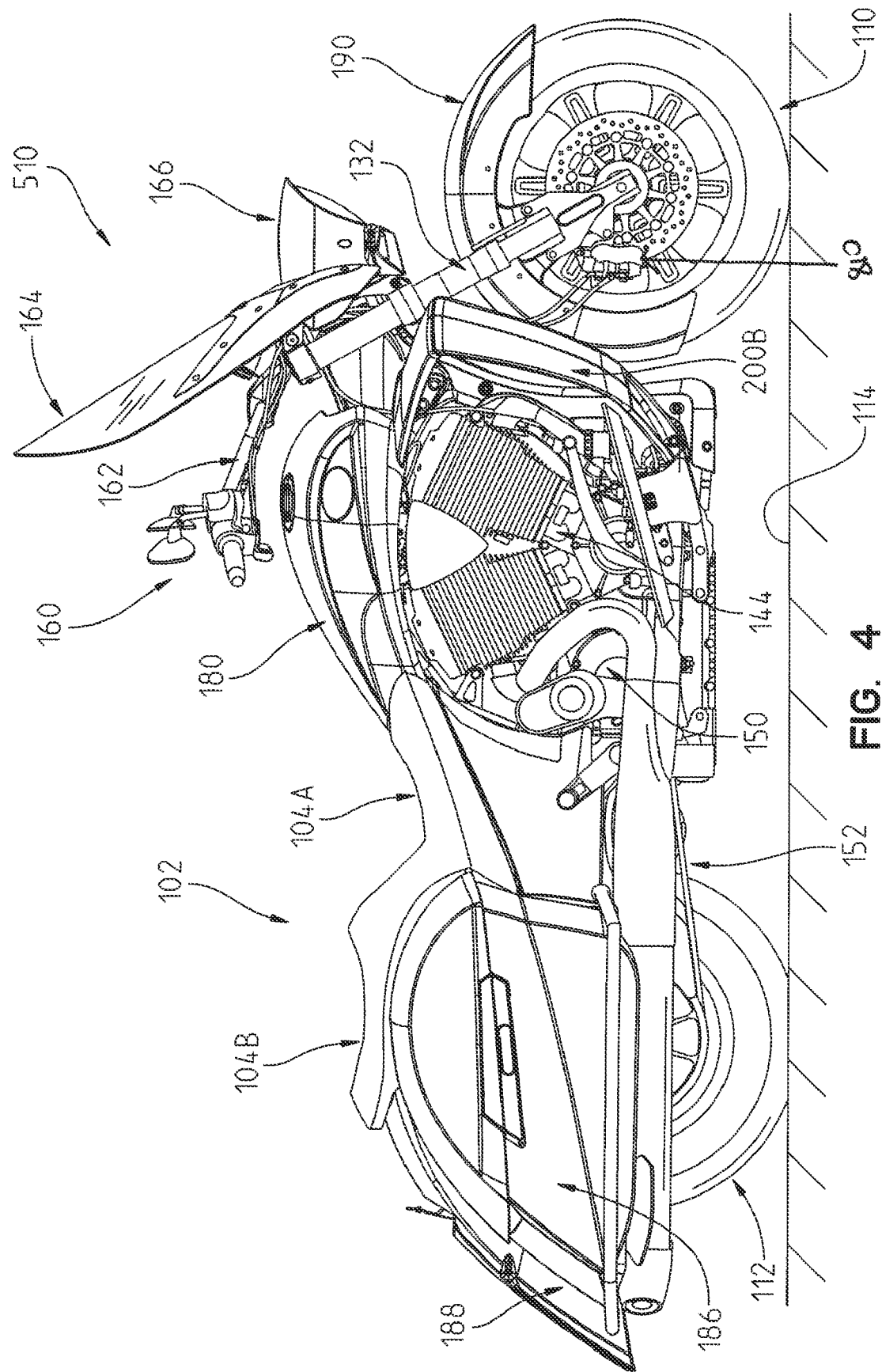
FIG. 4 illustrates a right side view of the two-wheeled vehicle of FIG. 1.
Figure 5:
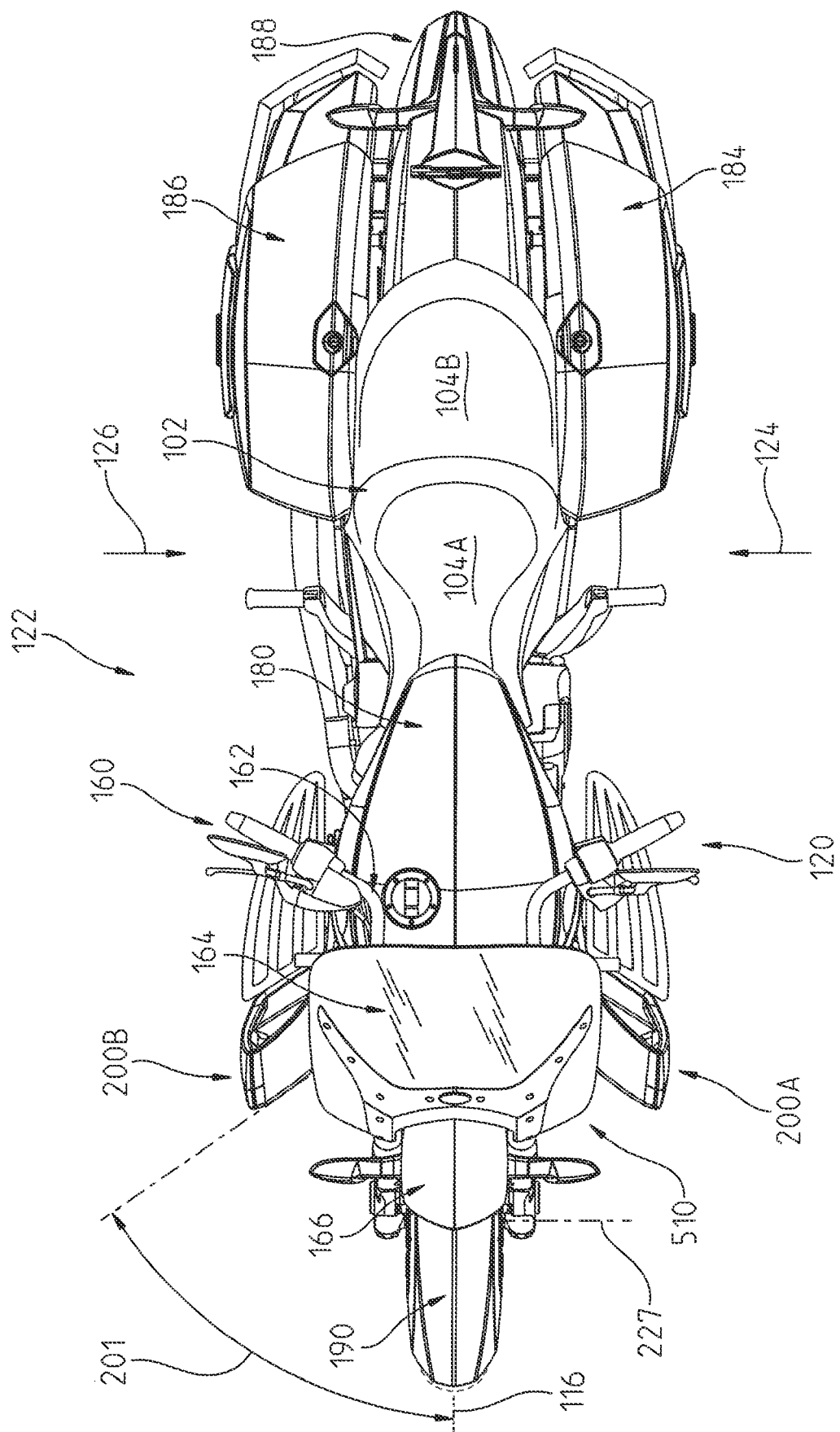
FIG. 5 illustrates a top view of the two-wheeled vehicle of FIG. 1.
Figure 6:
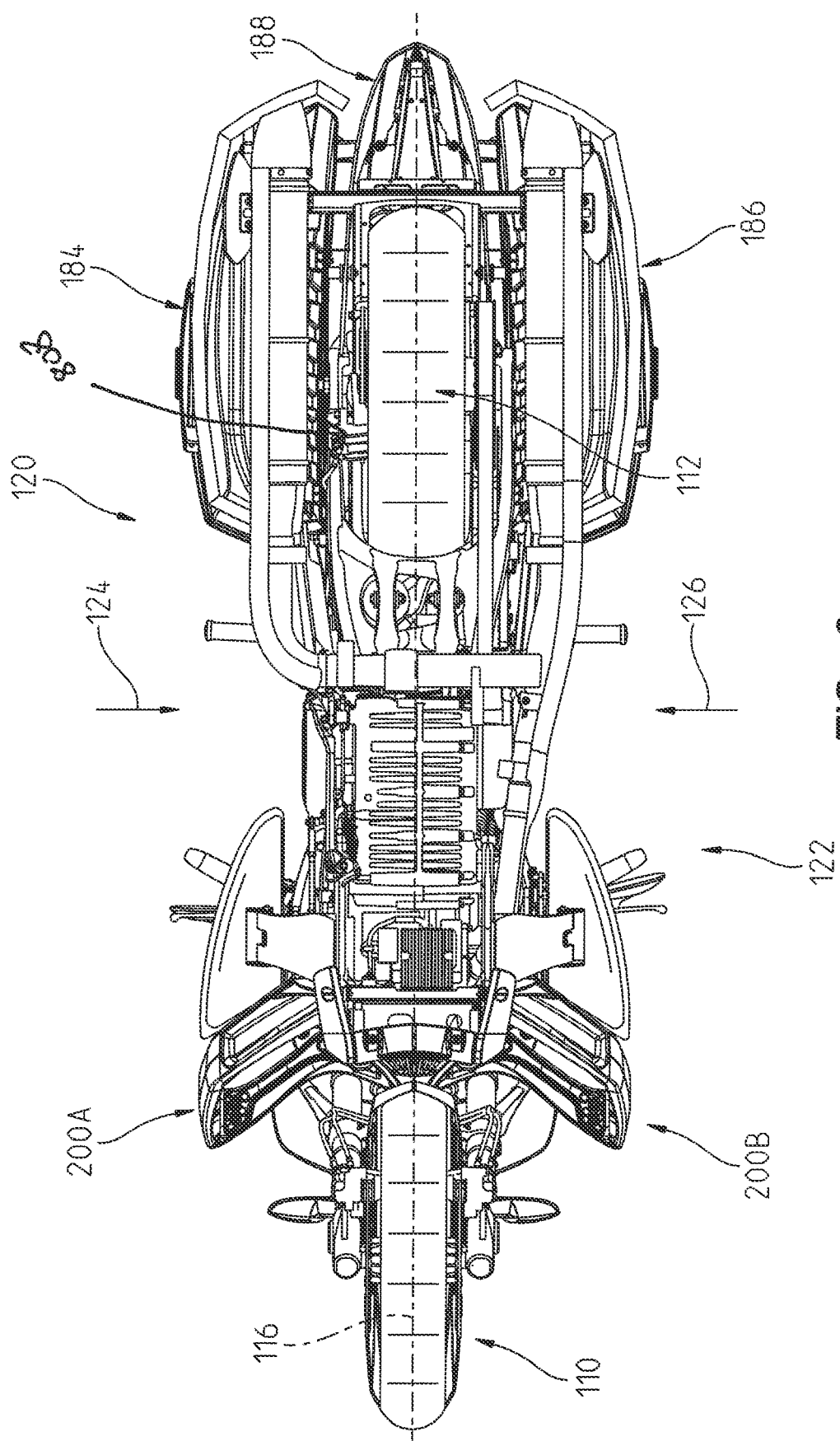
FIG. 6 illustrates a bottom view of the two-wheeled vehicle of FIG. 1.

Referring to FIG. 5, in one embodiment, front wheel 110 and rear wheel 112 are generally arranged along a centerline plane 116 of vehicle 10. A left side portion 120 of vehicle 10 is positioned to a first side of centerline plane 116 and a right side portion 122 of vehicle 10 is positioned to a second side of centerline plane 116. A left side view of vehicle 10 along direction 124 is shown in FIG. 3. A right side view of vehicle 10 along direction 126 is shown in FIG. 4. Directions 124 and 126 are both perpendicular to centerline plane 116.

Figure 19:
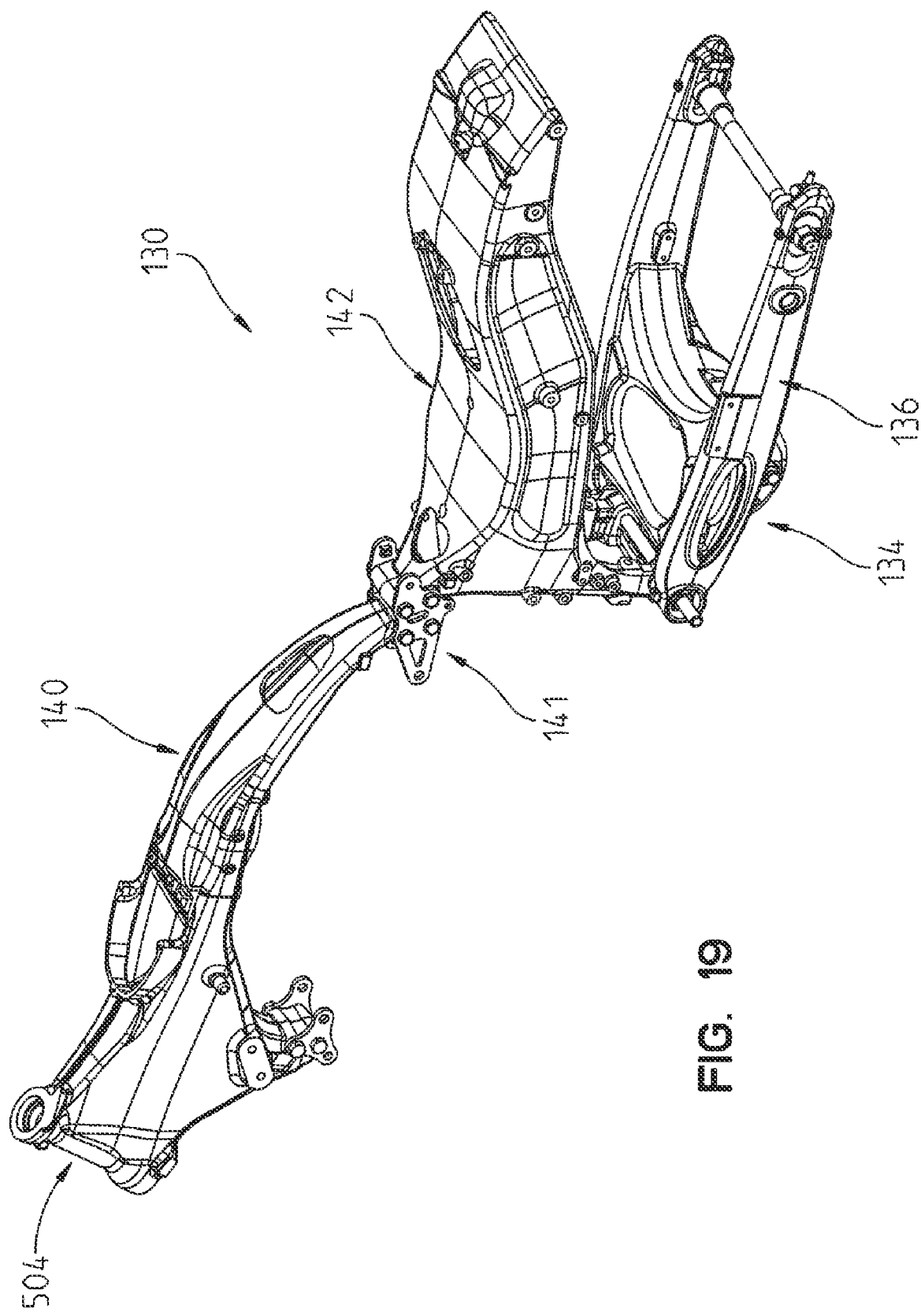
FIG. 19 illustrates a perspective view of the frame of both the vehicle of FIG. 1 and the vehicle of FIG. 10.
Figure 20:
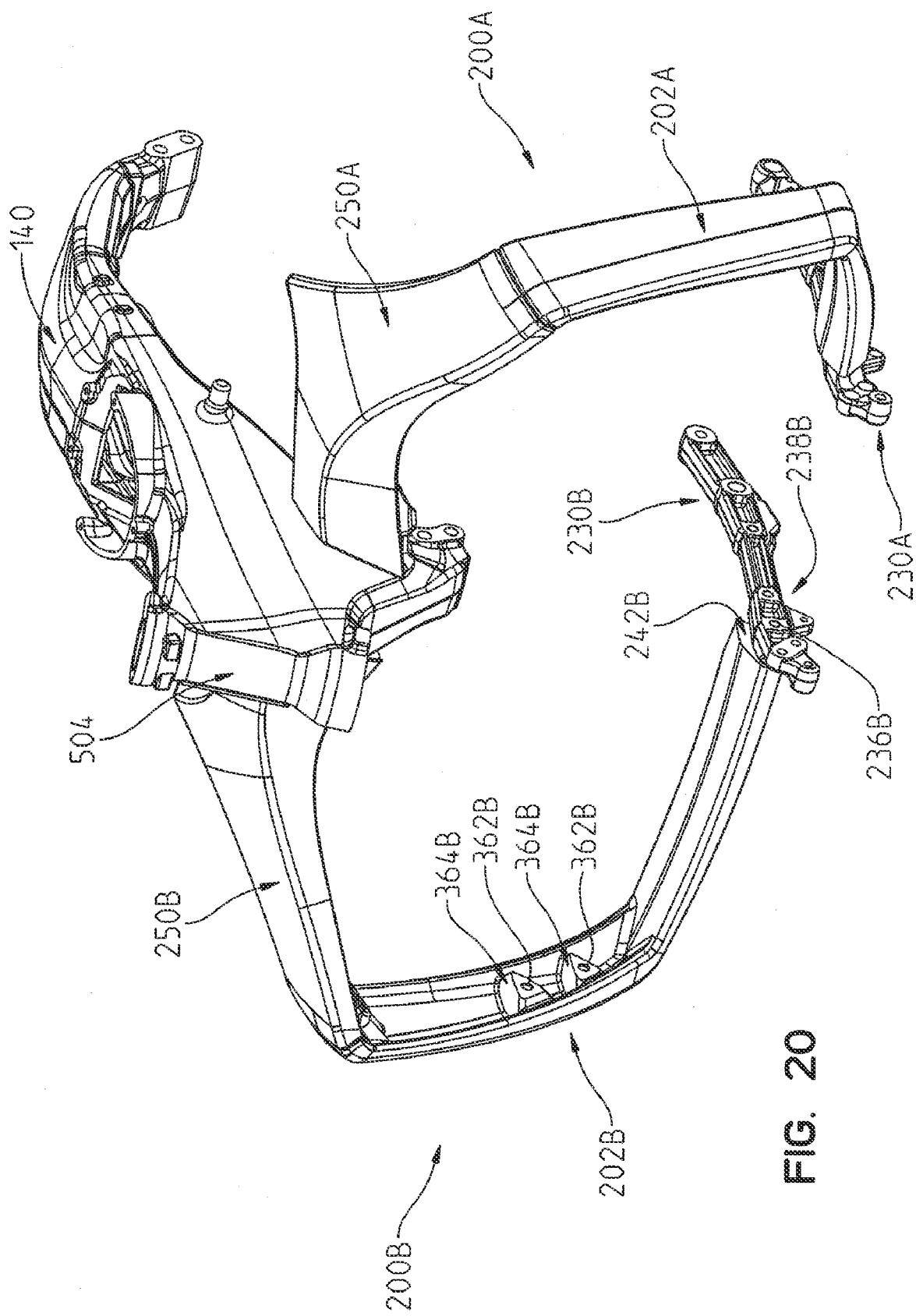
FIG. 20 illustrates a front, perspective view of a front frame portion of FIG. 19 with a pair of highway bars coupled thereto.
Figure 21:
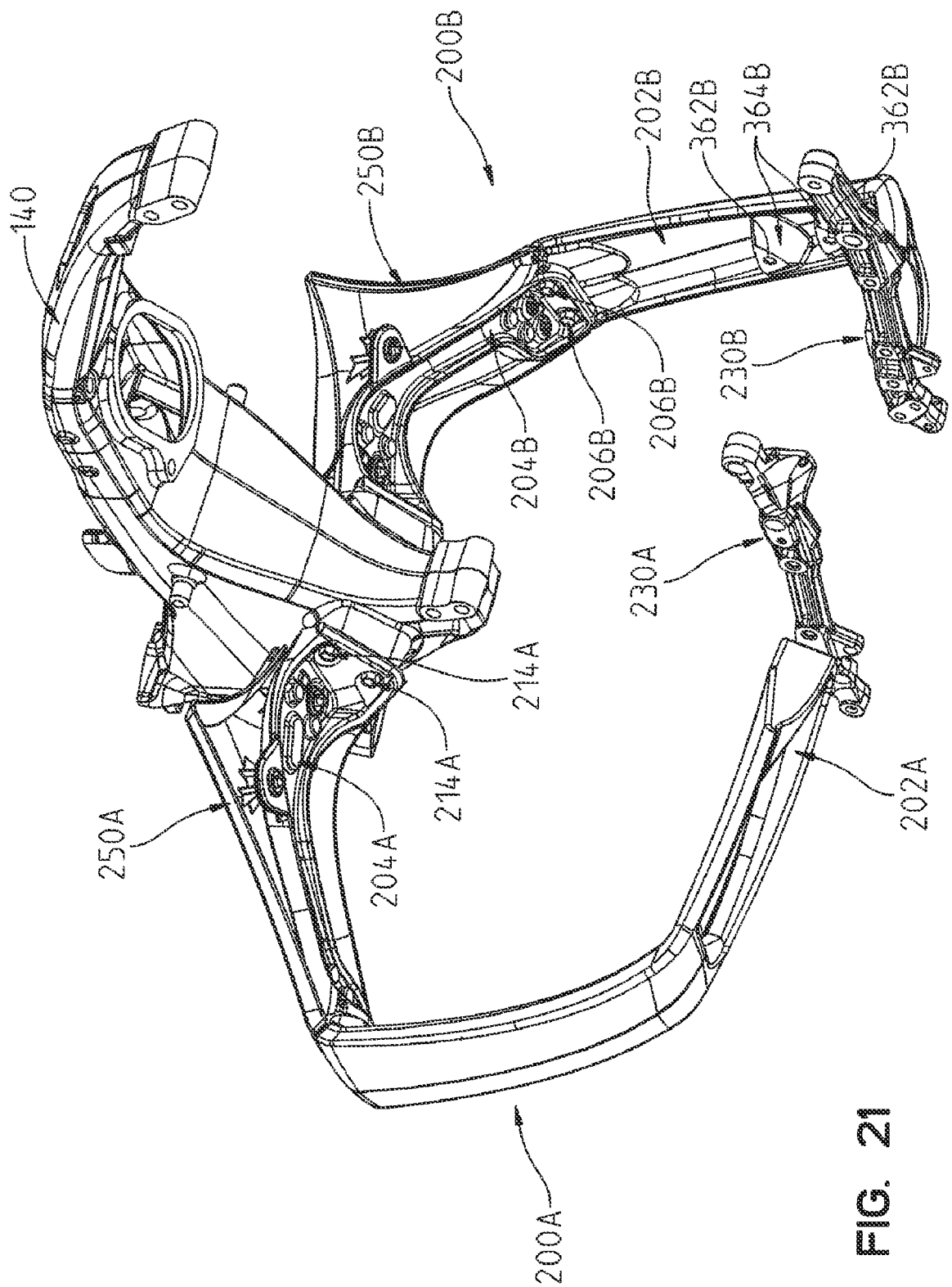
FIG. 21 illustrates a rear, perspective view of the assembly of FIG. 20.

Referring to FIG. 19, vehicle 10 includes a frame 130 which is supported by front wheel 110 through a front suspension 132 (see FIG. 1) and by rear wheel 112 through a rear suspension 134. A rear swing arm 136 of rear suspension 134 is shown. Additional details regarding rear suspension 134 are disclosed in U.S. patent application Ser. No. 11/624,142, titled REAR SUSPENSION FOR A TWO-WHEELED VEHICLE, the disclosure of which is expressly incorporated by reference herein.

Frame 130 includes a front frame member 140 and a rear frame member 142. Front frame member 140 and rear frame member 142 are coupled together through a pair of brackets 141. In one embodiment, both front frame member 140 and rear frame member 142 are cast one-piece components. In one example, the front frame member 140 and the rear frame member 142 are cast aluminum.

Frame 130 supports a prime mover 144 which powers the movement of vehicle 10. In the illustrated embodiment, prime mover 144 is a v-twin spark-ignition gasoline engine available from Polaris Industries, Inc. located at 2100 Highway 55 in Medina, Minn. 55340. Other exemplary prime movers include other arrangements of a spark-ignition gasoline engine, an electric motor, a hybrid spark-ignition engine, and other suitable torque-generating machines which are operable for powering the movement of vehicle 10. In one embodiment, prime mover 144 is suspended from front frame member 140. In one embodiment, front frame member 140 serves as an air box for prime mover 144.

Referring to FIG. 4, rear wheel 112 is coupled to a drive shaft of a transmission 150 through a belt 152. Transmission 150 is operatively coupled to prime mover 144 such that prime mover 144 may provide power to rear wheel 112. In alternative embodiments, rear wheel 112 is coupled to the drive shaft of transmission 150 through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission or a continuous variable transmission in combination with a shiftable transmission having one or more forward settings to move vehicle 100 forward and one or more reverse settings to moving vehicle 100 in reverse. In one embodiment, the transmission is of the form disclosed in U.S. patent application Ser. No. 11/636,077, assigned to Polaris Industries, Inc., titled "AUTOMATIC MOTORCYCLE," the disclosure of which is expressly incorporated by reference herein.

Figure 9:
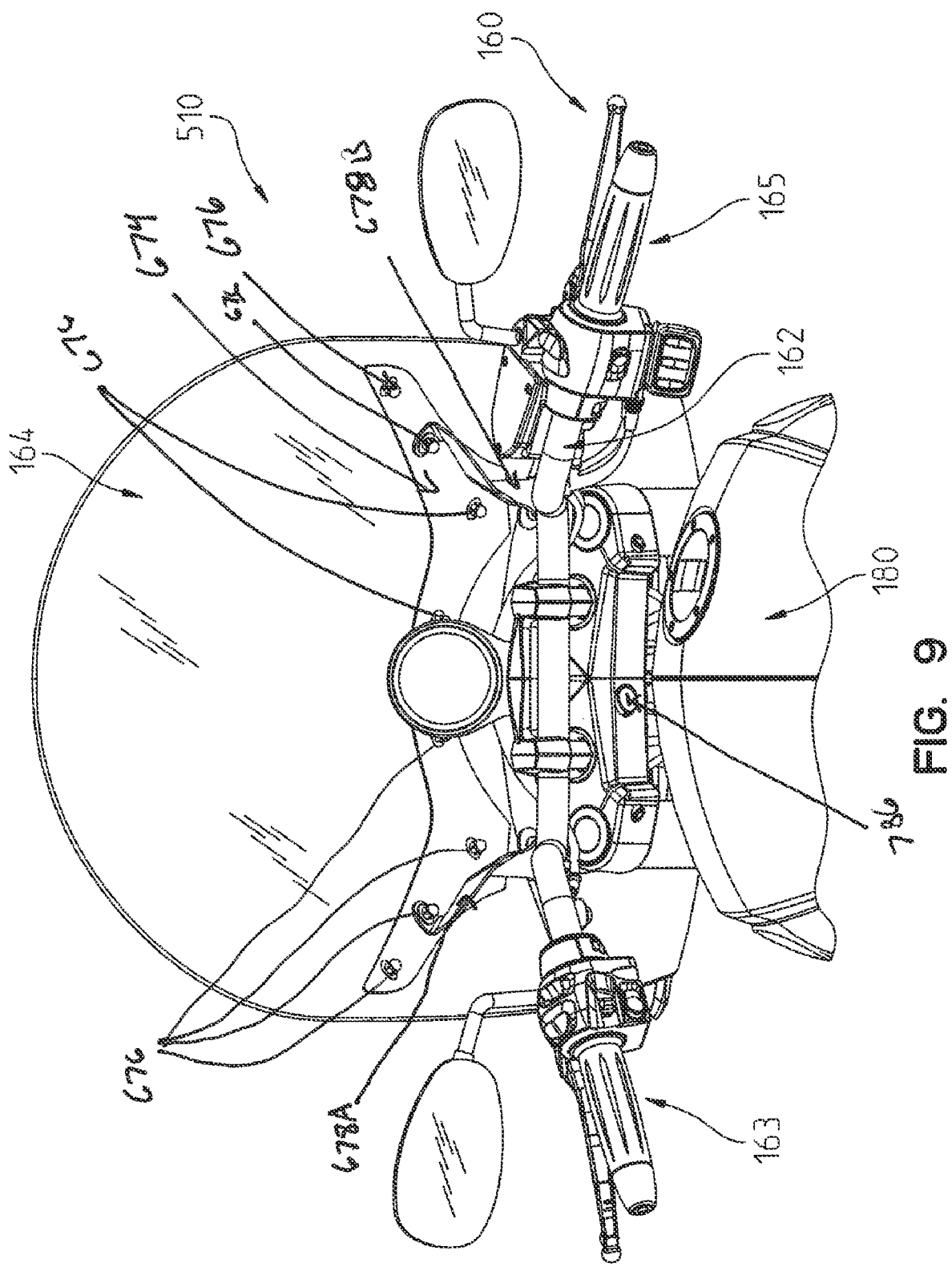
FIG. 9 illustrates a view from the perspective of an operator of the vehicle FIG. 1 positioned on a seat of the vehicle.
Figure 10:
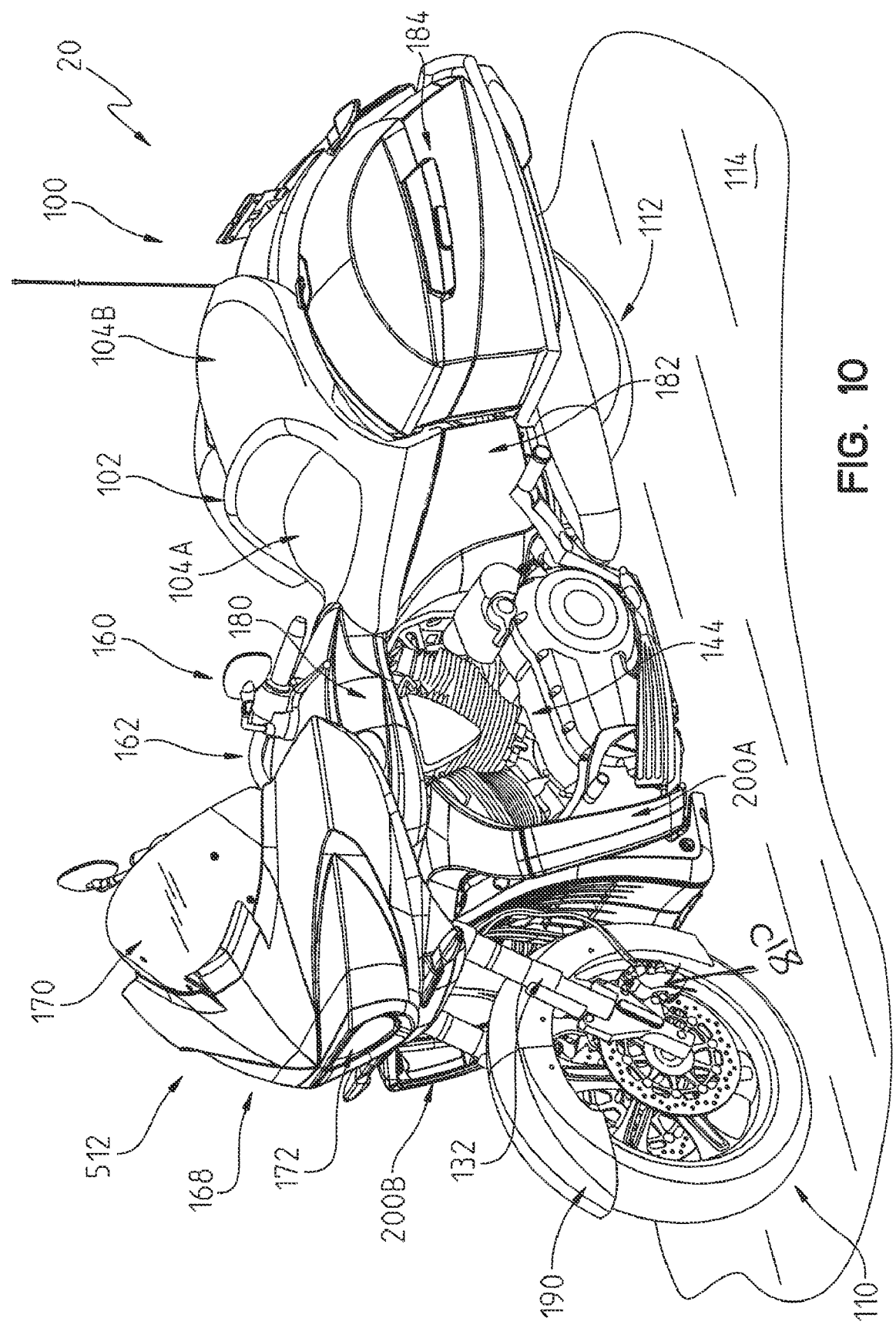
FIG. 10 illustrates a front, left side, perspective view of another illustrative embodiment of a two-wheeled vehicle.
Figure 11:
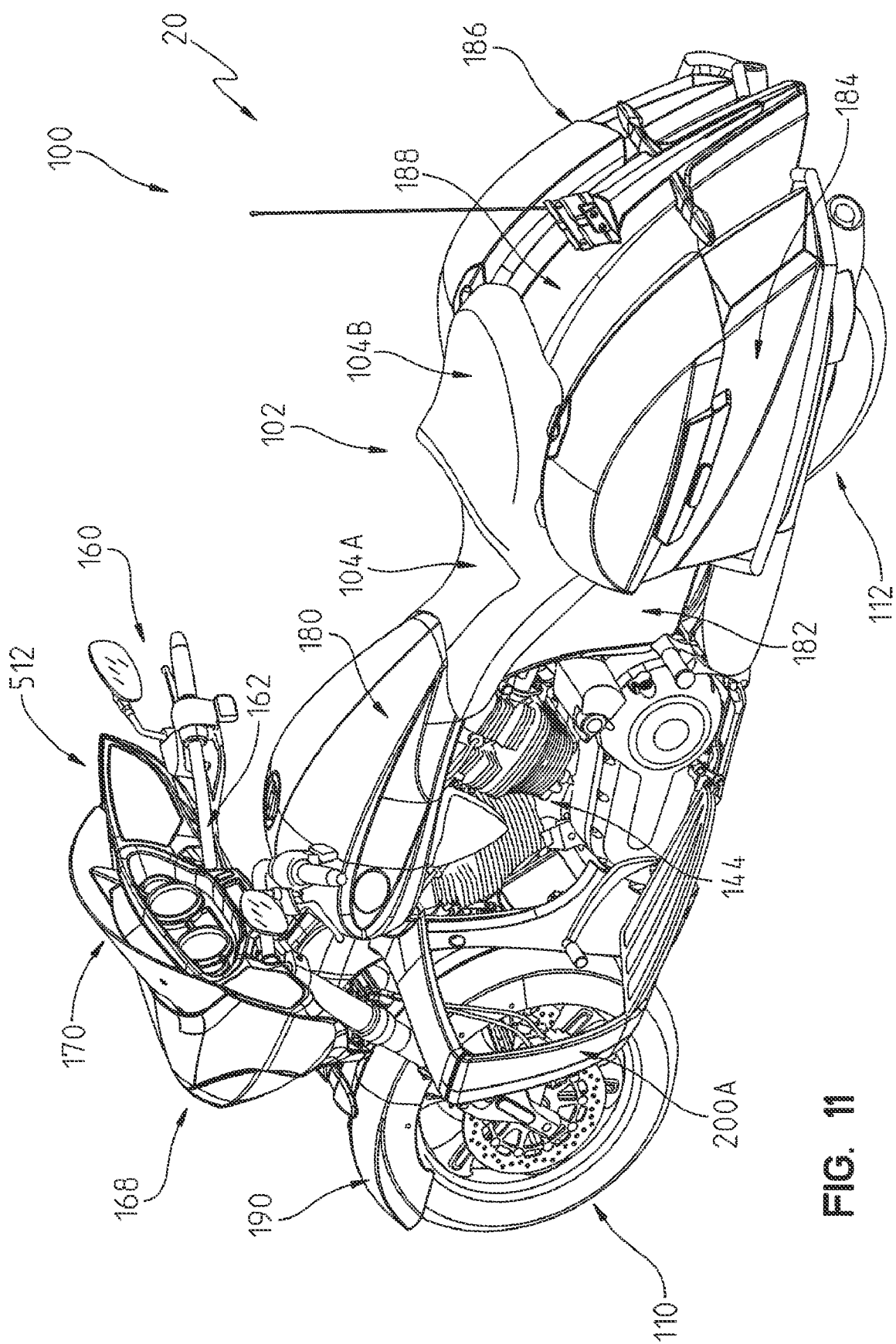
FIG. 11 illustrates a rear, left side, perspective view of the two-wheeled vehicle of FIG. 10.
Figure 12:
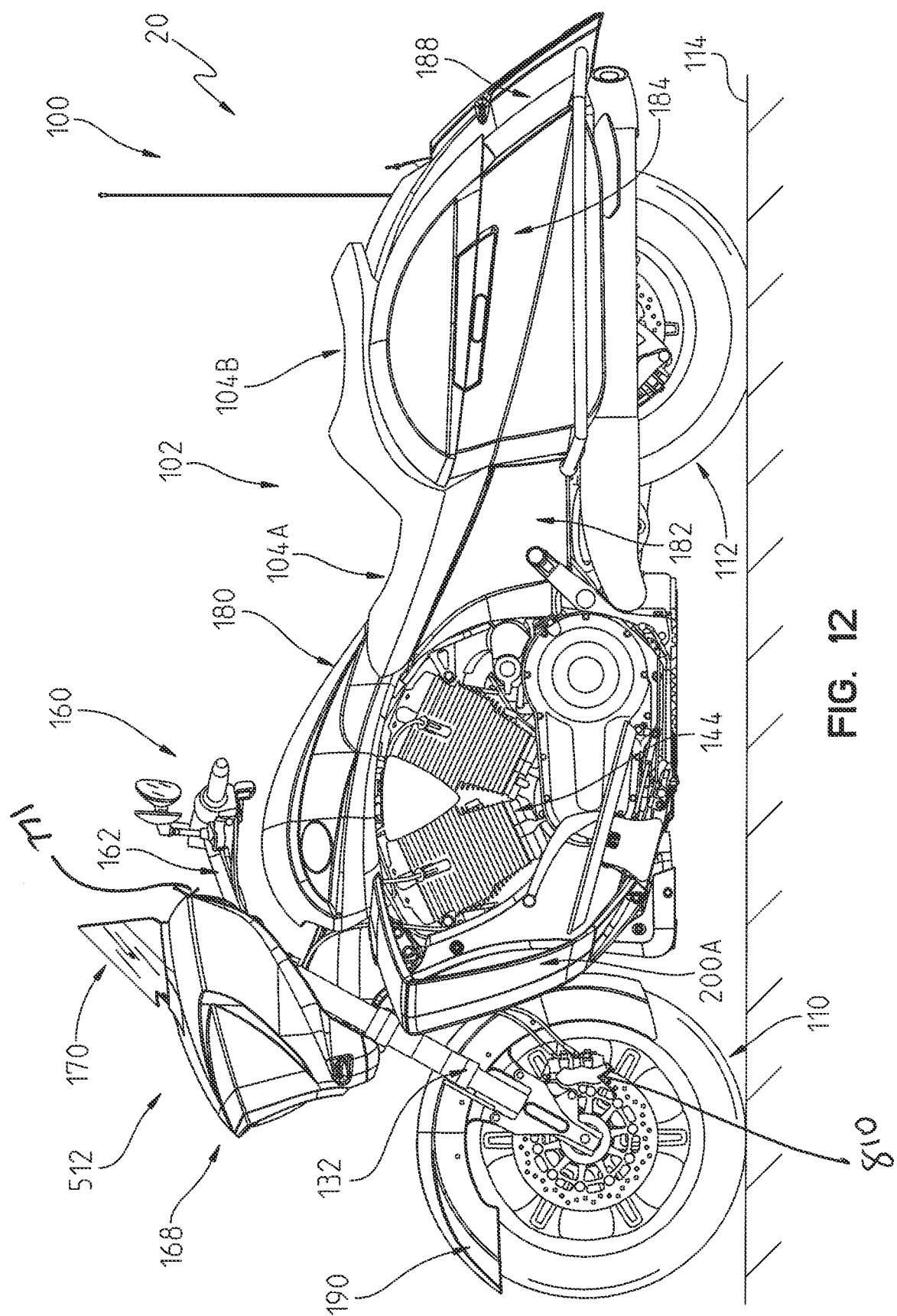
FIG. 12 illustrates a left side view of the two-wheeled vehicle of FIG. 10.
Figure 13:
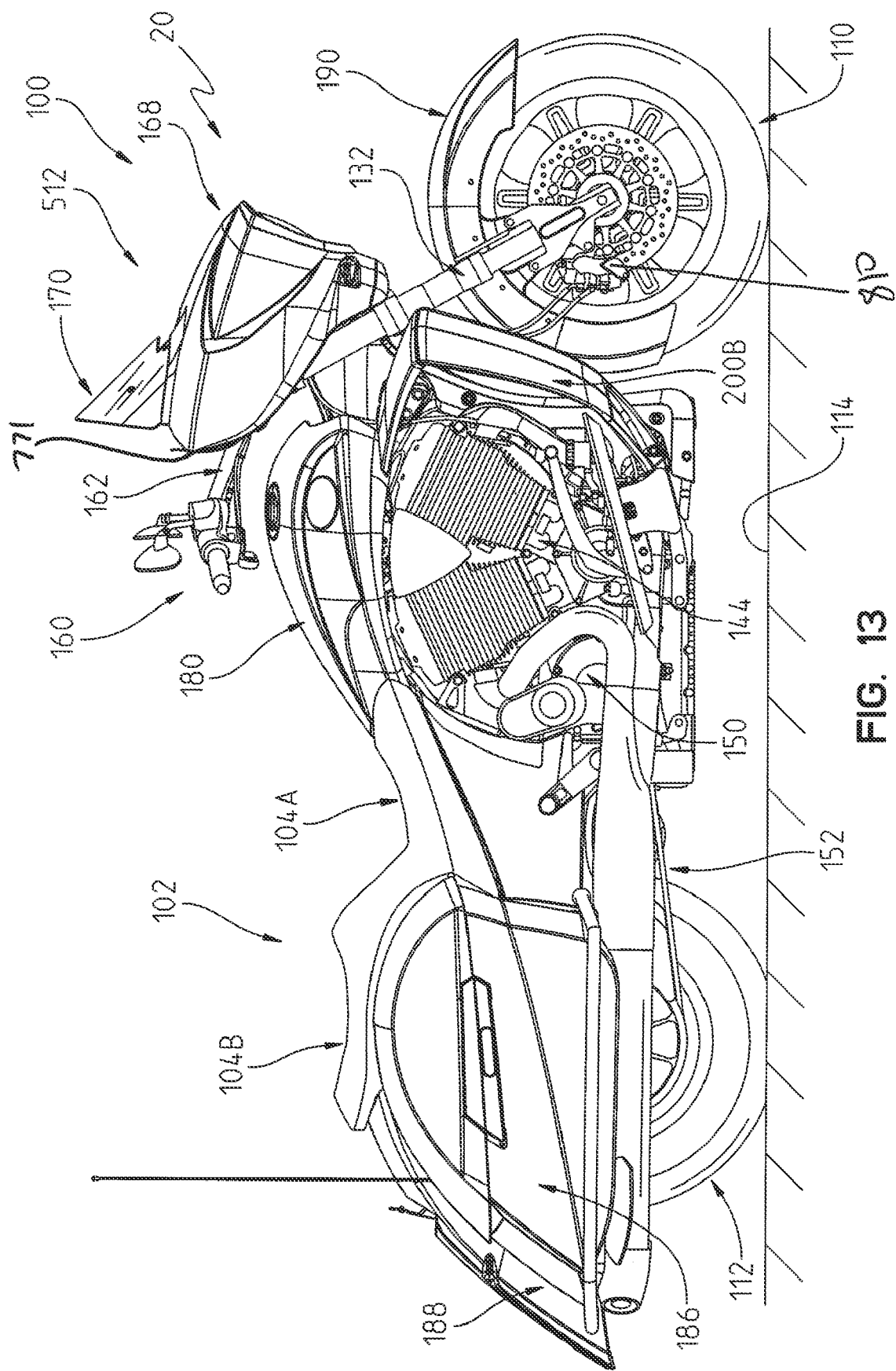
FIG. 13 illustrates a right side view of the two-wheeled vehicle of FIG. 10.
Figure 14:
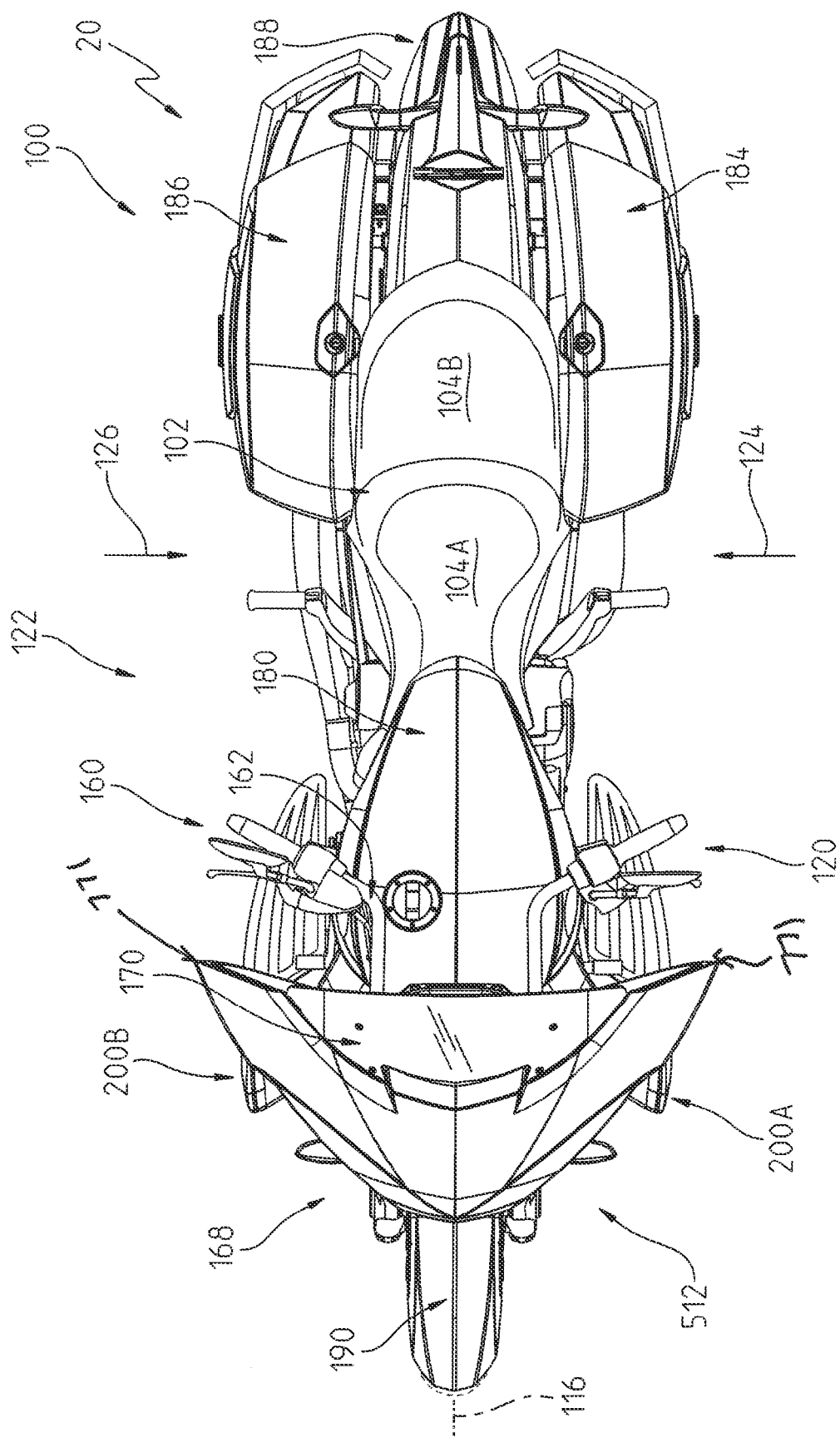
FIG. 14 illustrates a top view of the two-wheeled vehicle of FIG. 10.
Figure 15:
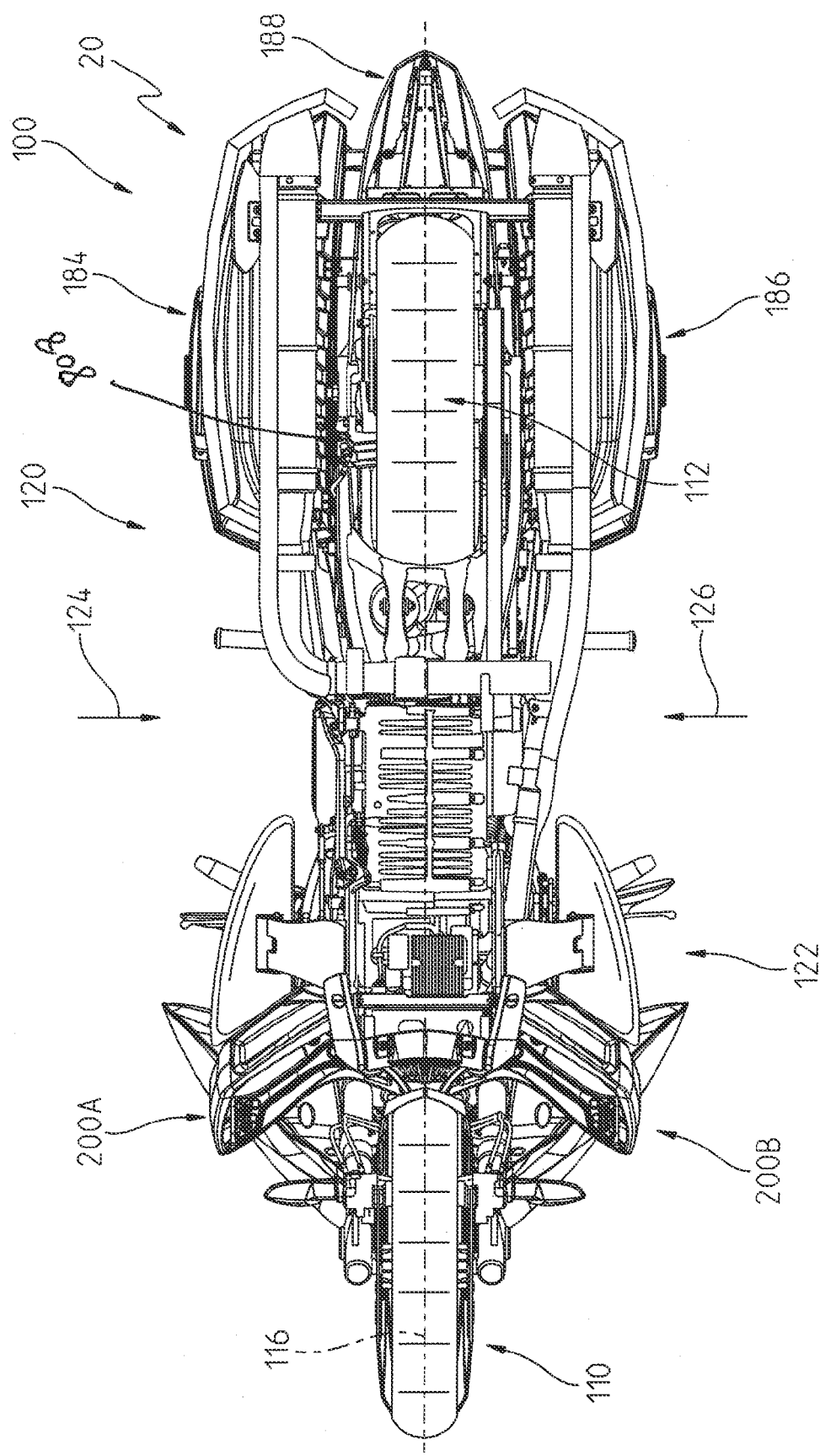
FIG. 15 illustrates a bottom view of the two-wheeled vehicle of FIG. 10.
Figure 17:
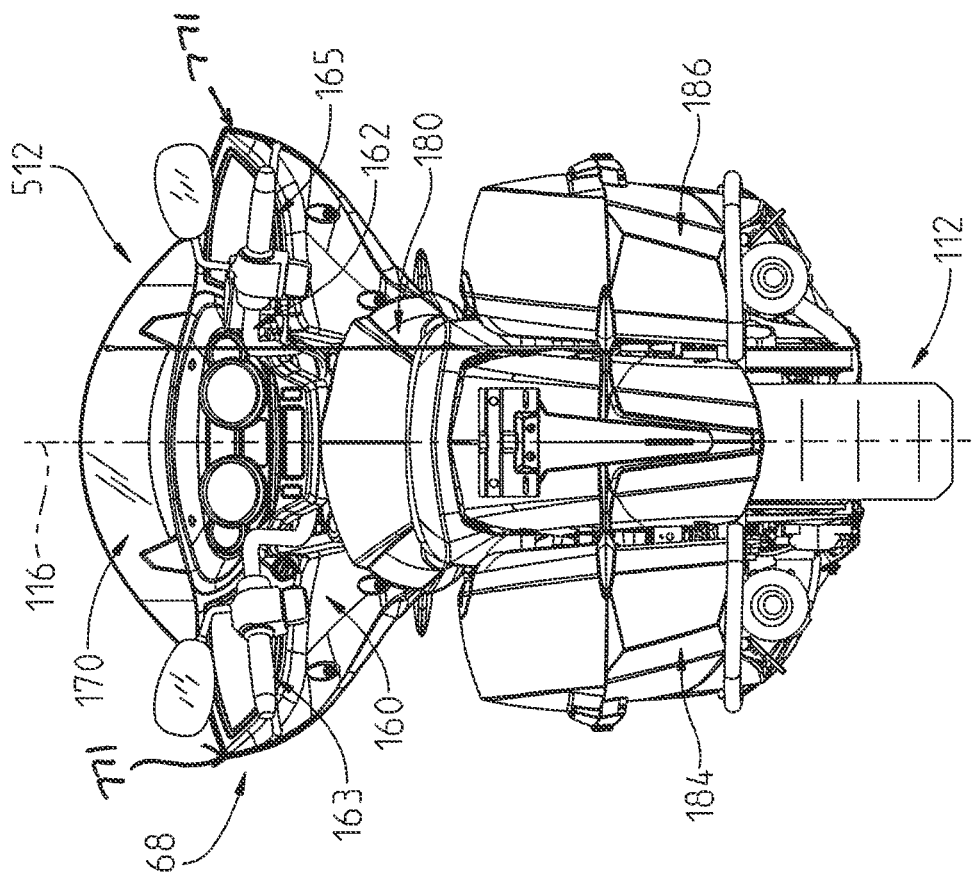
FIG. 17 illustrates a rear view of the two-wheeled vehicle of FIG. 10.
Figure 16:
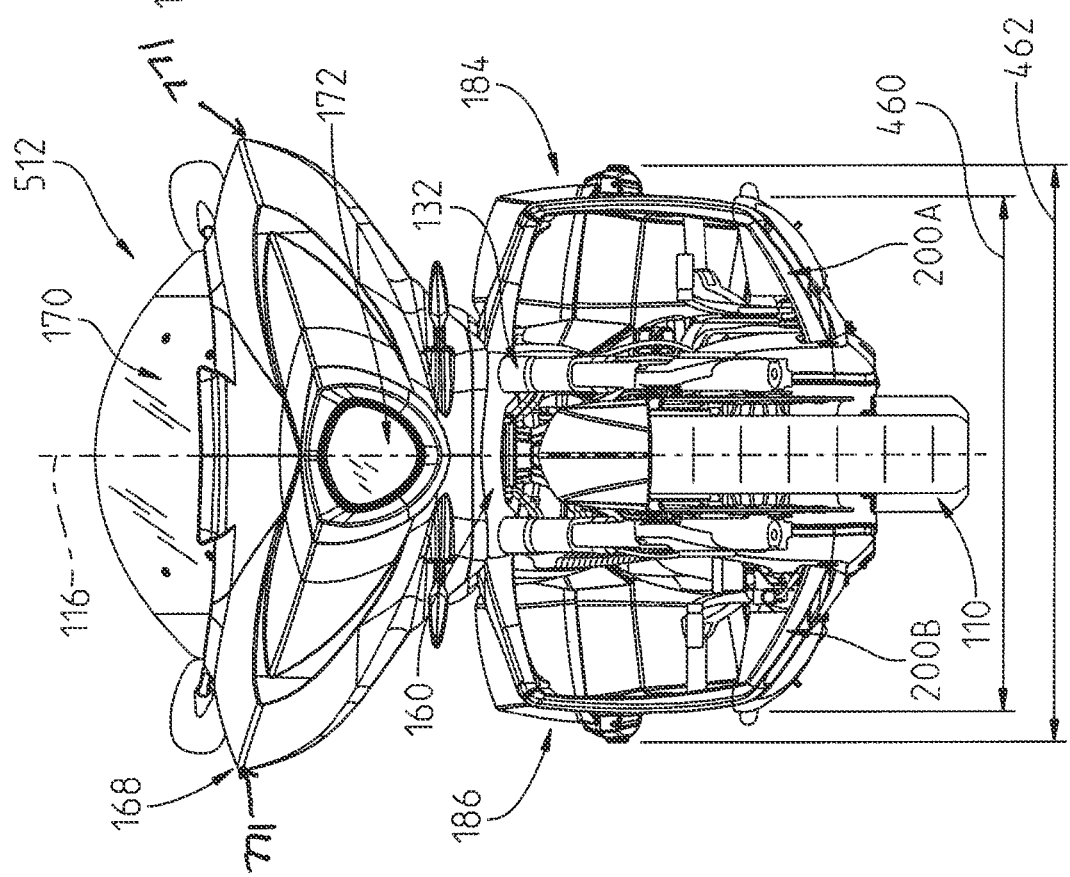
FIG. 16 illustrates a front view of the two-wheeled vehicle of FIG. 10.

Returning to FIG. 1, front wheel 110 is coupled to a steering assembly 160. Referring to FIG. 9, steering assembly 160 is shown. Steering assembly 160 includes handlebars 162 which include a left and right grip 163, 165. As is known in the art, each of left grip 163 and right grip 165 may be configured to control and/or have associated therewith one or more components to control the prime mover 144, the transmission 150 and/or the front and/or rear brakes of vehicle 100. Handlebars 162 may be moved by an operator to rotate front wheel 110 either to the left or the right.

As explained herein, for vehicle 10 steering assembly 160 supports a steering support assembly 510 including a removable windshield 164, a front light assembly 166, and various additional components. By contrast, as shown in FIG. 18 for vehicle 20 steering assembly 160 supports a steering support assembly 512 including a front fairing assembly 168 which in turn supports a windshield 170, a front light assembly 172, and various additional components.

Referring to FIG. 3, a fuel tank 180 is positioned between straddle seat 102 and steering assembly 160. Behind prime mover 144, a rear bodywork grouping 182 is provided. Rear wheel 112 is covered by a rear fender 188. In a similar fashion, front wheel 110 is covered by a front fender 190.

Referring to FIG. 5, a left side saddlebag 184 and a right side saddlebag 186 are provided. Saddlebags 184, 186 are each storage compartments supported by the frame and positioned proximate to the rear wheel 112. Saddlebags 184, 186 are positioned laterally outward of the rear wheel 112 and overlap a portion of the rear wheel 112 when viewed from directions 124, 126, respectively. In one embodiment, saddlebags 184 and 186 combine to provide about 21 gallons of storage space which does not intersect with centerline plane 116. In one embodiment, saddlebags 184 and 186 combine to provide at least about 21 gallons of storage space which does not intersect with centerline plane 116. Additional storage space may be provided with a trunk which is positioned on the vehicle 100 at a location which intersects with centerline plane 116.

Figure 26:
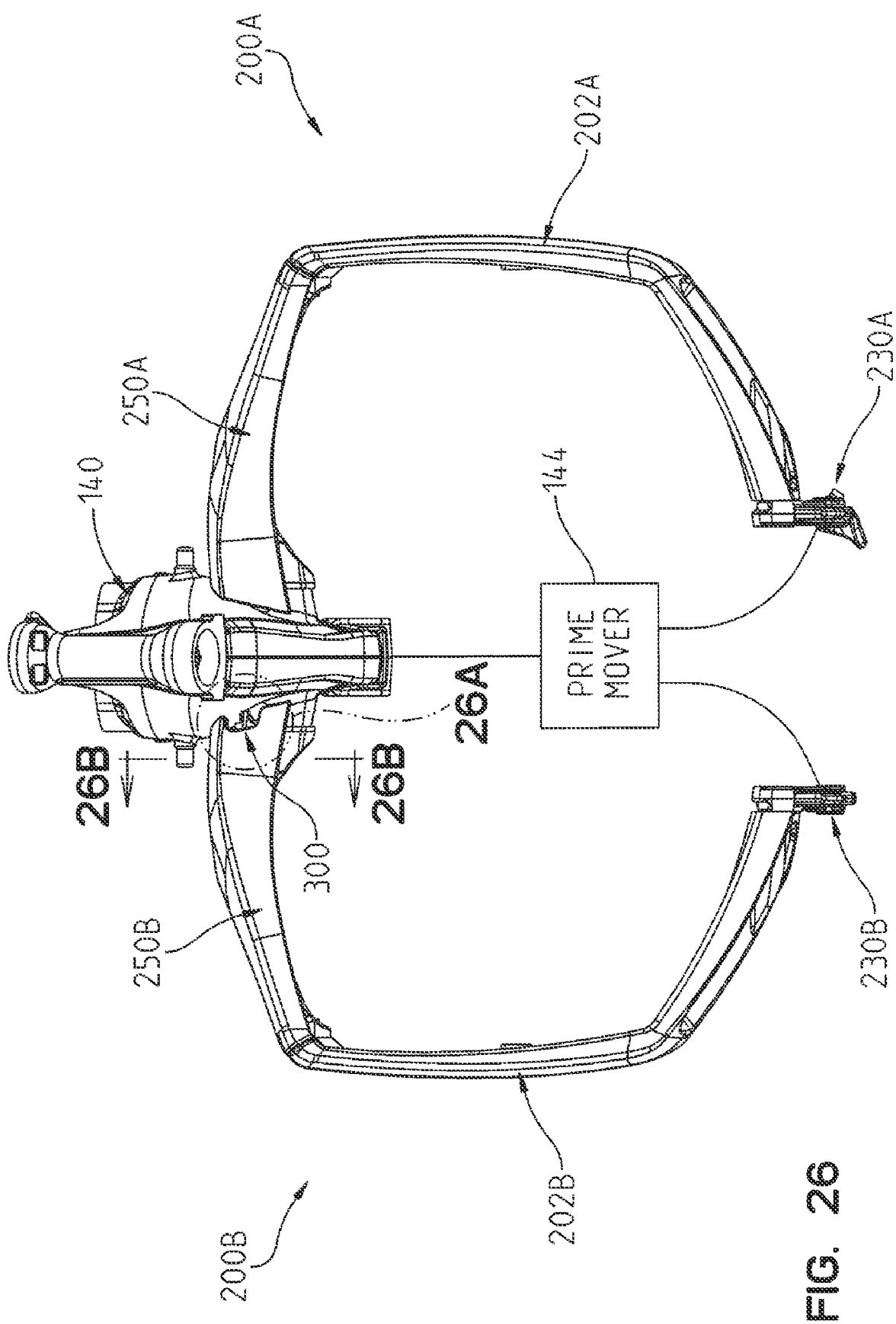
FIG. 26 illustrates a front view of the assembly of FIG. 20.

As shown in FIGS. 1-18, both vehicle 10 and vehicle 20 include a left side highway bar 200A and a right side highway bar 200B. Referring to FIG. 26, left side highway bar 200A and right side highway bar 200B are mirror images of each other with the exception that right side highway bar 200B includes provisions for routing wires or cables associated with the respective vehicle, as explained herein.

Figure 23:
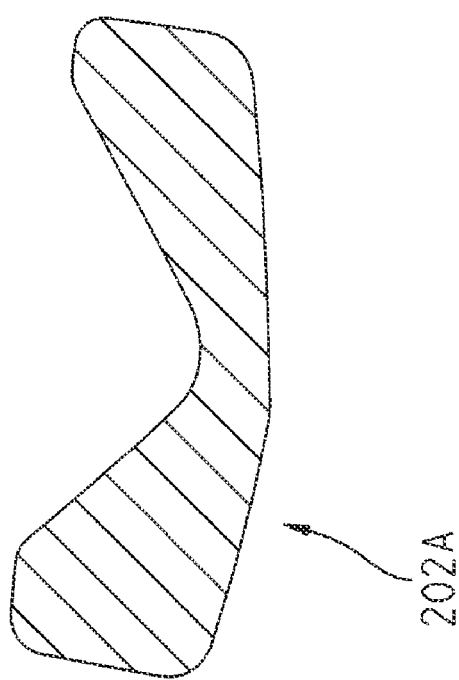
FIG. 23 illustrates a cross section of the left highway bar of FIG. 20 at a height indicated by plane 226 in FIG. 3.
Figure 25:
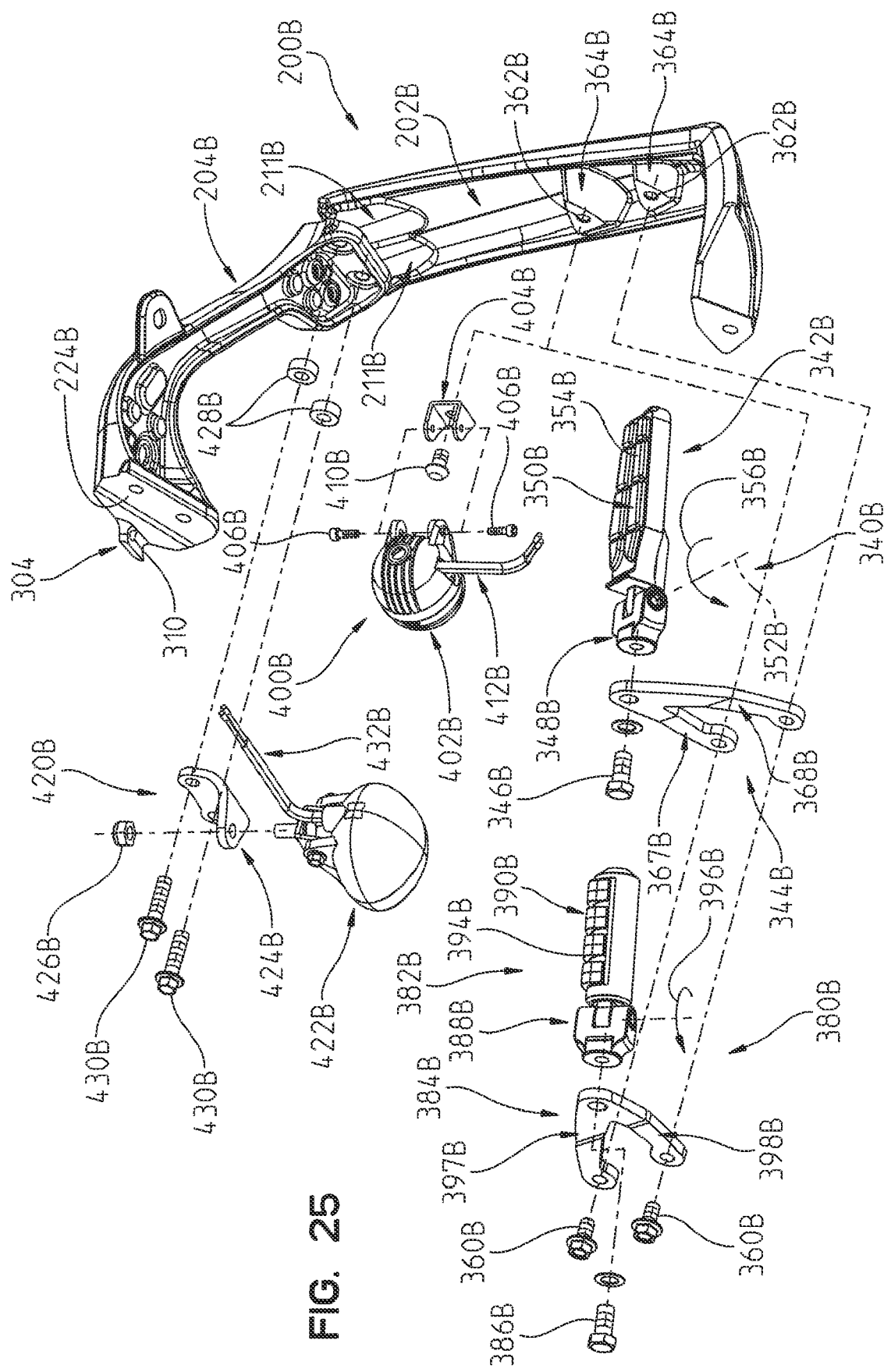
FIG. 25 illustrates several accessory devices for mounting to the right highway bar of the assembly of FIG. 20.

In one embodiment, left side highway bar 200A and right side highway bar 200B are highway bars having a solid cross-section at a height corresponding to at least one of horizontal plane 226 in FIG. 3 (which passes through a rotatable axis 227 of wheel 110), horizontal plane 288 in FIG. 3 (which passes through the top of wheel 110), and horizontal plane 229 in FIG. 3 (which is halfway between horizontal plane 226 and horizontal plane 228). In one embodiment, highway bars 200 have a solid cross-section between planes 226 and 228 as well. As used in connection with the horizontal cross-sections of highway bar 200, the term "solid" is defined to mean a cross-section without any intended encapsulated voids therein. This is in contrast to known highway bars which have a tubular construction. The definition of "solid" permits the cross-section to have any type of exterior shape, including but not limited to circular, oval, concave, convex, or complex which may include any suitable features, including but not limited lines, arcs, ellipses, splines, and any other types of features. Highway bar 200 has a non-cylindrical cross section. As shown in FIGS. 23 and 25, lower component 202B includes a generally concave shape. Further, the definition of "solid" permits the cross-section to include recesses, protrusions, and other mounting features, including but not limited tapped recesses and plateaus, and through holes having any suitable profile. The term "intended encapsulated voids" means a void (by way of example the hollow interior of a tubular member) included as part of the design and excludes all voids which are the result of the manufacturing process used to form the highway bar (by way of example air bubbles and material defects). In one embodiment, highway bar 200 may include a tubular cross-section at other locations.

Figure 24:
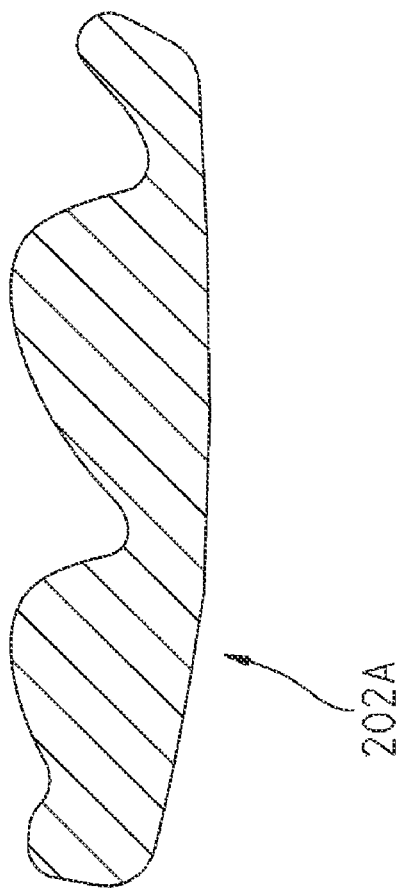
FIG. 24 illustrates a cross section of the left highway bar of FIG. 20 at a height indicated by plane 228 in FIG. 3.

In one embodiment, highway bar 200 includes a solid cross-section at a height corresponding to horizontal plane 226. This cross-section is shown in FIG. 23. In one embodiment, highway bar 200 includes a solid cross-section at a height corresponding to horizontal plane 228. This cross-section is shown in FIG. 24. In one embodiment, highway bar 200 includes a solid cross-section at a height corresponding to horizontal plane 229. In one embodiment, highway bars 200 include a solid cross-section at a height corresponding to horizontal plane 226 and at a height corresponding to horizontal plane 228. In one embodiment, highway bar 200 includes a solid cross-section at a height corresponding to horizontal plane 226 and at a height corresponding to horizontal plane 229. In one embodiment, highway bar 200 includes a solid cross-section at a height corresponding to horizontal plane 229 and at a height corresponding to horizontal plane 228. In one embodiment, highway bar 200 includes a solid cross-section at a height corresponding to horizontal plane 226 and at a height corresponding to horizontal plane 228 and therebetween. In one embodiment, highway bar 200 includes a solid cross-section at a height corresponding to horizontal plane 226 and at a height corresponding to horizontal plane 229 and therebetween. In one embodiment, highway bar 200 includes a solid cross-section at a height corresponding to horizontal plane 229 and at a height corresponding to horizontal plane 228 and therebetween.

In one embodiment, left side highway bar 200A and right side highway bar 200B both include one or more forged components which may be assembled together to form left side highway bar 200A and right side highway bar 200B, respectively. Exemplary forged components include aluminum forgings. Other types of components include molded components, cast components, and other suitable types of components. In an alternative embodiment, left side highway bar 200A and right side highway bar 200B include at least one tubular component.

Figure 22:
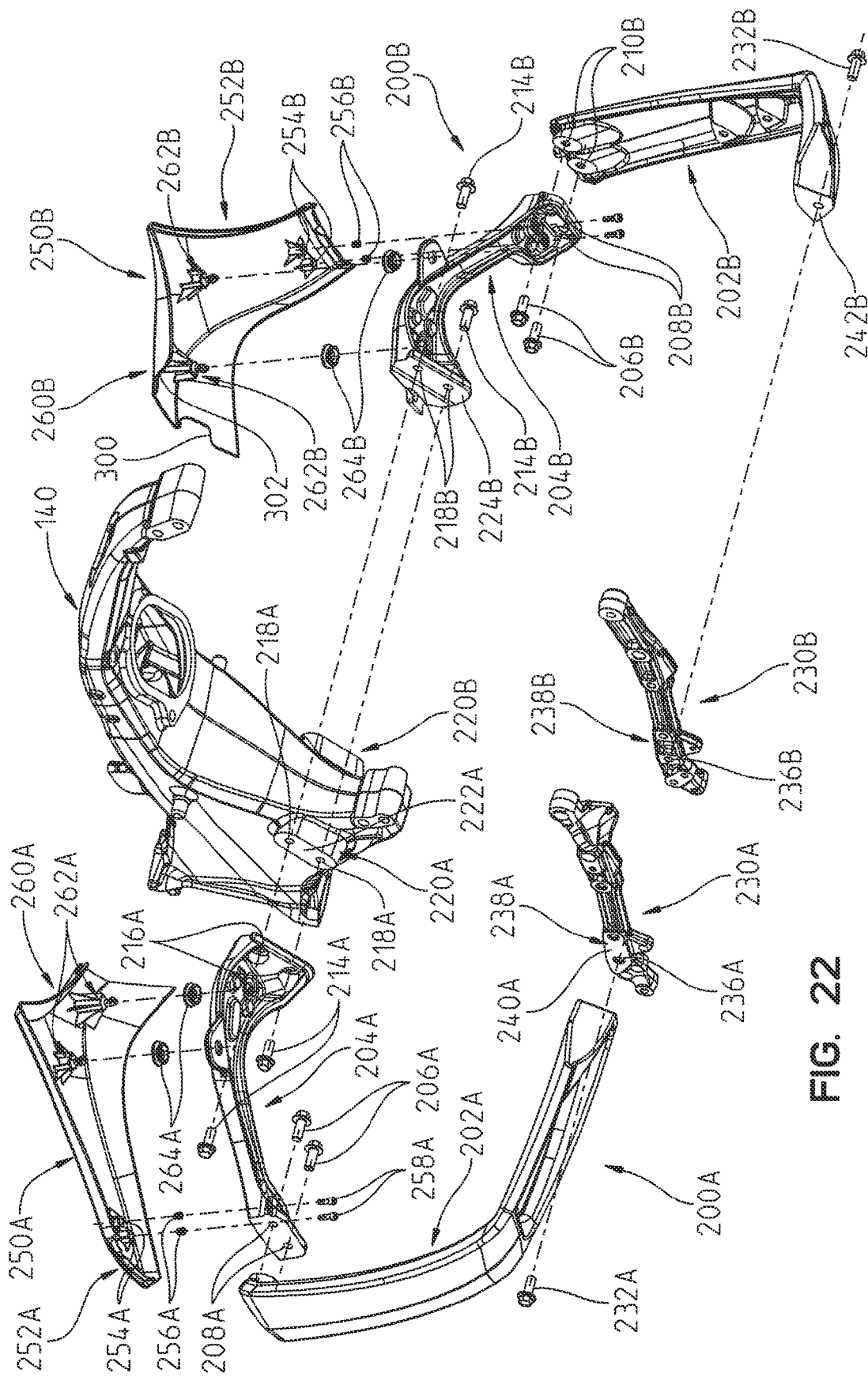
FIG. 22 illustrates an exploded view of the assembly of FIG. 20.

Referring to FIG. 22, each of left side highway bar 200A and right side highway bar 200B include a lower component 202 and an upper component 204. Lower component 202 and upper component 204 are coupled together through a plurality of couplers 206. In the illustrated embodiment, couplers 206 are bolts which pass through openings 208 in upper component 204 and are threaded in recesses 210 of mount features 211 of lower component 202. In one embodiment, lower component 202 and upper component 204 may be coupled together by any suitable method, such as interlocking features and welding.

Upper component 204A and upper component 204B are coupled to front frame member 140 with couplers 214. In the illustrated embodiment, couplers 214 are bolts which pass through openings 216 in upper component 204 and are threaded into recesses 218 in front frame member 140. In the illustrated embodiment, recesses 218 are provided in a mounting feature 220 of front frame member 140 which has a mating face 222 that is in contact with a mating face 224 of upper component 204. In one embodiment, mating face 222 and mating face 224 are flat. In one embodiment, upper component 204 and front frame member 140 may be coupled together by any suitable method, such as interlocking features and welding.

Upper component 204A and upper component 204B are coupled to respective frame members 230A and 230B of vehicle 100 with couplers 232. In the illustrated embodiment, couplers 232 are bolts which pass through openings 234 in lower component 202 and are threaded into openings 236 in frame members 230. In the illustrated embodiment, openings 236 are provided in a portion 238 of frame members 230 which has a mating face 240 that is in contact with a mating face 242 of lower component 202. In one embodiment, mating face 240 and mating face 242 are flat. In one embodiment, lower component 202 and frame members 230 may be coupled together by any suitable method, such as interlocking features and welding. In one embodiment, as represented in FIG. 26, frame members 230 are coupled to prime mover 144.

Referring to FIG. 5, each of left side highway bar 200A and right side highway bar 200B are angled toward the front of vehicle 100 and are positioned rearward of a vertical plane 244 passing through rotatable axis 227 of wheel 110. In one embodiment, highway bar 200 makes an angle 201 of about 55 degrees with centerline plane 116. In one embodiment, angle 201 is at least about 55 degrees. In one embodiment, angle 201 is greater than 0 degrees and up to about 55 degrees. In one embodiment, angle 201 is acute.

As shown in FIGS. 3 and 4, couplers 214 couple the respective highway bar 200 to front frame member 140 at a location forward of where couplers 232 couple the respective highway bar 200 to frame members 230. The angling and attachment locations provide for highway bar 200 to frame prime mover 144 and not overlap prime mover 144 when vehicle 100 is viewed from either direction 124 or direction 126. In one embodiment, a distance from coupler 232A and a vertical plane 244 (see FIG. 3) which passes through the axis of rotation 227 of front wheel 110 is about 19.6 inches (distance L in FIG. 3), a vertical distance from axis of rotation 227 down to coupler 232A is about 4.1 inches, a distance from the rearmost coupler 214A and plane 244 is about 16.8 inches (distance U in FIG. 3), and a vertical distance from axis of rotation 227 up to coupler 232A is about 15.2 inches. This results in a line that passes through the rearmost coupler 214A and coupler 232A to be angled at about 8 degrees forward relative to vertical (angle 246 in FIG. 3). In one embodiment, angle 246 is at least about 8 degrees. In one embodiment, angle 246 is greater than 0 degrees and up to about 8 degrees. In one embodiment, angle 246 is acute. In one embodiment, angle 246 is zero (coupler 214A is in line with coupler 232A).

Returning to FIG. 22, a removable cover 250 is provided for each of highway bars 200. In the illustrated embodiment, each cover 250 is coupled to the respective highway bar 200 and positioned to cover upper component 204. In one embodiment, cover 250 is made of a polymeric material. The polymeric material being paintable so that a color of cover 250 may match or complement a color of fuel tank 180 of vehicle. In one embodiment, cover 250 is made of a metallic material.

In the illustrated embodiment, cover 250 is coupled to upper component 204 in the following manner. An outer portion 252 of cover 250 includes a plurality of bosses 254 having inserts 256 therein. Screws 258 extend through upper component 204 and are threaded into inserts 256 to couple removable cover 250 to upper component 204. An inner portion 260 of cover 250 includes a plurality of attachment members 262 which have an enlarged head that snaps into retainers 264 which are secured to upper component 204 (see FIG. 26B). Exemplary retainers include rubber grommets.

Figure 27:
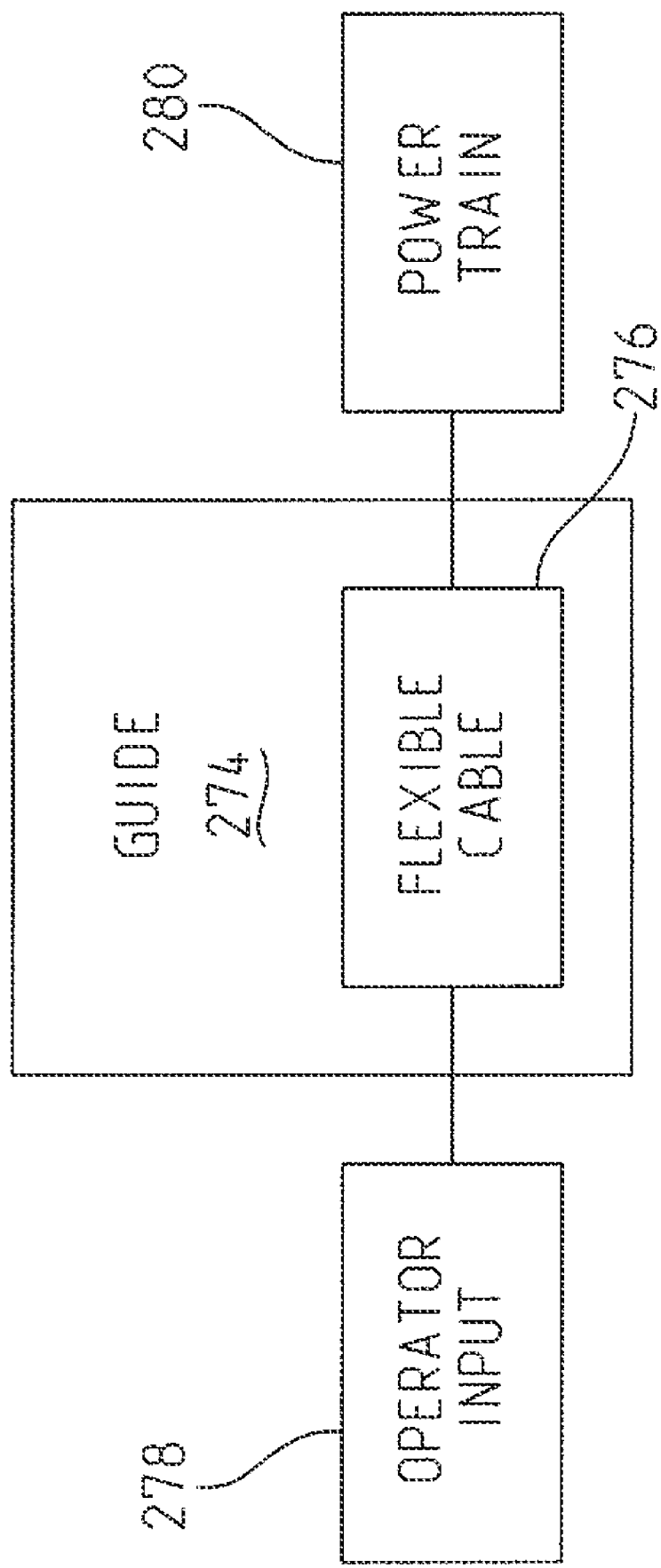
FIG. 27 illustrates a representative view of a prime mover control system.

Referring to FIG. 27, vehicle 100 includes a guide 274 which guides a flexible cable 276. Flexible cable 276 is coupled to an operator input 278 of vehicle 100 and to a power train 280 of vehicle 100. Operator input 278 controls one or more operations of power train 280. Exemplary operator input 278 includes levers, switches, rotatable grips, and other suitable input members. Exemplary components of power train 280 include prime mover 144, transmission 150, a clutch 290, and other suitable components of vehicle 100 which relate to powering the movement of vehicle 100. Actuation of the input member results in a movement of flexible cable 276 which is communicated to power train 280 to alter the operation of power train 280.

Figure 28:
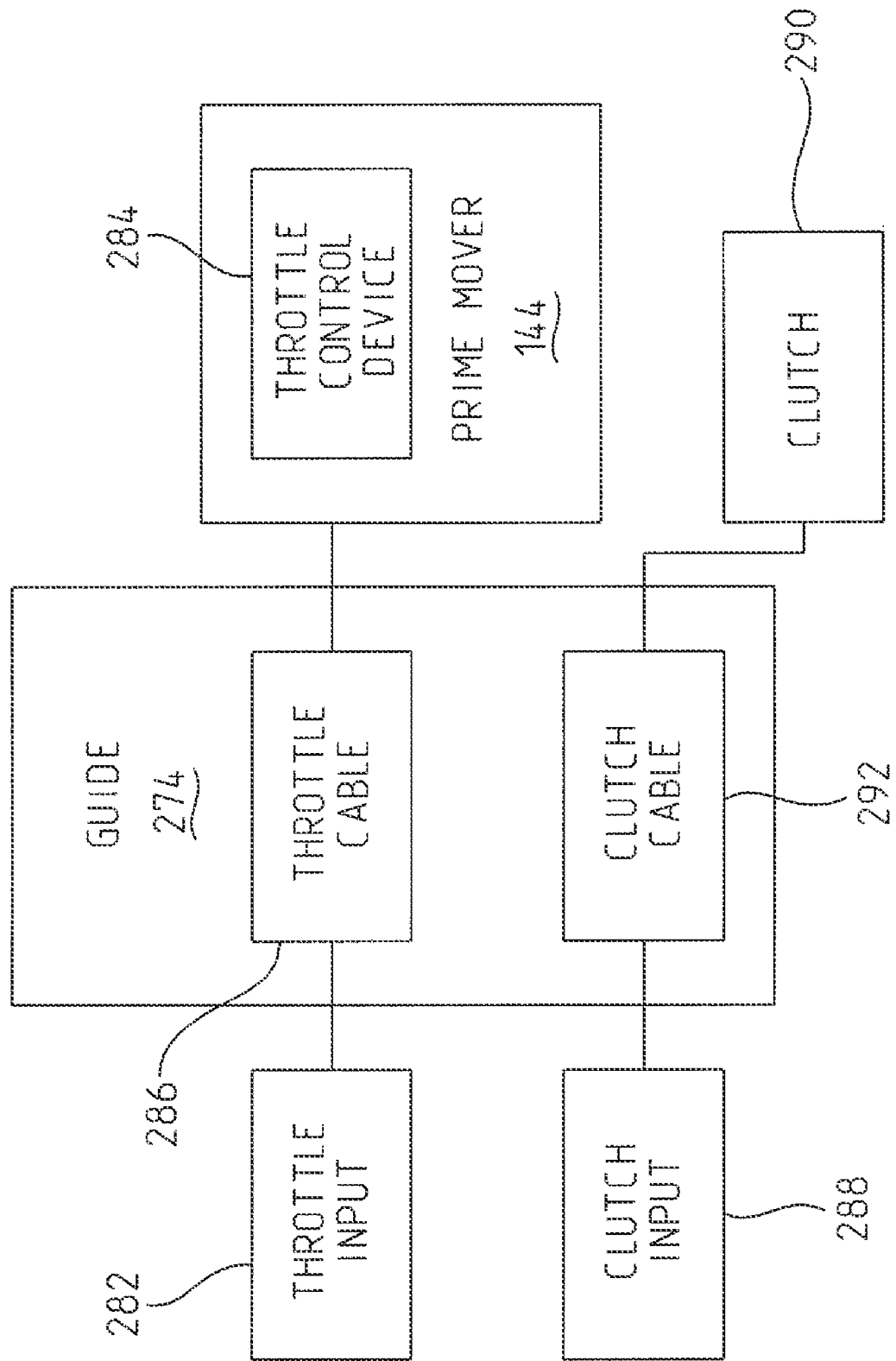
FIG. 28 illustrates a representative view of throttle control system and a clutch control system.

Referring to FIG. 28, in one embodiment, a first operator input, a throttle input 282 is provided. Throttle input 282 is coupled to a throttle control device 284 of prime mover 144 through a throttle cable 286. An exemplary throttle control device is a throttle valve. A second operator input, a clutch input 288 is provided. Clutch input 288 is coupled to a clutch 290 of vehicle 100 through a clutch cable 292. Clutch 290 permits the shifting of gears of transmission 150.

Figures 26A, 26B:
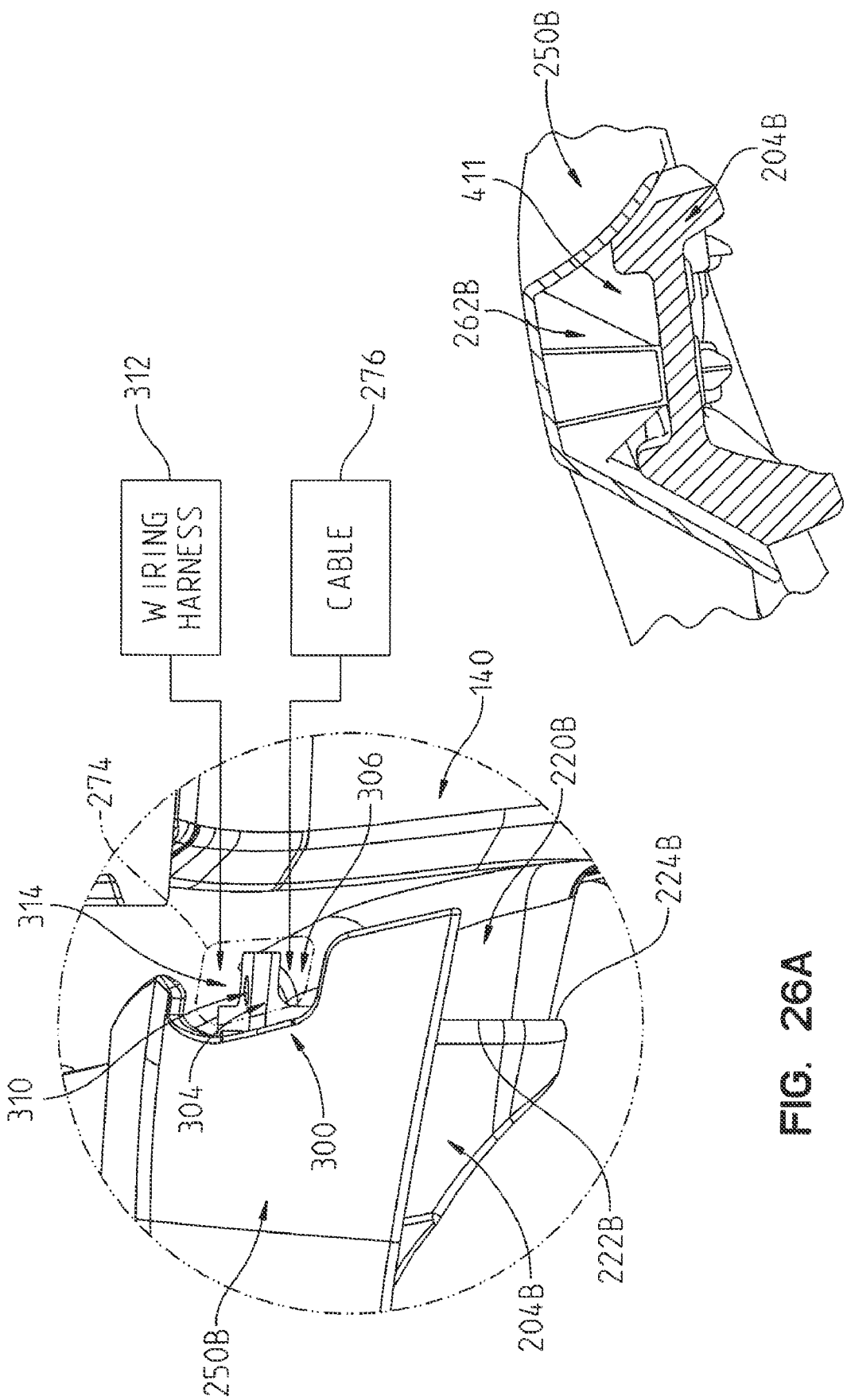
FIG. 26A illustrates a detail view of a portion of the right highway bar assembled to the front frame member with a cover of the right highway bar removed for illustrative purposes.
FIG. 26B illustrates a sectional view of the right side highway bar and cover along lines 26B-26B in FIG. 26.

Referring to FIG. 26A, an illustrative example of guide 274 is shown. Cover 250B includes a first recess 300 and a second recess 302 (see FIG. 22) which provide access to guide 274. Guide 274 is provided by the cooperation of right side highway bar 200B and front frame member 140. Upper component 204B includes a tab 304. Tab 304 is spaced apart from the sides of mounting feature 220B of front frame 140. Cable 276 is located in a channel 306 provided between mounting feature 220B of front frame member 140 and tab 304 of upper component 204B. Flexible cable 276 is loosely constrained in channel 306 and is free to move back and forth.

Tab 304 includes a hole 310 which receives a zip tie (not shown) which is used to secure a wiring harness 312 of vehicle 100 to a top portion of tab 304 in region 314 of guide 274. Wiring harness 312 through the zip tie is tied to tab 304.

Referring to FIG. 25, various accessories 330 are shown which may be mounted to highway bar 200. FIG. 25 illustrates the mounting to right side highway bar 200B. In general, accessories 330 are provided in pairs with one of the pair being mounted to left side highway bar 200A and the other being mounted to right side highway bar 200B. Exemplary accessories include foot pegs, lights, closeouts, and other suitable accessories. Closeouts are coverings which block air flow and may carry cargo and are typically made of fabric, leather, plastic or fiber-glass.

A foot peg accessory 340 is shown in FIG. 25. Foot peg accessory 340 includes a foot support member 342, a bracket 344, and a coupler 346 which coupled the foot support member 342 to the bracket 344. An exemplary coupler 346 is a bolt. Foot support member 342 includes a base member 348 and a foot peg 350. Foot peg 350 is rotatably coupled to base member 348. In the position shown in FIG. 25, an operator's foot may engage surface 354 of foot peg 350 during use of foot peg accessory 340. Foot peg 350 may be rotated in direction 356 by about 90 degrees to place foot peg accessory 340 in a stored position.

Bracket 344 is mounted to lower component 202 through couplers 360 which are threaded into recesses 362 of mount features 364 of lower component 202. Exemplary couplers are bolts. Referring to FIG. 33A, mount features 364 are not visible when viewing vehicle 100 from direction 124 (see FIG. 5). Bracket 344 includes two legs 367 and 368 which are of different length. As such, in the orientation shown in FIG. 25, bracket 344 positions foot support member 342 at a first height 370 (see FIG. 33A). Bracket 344 may also be flipped (leg 368 on top) and mounted to mount features 364. In the flipped orientation, bracket 344 positions foot support member 342 at a second height 372 (see FIG. 33A).

Another foot peg accessory 380 is also shown in FIG. 25. Foot peg accessory 380 includes a foot support member 382, a bracket 384, and a coupler 386 which couples the foot support member 382 to the bracket 384. An exemplary coupler 386 is a bolt. Support member 382 includes a base member 388 and a foot peg 390. Foot peg 390 is rotatably coupled to base member 388. In the position shown in FIG. 25, an operator's foot may engage surface 394 of foot peg 390 during use of foot peg accessory 380. Foot peg 390 may be rotated in direction 396 by about 90 degrees to place foot peg accessory 380 in a stored position.

Bracket 384 is mounted to lower component 202 through couplers 360 which are threaded into apertures 362 of mount features 364 of lower component 202. Exemplary couplers are bolts. Bracket 384 includes two legs 397 and 398 which are of different length. As such, foot peg accessory 380 like foot peg accessory 340 may be mounted to highway bar 200 at two different heights.

Another accessory is a light assembly 400. Light assembly 400 includes a light unit 402, a bracket 404, and couplers 406 which couple light unit 402 to bracket 404. In one embodiment, light units 402 are auxiliary driving lights. In one embodiment, light units 402 are turn indicators. A coupler 410 couples bracket 404 to mount features 364. Bracket 404 may be coupled directly to mount features 364 or may be coupled to mount features 364 in series with bracket 344. When coupled in series, couplers 360 couple both bracket 404 and bracket 344 to mount features 364.

Light assembly 400 further includes at least a pair of wires 412 which are coupled to a power source of vehicle 100. The power source provides power to light assembly 400 to operate light assembly 400. Wires 412 are routed between upper component 204 and removable cover 250 to at least partially hide wires 412. Upper component 204 has a generally I-beam shape for strength. The I-beam shape also provides a channel 411 (see FIG. 26B) in an upper portion of upper component 204 wherein wires 412 are located.

Still another accessory is a light assembly 420. Light assembly 420 includes a light unit 422, a bracket 424, and a coupler 426 which couple light unit 422 to bracket 424. In one embodiment, light units 422 are auxiliary driving lights. In one embodiment, light units 422 are turn indicators. A coupler 430 couples bracket 424 to mount features 211. Spacers 428 are provided between upper component 204 and bracket 424 due to the generally I-beam shape of upper component 204.

Light assembly 420 further includes at least a pair of wires 432 which are coupled to a power source of vehicle 100. The power source provides power to light assembly 420. Wires 432 are routed between upper component 204 and removable cover 250 to at least partially hide wires 432.

In one embodiment, highway bar 200 provides tip-over protection in low speed or stationary events. Vehicle 100 may be leaned over and highway bar 200 will reduce the chance that vehicle 100 will land on its side. Rather, highway bar 200 keeps vehicle 100 from resting on its side.

Referring to FIG. 7, highway bar 200 have a first transverse extent 460 which is centered relative to centerline plane 116. Extent 460 of highway bar 200 is less than an overall transverse extent 462 of vehicle 100. In one embodiment, extent 460 is about 32.1 inches and extent 462 is about 35.9 inches. In one embodiment, first transverse extent 460 is about 89 percent of overall transverse extent 462. In one embodiment, first transverse extent 460 is less than overall transverse extent 462. In one embodiment, first transverse extent 460 is up to about 88 percent of overall transverse extent 462.

Figure 29:
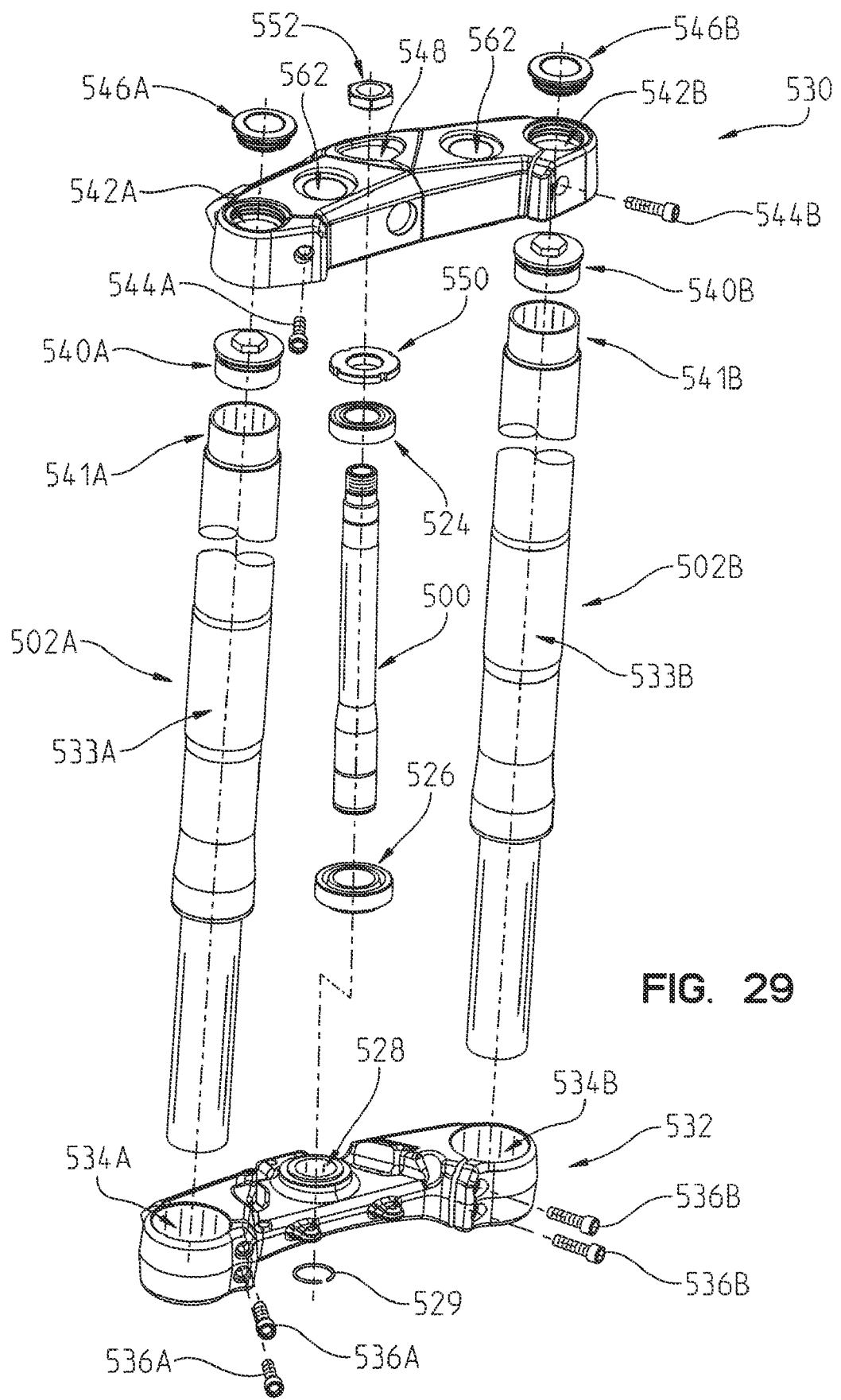
FIG. 29 illustrates an exploded view of a portion of a steering system.

Turning to FIG. 29, steering assembly 160 includes a steering post 500, a left fork 502A, and a right fork 502B. Steering post 500 of steering assembly 160 passes through a fork journal 504 of front frame member 140 as shown in FIG. 30. Sealed bearings 524 and 526 are pressed into a top portion and a bottom portion of fork journal 504 and facilitate the rotation of steering post 500 relative to front frame member 140. Left fork 502A is positioned on a left side of front frame member 140 and right fork 502B is positioned on a right side of front frame member 140. As shown in FIG. 33, fork journal 504 is generally positioned forward of left fork 502A and right fork 502B. As such, steering post 500 is generally positioned forward of left fork 502A and right fork 502B.

In addition, steering post 500 is angled relative to forks 502. Steering post 500 has a steering axis 506 which is angled relative to an axis 508A of left fork 502A. Right fork 502B also includes a fork axis which is parallel with fork axis 508A. Referring to FIG. 33A, steering axis 506 makes a first angle ($\angle$SA) with a horizontal plane, illustratively the ground 114. This results in a caster angle ($\angle$CA) of ninety minus the value the first angle ($\angle$SA). Fork axis 508A makes a second angle ($\angle$FA) with the ground. Both first angle ($\angle$SA) and second angle ($\angle$FA) are acute angles. First angle ($\angle$SA) is larger than second angle ($\angle$FA). In one embodiment, first angle ($\angle$SA) is equal to about 65 degrees and second angle ($\angle$FA) is equal to about 61 degrees. In one embodiment, each of first angle ($\angle$SA) and second angle ($\angle$FA) are between about 5 degrees and about 70 degrees. In one example, first angle ($\angle$SA) is up to about 70 degrees and second angle ($\angle$FA) is up to about 60 degrees. In one example, the difference between first angle ($\angle$SA) and second angle ($\angle$FA) (($\angle$SA)−($\angle$FA)) is up to about 10 degrees.

The position of steering post 500 results in steering axis 506 intersecting ground 114 at a point SA which is a distance $TR_S$ from a wheel contact point, WC. $TR_S$ corresponds to the amount of trail of vehicle 100. In one embodiment, $TR_S$ is equal to about 5.2 inches. In one embodiment, $TR_S$ is at least about 2 inches. In one embodiment, $TR_S$ is up to about 8 inches. In one embodiment, $TR_S$ is in a range from about 2 inches to about 8 inches. In one embodiment, $TR_S$ is in a range from about 3 inches to about 6 inches.

In one embodiment, fork axis 508 passes through front wheel axis 227. In one embodiment, both fork axis 508 and steering axis 506 pass through front wheel axis 227.

Figure 34:
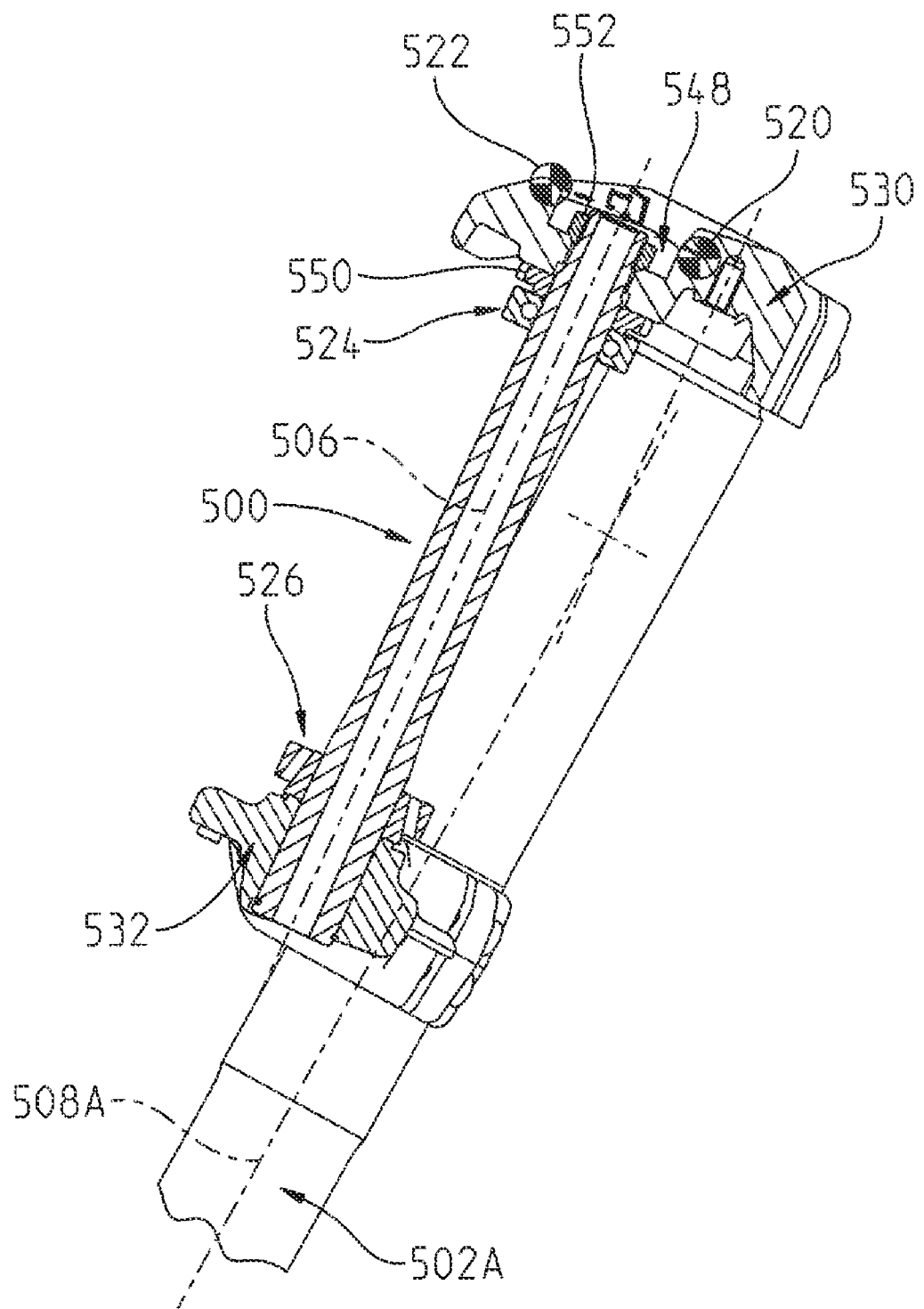
FIG. 34 illustrates a sectional view of the assembly FIG. 33 along the longitudinal plane of FIG. 5.

In one embodiment, steering post 500 is forward of fork 502 and angled upward relative thereto to balance the steering effort between when vehicle 100 is configured as vehicle 10 and as vehicle 20. Referring to FIG. 34, a center of mass 520 for a steering support assembly 510 (see FIG. 1) of vehicle 10 is shown along with a center of mass 522 for a steering support assembly 512 (see FIG. 10) of vehicle 20. Both center of mass 520 and center of mass 522 correspond to the components which are supported by steering assembly 160 in vehicle 10 and vehicle 20, respectively, and not the overall center of mass for vehicle 10 and vehicle 20, respectively. Steering support assembly 510 includes all of the components of vehicle 10 supported by steering assembly 160 and includes removable windshield 164 and front light assembly 166. Steering support assembly 512 includes all of the components supported by steering assembly 160 for vehicle 20 and includes front fairing assembly 168, windshield 170, and front light assembly 172. In one embodiment, steering support assembly 510 weighs about fifteen pounds and steering support assembly 512 weighs about thirty-five pounds. Additional details regarding the components included within steering support assembly 510 and steering support assembly 512 are provided herein in FIGS. 36-43.

In the illustrated embodiment, center of mass 520 is positioned between steering axis 506 and fork axis 508 while center of mass 522 is positioned forward of both steering axis 506 and fork axis 508. In the illustrated embodiment, center of mass 520 is positioned about 13 inches rearward of front wheel axis 227 and about 25 inches above front wheel axis 227 and center of mass 522 is positioned about 11 inches rearward of front wheel axis 227 and about 26 inches above front wheel axis 227. Mass supported by steering assembly 160 affects the handling of vehicle 100 much more than the mass in saddle bag 184 and 186. By having steering axis 506 split center of mass 520 and center of mass 522 the handling of vehicle 100 is improved regardless of whether vehicle 100 is configured as vehicle 10 or vehicle 20. In one embodiment, center of mass 522 is about 1.10 inches forward of steering axis 506 (measured along a normal to steering axis 506—see FIG. 34) and center of mass 520 is about 1.14 inches rearward of steering axis 506 (measured along a normal to steering axis 506—see FIG. 34). By having the steering axis 506 pass between center of mass 520 and center of mass 522 the distance from each of center of mass 520 and center of mass 522 to steering axis 506 may be minimized. In one embodiment, steering axis 506 intersects center of mass 520. In one embodiment, steering axis 506 intersects center of mass 522.

Returning to FIG. 29, steering post 500 and fork 502 are coupled together through a plurality of coupling members. Illustratively, an upper triple clamp 530 and a lower triple clamp 532 are shown. Steering post 500 is received in an opening 528 of lower triple clamp 532 and secured thereto with a snap ring 529 (see FIG. 34). Portions 533 of fork 502 are received in openings 534 of lower triple clamp 532. Portions 533 are secured to lower triple clamp 532 through couplers 536 which cause the size of openings 534 to contract and clamp around portions 533. Since steering axis 506 is angled relative to fork axis 508, opening 528 is set at a different angle than openings 534.

Turning to upper triple clamp 530, upper portion 541 of forks 502 are received in openings 542 in upper triple clamp 530. Prior thereto, plugs 540 are placed in upper portion 541 to seal an interior of upper portion 541. Upper portions 541 are secured to upper triple clamp 530 through couplers 544 which cause the size of openings 542 to contract and clamp around upper portion 541. Caps 546 are placed over openings 542.

Steering post 500 is also secured to upper triple clamp 530. However, since steering post 500 is angled relative to forks 502, the size of the opening 548 in upper triple clamp 530 for steering post 500 is oversized so that steering post 500 may be received in opening 548. A spacer 550 is placed on top of sealed bearings 524 prior to upper triple clamp 530 being placed over steering post 500. A coupler 552 is threaded onto steering post 500 to secure steering post 500 to upper triple clamp 530. Coupler 552 includes a chamfered side which centers steering post 500 relative to opening 548 as shown in FIG. 34. This arrangement allows steering post 500 and forks 502 to be coupled to upper triple clamp 530 and lower triple clamp 532 while maintaining upper triple clamp 530 and lower triple clamp 532 generally parallel.

Figure 35:
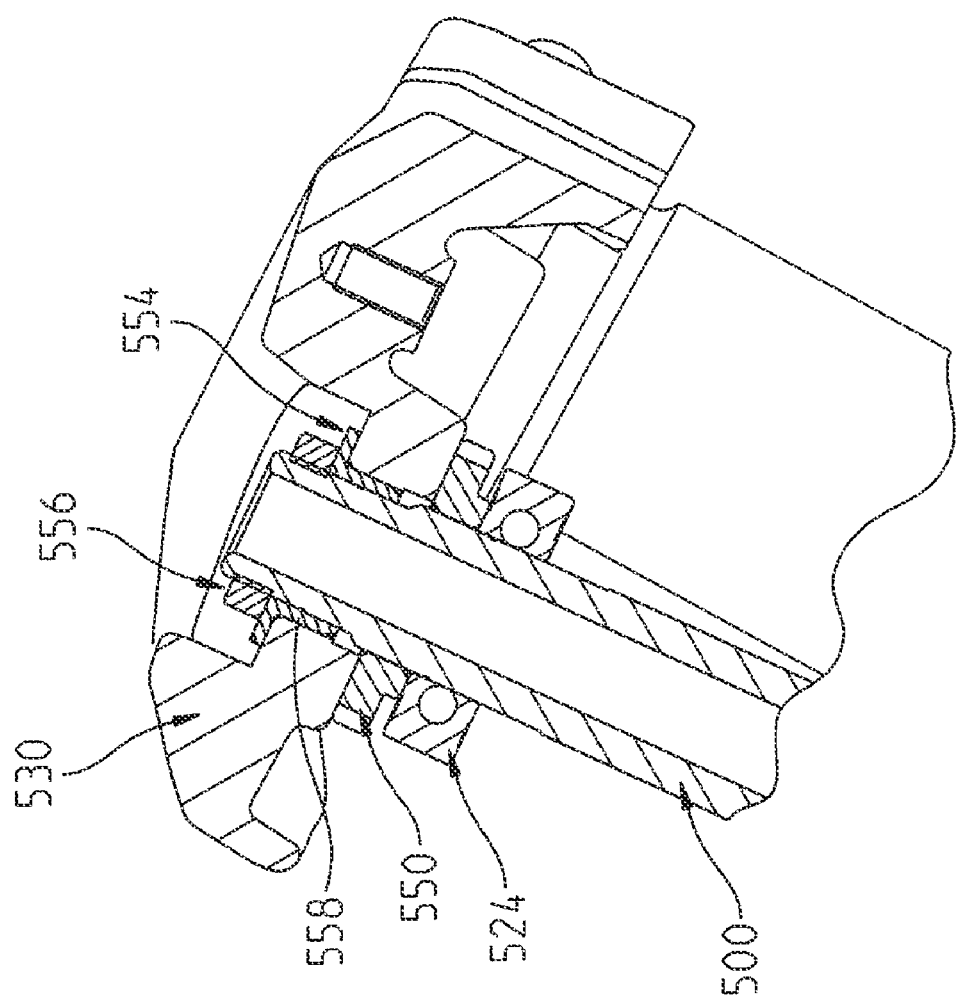
FIG. 35 illustrates a second embodiment of assembling the steering post to the upper triple clamp of the steering system.

Referring to FIG. 35, in one embodiment coupler 552 is replaced with a spacer 554 and a coupler 556. Spacer 554 is generally hat-shaped and includes an upstanding portion 558 which centers steering post 500 relative to upper triple clamp 530.

By having the size of opening 548 be oversized, the complexity of the assembly vehicle 100 is reduced. Forks 502 may be assembled to lower triple clamp 532 off line and then brought to the main assembly line for assembling to frame 140. The added complexity with vehicle 100 is due to the fact that steering axis 506 is not parallel to fork axis 508. When the fork legs and the steering axes are non-parallel, more clearance between the steering post and the top triple clamp is needed in order to achieve this assembly step. However, once the parts are assembled, tight clearances between the top triple clamp and the steering post are required in order to minimize play in the steering assembly and ensure that the front wheel does not deflect laterally or longitudinally due to slippage between the top triple clamp and the steering stem.

In one embodiment, the steering assembly is assembled as follows. Lower triple clamp 532 and steering post 500 are assembled together with sealed bearing 526 placed around steering post 500. This assembly is mounted in a fixture to hold it. Left and right fork members 502 are assembled to the assembly. Couplers 536 are tightened partway to couple forks 502 to lower triple clamp 532. Front wheel 110, front fender 190, and other components, such as brakes, are coupled to forks 502. This assembly, referred to herein as the front subassembly, is then moved to the main production line for assembly to front frame member 140. The front subassembly is placed into a manipulator and assembled to the frame 140 which already contains sealed bearings 524 and the race for sealed bearings 526. Spacer 550 is coupled to steering post 500. Upper triple clamp 530 is placed over the fork legs 502 and steering post 500. Upper triple clamp 530 is slid down until it bottoms out on spacer 550. Assuming the embodiment in FIG. 35 is being implemented, spacer 554 is installed in upper triple clamp 530 to center upper triple clamp 530 on steering post 500. Coupler 556 is coupled to steering post 500. All of couplers 544 and couplers 536 are tightened to secure forks 502 to upper triple clamp 530 and lower triple clamp 532, respectively.

Referring to FIG. 31, for vehicle 10 handlebar 162 is coupled to upper triple clamp 530 through a handlebar riser 560. Handlebar riser 560 is inserted into openings 562 (see FIG. 29) in upper triple clamp 530 and is secured to upper triple clamp 530 with couplers 564. Handlebar riser 560 includes a clamp portion 565 which secures handlebar 162. Clamp portion 565 is tightened through couplers 568. Illustratively, couplers 568 are screws which may be tightened to secure the orientation of handlebar 162 relative to upper triple clamp 530 and loosened to permit adjustment of the orientation of handlebar 162 relative to upper triple clamp 530. This permits the easy adjustment of handlebar 162 without removal of the fairing.

Referring to FIG. 32, in vehicle 20 handlebar 162 is coupled to upper triple clamp 530 through a handlebar riser 570. Handlebar riser 570 is inserted into openings 562 (see FIG. 29) in upper triple clamp 530 and is secured to upper triple clamp 530 with couplers 574. Handlebar riser 570 includes a clamp portion 575 which secures handlebars 162. Clamp portion 575 is tightened through couplers 578. Illustratively, couplers 578 are screws which may be tightened to secure the orientation of handlebar 162 relative to upper triple clamp 530 and loosened to permit adjustment of the orientation of handlebar 162 relative to upper triple clamp 530. This permits the easy adjustment of handlebar 162 without having to remove steering support assembly 512.

As shown in FIGS. 31 and 32, the size of handlebar riser 570 is different than handlebar riser 560. This is to take into account the ergonomics for each of vehicle 10 and vehicle 20. In one embodiment, handlebar risers 560 and 570 result in left grip 163 and right grip 165 being in generally the same location for vehicles 10 and 20.

As mentioned herein vehicle 100 has two configurations, a non-fairing configuration 10 and a fairing configuration 20. For vehicle 10, a first steering support assembly 510 is provided. For vehicle 20, a second steering support assembly 512 is provided. The components of steering support assembly 510 and steering support assembly 512 are both supported by one or both of upper triple clamp 530 and lower triple clamp 532.

Figure 36:
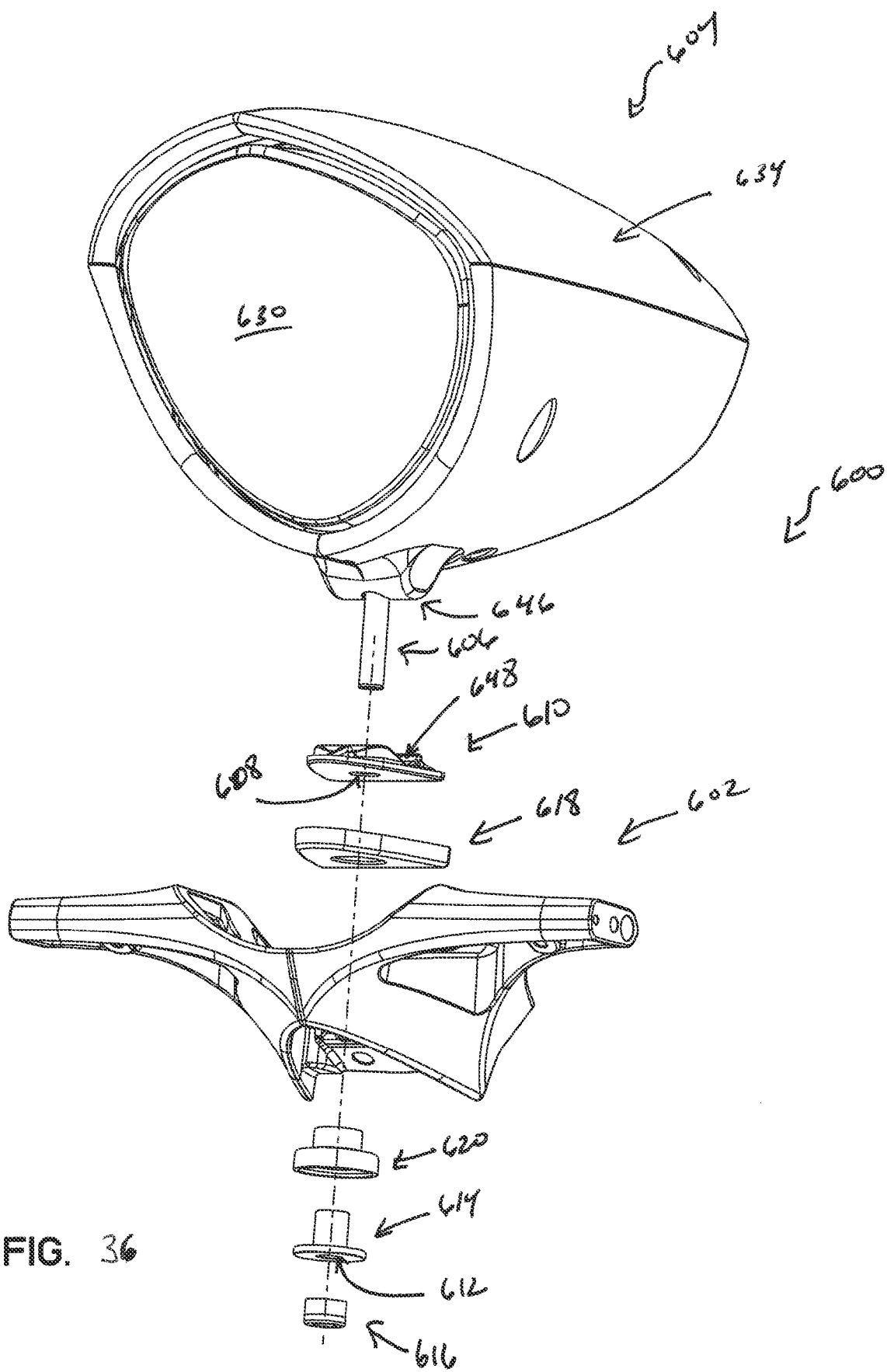
FIG. 36 illustrates an exploded view of portions of a lighting assembly of the two-wheeled vehicle of FIG. 1.
Figure 37:
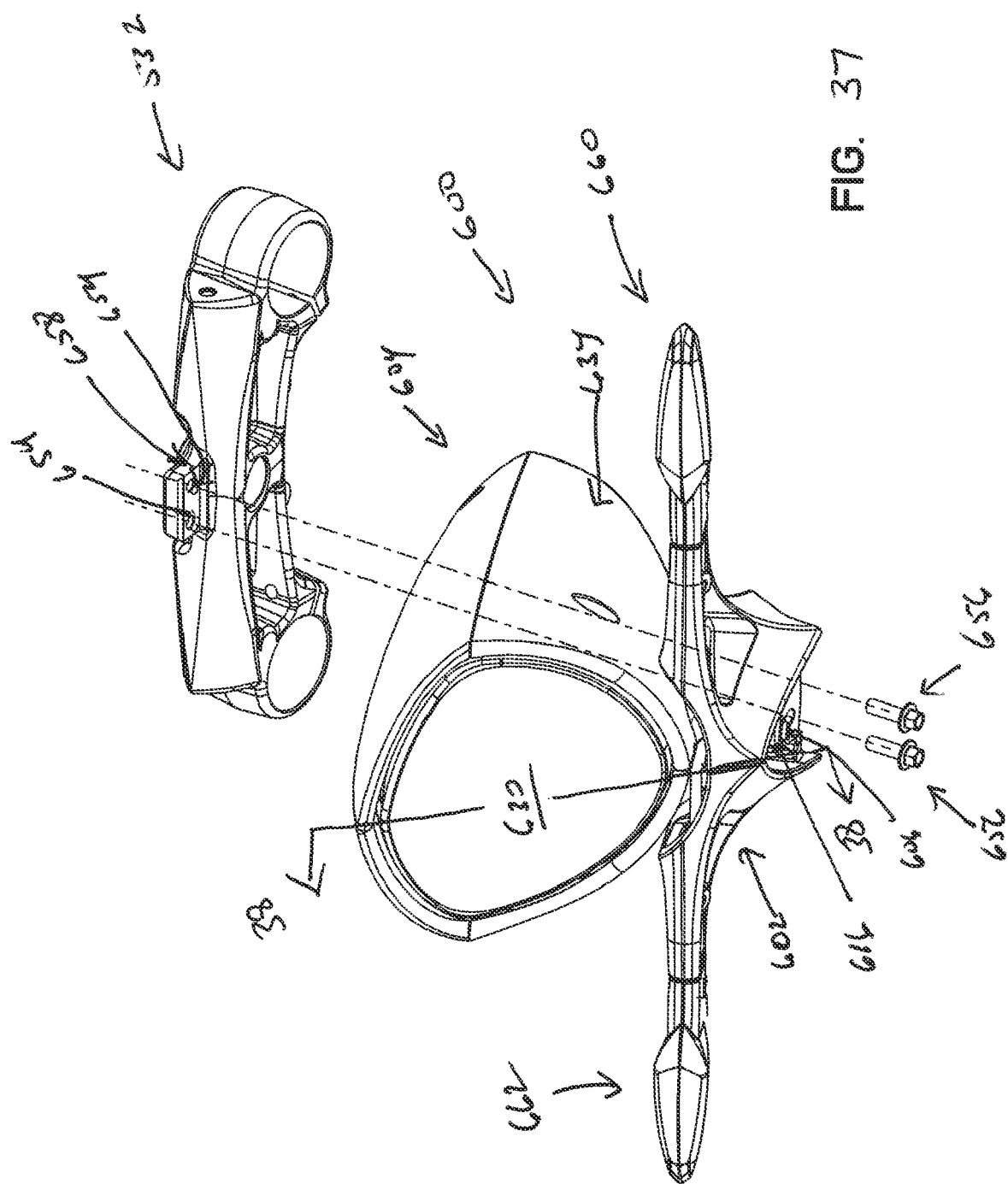
FIG. 37 illustrates the assembly of the lighting assembly of FIG. 36 to a lower triple clamp of the two-wheeled vehicle of FIG. 1.

Referring to FIGS. 36-40, the components of steering support assembly 510 are shown. Referring to FIG. 36, components of a light assembly 600 are shown. A support 602 is provided which is coupled to lower triple clamp 532 as shown in FIG. 37. A headlight bucket 604 is shown which is coupled to support 602. A threaded stud 606 which extends down from headlight bucket 604 passes through an opening 608 in an alignment support 610, an opening 611 (see FIG. 38) in support 602, and an opening 612 in a spacer 614. A threaded nut 616 is coupled to threaded stud 606.

Headlight bucket 604 is isolated from support 602 through rubber isolator 618 and rubber isolator 620. Rubber isolators 618 and 620 are positioned so that there is no metal to metal contact between support 602 and headlight bucket 604. This reduces the transfer of vibrations from support 602 to headlight bucket 604.

Figure 38:
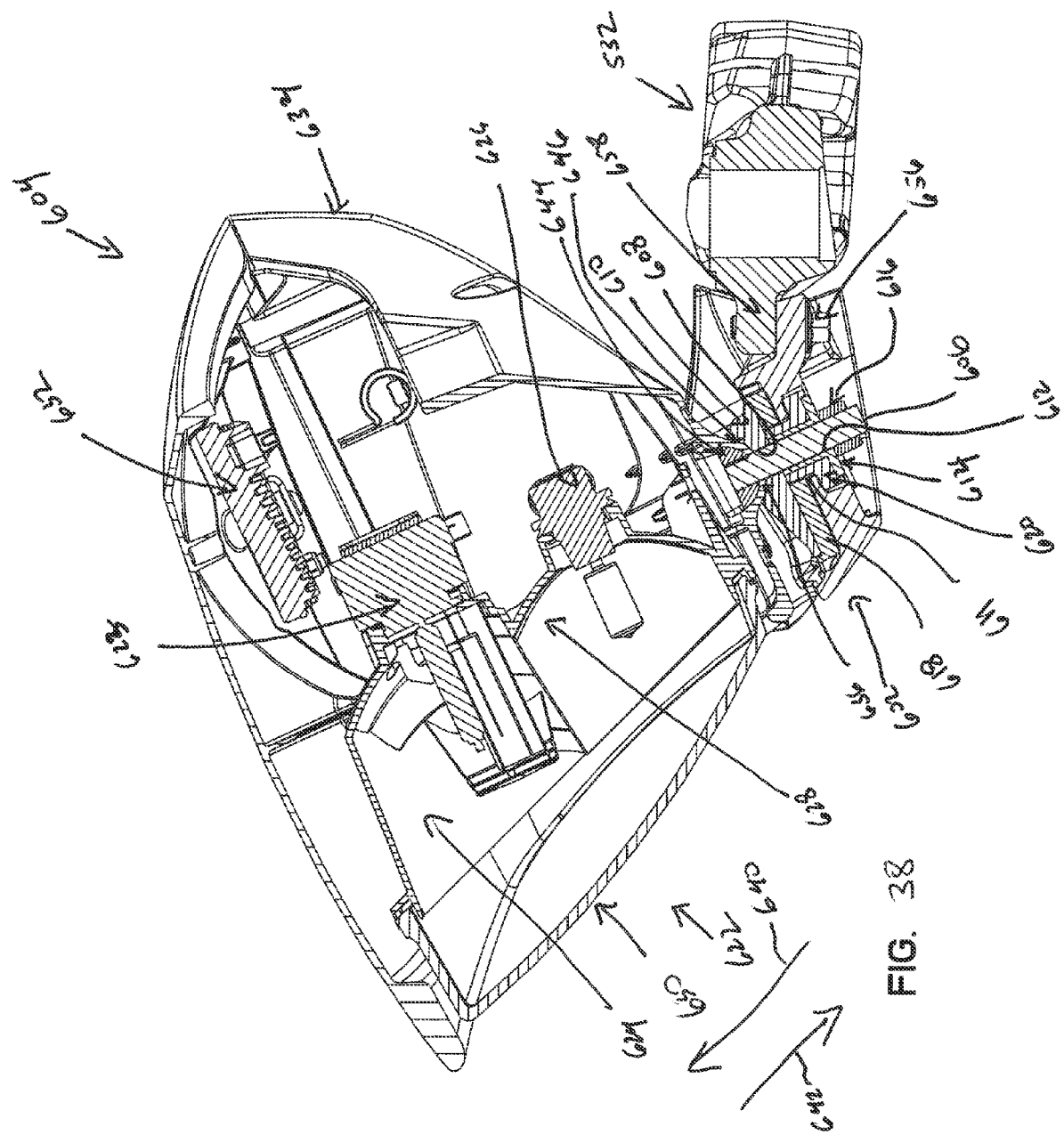
FIG. 38 illustrates a sectional view of the lighting assembly of FIG. 36 along lines 38-38 in FIG. 37 when the lighting unit is assembled to the lower triple clamp of the two-wheeled vehicle of FIG. 1.

Turning to FIG. 38, the components of a lighting unit 622 of headlight bucket 604 are shown. Lighting unit 622 includes a low beam bulb 623 positioned proximate a first reflector 624 and a high beam bulb 626 positioned proximate a second reflector 628. Light produced by either low beam bulb 623 or high beam bulb 626 passes through an optical window 630. In one embodiment, low beam bulb 623 is an HID bulb and high beam bulb 626 is a halogen bulb. An HID ballast 632 for low beam bulb 623 is provided within the same housing 634 of headlight bucket 604 that includes low beam bulb 623.

Lighting unit 622 may be aimed as follows. An opening 636 is provided in housing 634 through which threaded stud 606 extends. Opening 636 is oversized to permit the movement of housing 634 in direction 640 and direction 642 relative to threaded stud 606. Threaded stud 606 is threaded into a cylindrically shaped coupler 644. In one embodiment, threaded stud 606 and cylindrically shaped coupler 644 are integrally made. Coupler 644 is positioned in a cylindrical portion 646 of housing 634. In a similar fashion, alignment support 610 has a cylindrically shaped cradle 648 which receives cylindrical portion 646 of housing 634. The positioning of threaded stud 606 in opening 608 generally maintains the relative rotational position of cylindrically shaped coupler 644 and cylindrically shaped cradle 648. However, due to the larger size of opening 636, cylindrical portion 646 is rotatable in direction 640 and direction 642 relative to cylindrically shaped cradle 648 to adjust the aim of lighting unit 622.

A user may loosely tighten threaded nut 616 onto threaded stud 606 such that cylindrical portion 646 is positioned in cylindrically shaped cradle 648. The user may then grasp housing 634 to rotate housing 634 in one of direction 640 and direction 642. Once an orientation of housing 634 is selected, the user would tighten threaded nut 616 to secure the orientation of housing 634 relative to cylindrically shaped cradle 648.

As shown in FIG. 38 and illustrated in FIG. 37, light assembly 600 is coupled to lower triple clamp 532 through a pair of couplers 656. In one embodiment, couplers 656 are bolts which are threaded into openings 654 provided in a tab 658 of lower triple clamp 532. As shown in FIG. 37, support 602 also supports a left turn signal unit 660 and a right turn signal unit 662.

Figure 39:
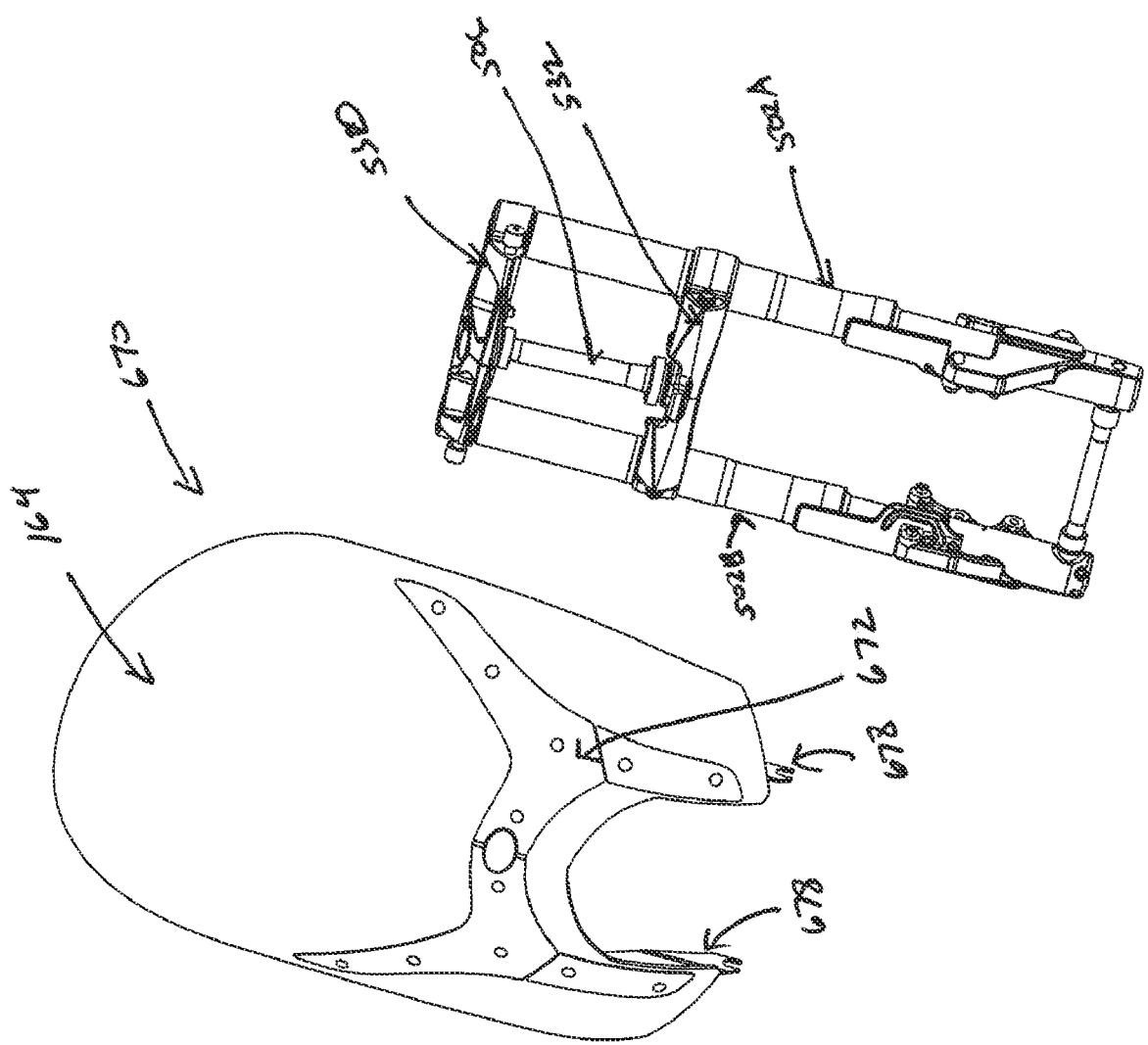
FIG. 39 illustrates a removable windshield assembly of the two-wheeled vehicle of FIG. 1.

Turning to FIG. 39, steering support assembly 510 also includes a removable windshield assembly 670. Removable windshield assembly 670 includes removable windshield 164 which is sandwiched between a front member 672 and a rear member 674. Front member 672 and rear member 674 are coupled together through a plurality of couplers 676. Exemplary couplers include carriage bolts and acorn nuts. Couplers 676 also couple rear member 674 to brackets 678 which couple removable windshield assembly 670 to upper triple clamp 530 and lower triple clamp 532.

Figure 40:
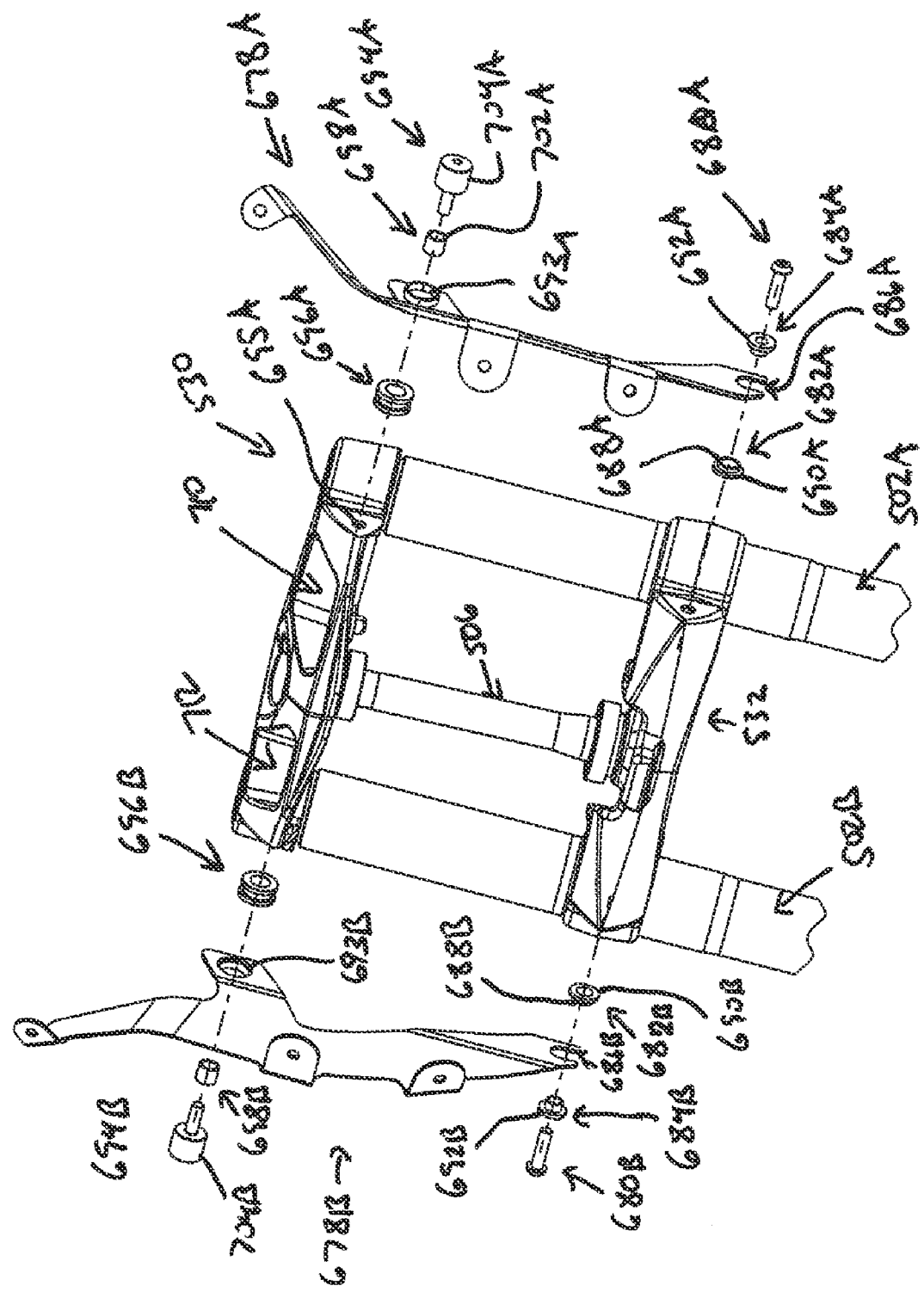
FIG. 40 illustrates the coupling of brackets of the removable windshield assembly of FIG. 39 to the upper and lower triple clamps of the two-wheeled vehicle of FIG. 1.

Referring to FIG. 40, a first coupler 680 is threaded into lower triple clamp 532. A rubber isolator 682 is carried by first coupler 680. A rigid spacer 684 is positioned between first coupler 680 and rubber isolator 682. Exemplary rigid spacers may be made of metal, plastic, or other types of materials. An open-ended slot 686 of bracket 678 may be positioned over a reduced diameter portion 688 of rubber isolator 682 and is captured laterally between portion 690 of rubber isolator 682 and portion 692 of rigid spacer 684.

A second coupler 694 is threaded into upper triple clamp 530. In one embodiment, second couplers 694 are thumb screws with a knurled surface 704. A rubber isolator 696 is carried by second coupler 694. A rigid spacer 698 is positioned between second coupler 694 and rubber isolator 696. Exemplary rigid spacers may be made of metal, plastic, or other types of materials. Rigid spacer 698 abuts surface 700 of upper triple clamp 530 and provides a stop surface 702 to prevent over-tightening of second coupler 694.

As shown in FIG. 40, the mounting of removable windshield assembly 670 is directly to upper triple clamp 530 and lower triple clamp 532. Further, removable windshield assembly 670 may be removed without leaving any brackets behind. As such, if an operator wants to ride vehicle 10 without removable windshield assembly 670, vehicle 10 still provides a clean, attractive look. When removable windshield assembly 670 is coupled to upper triple clamp 530 and lower triple clamp 532, rubber isolator 682 and rubber isolator 696 serve to limit the amount of vibration transferred to removable windshield 164. This in turn reduces the amount of vibration sound that is experienced by the operator. In one embodiment, brackets 678 mount directly to upper triple clamp 530 and lower triple clamp 532 without rubber isolator 682 and rubber isolator 696. Further, rigid spacer 684 may also be removed.

In one embodiment, removable windshield assembly 670 is mounted to upper triple clamp 530 and lower triple clamp 532 as follows. The arrangement of rubber isolator 682, rigid spacer 684, and first coupler 680 are coupled to lower triple clamp 532. Open-ended slot 686 of bracket 678 is positioned so that portion 688 is received in open-ended slot 686. It should be noted that removable windshield assembly 670 may be rotated forward from its final position during these steps to ease alignment of open-ended slot 686 relative to portion 688. Removable windshield assembly 670 is positioned so that opening 693 of bracket 678 is aligned with the respective openings 695 in upper triple clamp 530. The arrangement of rubber isolator 696, rigid spacer 698, and second coupler 694 are coupled to upper triple clamp 530. Removable windshield assembly 670 may be removed by reversing the above-described steps.

Referring to FIG. 40, upper triple clamp 530 also includes ports 710 and 712. Ports 710 and 712 extend from a top side of upper triple clamp 530 to a bottom side of upper triple clamp 530 and serve as a retainer for wires of one or more wire harnesses which couple the components of either steering support assembly 510 or steering support assembly 512 to the remainder of the electrical system of vehicle 10 and vehicle 20, respectively.

Figure 41:
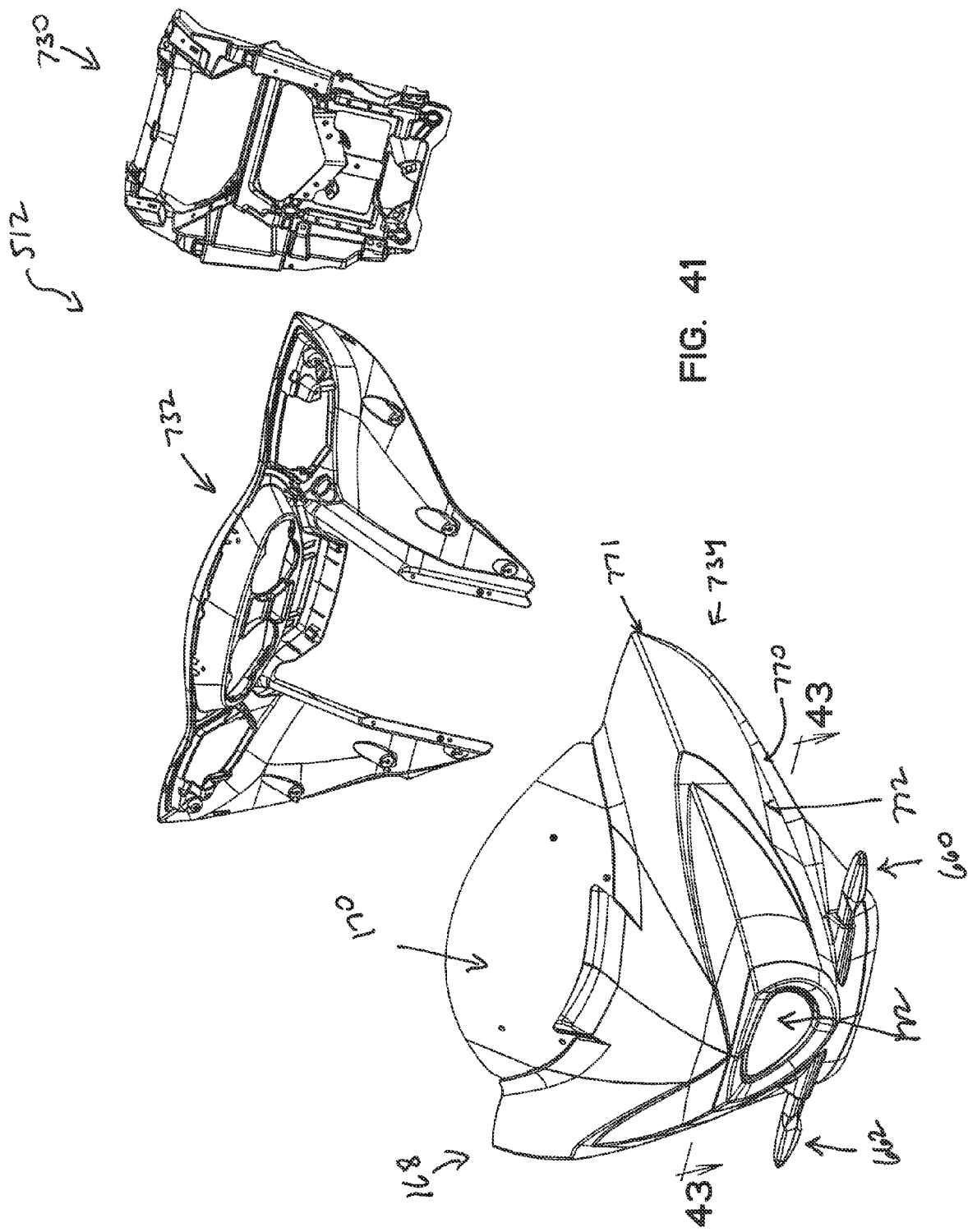
FIG. 41 illustrates portions of a fairing assembly of the two-wheeled vehicle of FIG. 10.
Figure 42:
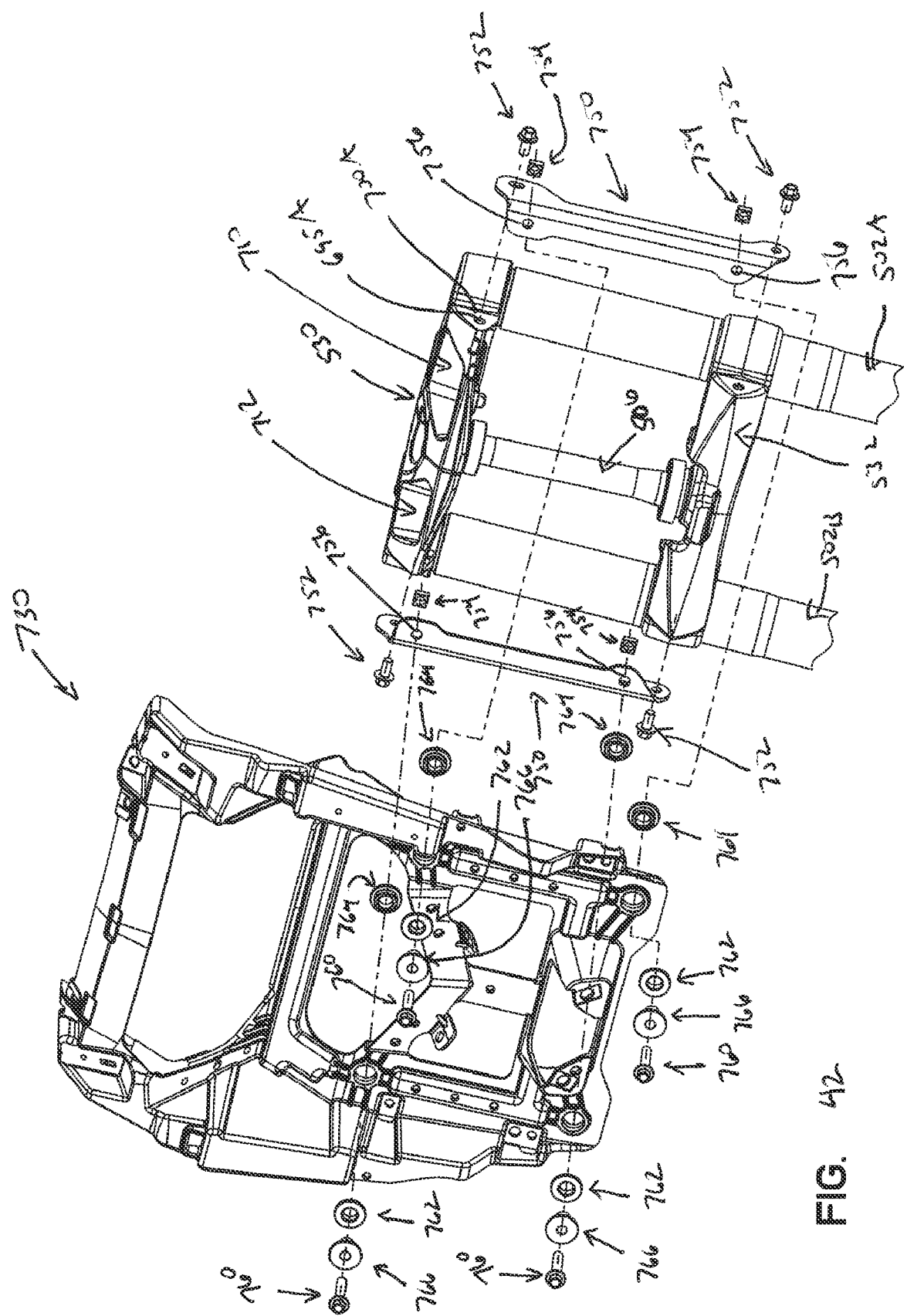
FIG. 42 illustrates the coupling of a support member of the fairing assembly of FIG. 41 to the upper and lower triple clamps of the two-wheeled vehicle of FIG. 10.

Referring to FIGS. 41-43, the components of steering support assembly 512 are shown. Referring to FIG. 41, the base components of a front fairing assembly 168 are shown. A support 730 is provided which is coupled to upper triple clamp 530 and lower triple clamp 532. An operator side body panel 732 and a front side body panel 734 are also provided. Both of operator side body panel 732 and front side body panel 734 are supported by support 730 and are coupled together. In one embodiment, support 730 is a metal casting and operator side body panel 732 and front side body panel 734 are plastic and include one or more molded portions.

Operator side body panel 732 and front side body panel 734 support various components including windshield 170, front light assembly 172, left turn signal unit 660, right turn signal unit 662, an instrument cluster 740 (see FIG. 18), a pair of speakers 742 (see FIG. 18), a radio unit 744 (see FIG. 18), and other suitable devices. An exemplary instrument cluster 740 is described in U.S. patent application Ser. No. 12/015,435, filed Jan. 16, 2008, the disclosure of which is expressly incorporated by reference herein.

Referring to FIG. 42, support 730 is shown. Support 730 is coupled to upper triple clamp 530 and 532. Brackets 750 are coupled to upper triple clamp 530 and lower triple clamp 532 through a plurality of couplers 752. Threaded couplers 754 are aligned with openings 756 in brackets 750 and are welded to brackets 750. Couplers 760 threadably engage couplers 754 and couple support 730 to brackets 750. Couplers 760 carry a first rubber isolator 762, a second rubber isolator 764, and a rigid spacer 766. First rubber isolator 762 and second rubber isolator 764 are positioned on opposite sides of support 730 and isolate support 730 from upper triple clamp 530 and lower triple clamp 532 to reduce the amount of vibration transferred to support 730 and front fairing assembly 168 in general. Rigid spacer 766 is hat-shaped and carries first rubber isolator 762 and second rubber isolator 764.

Returning to FIG. 41, a portion 770 of front side body panel 734 is flared relative to the general contour 772 of front side body panel 734. Referring to FIG. 43, portion 770 makes an angle 774 with a construction line 776 that is parallel with centerline plane 116. In one embodiment, the value of angle 774 is about 40 degrees. In one embodiment, the value of angle 774 is from about 20 degrees to about 50 degrees. By having portion 770 flared, rain that collects on front fairing assembly 168 during rides is generally directed in direction 778. This assists in helping the operator to remain drier. As shown in FIG. 41, portion 770 continues along the edge of fairing 168 to a location 771 which is above the hands of the operator (see FIG. 12) and outboard of the hands of the operator (see FIG. 14).

Referring to FIGS. 44 and 45, in one embodiment, two-wheeled vehicle 100 includes a steering lock 780 built into upper triple clamp 530. Steering lock 780 includes a base member 782 which is coupled to upper triple clamp 530 through couplers 784. A lock core 786 of steering lock 780 is accessible through an opening 788 of upper triple clamp 530. Lock core 786 includes a receptacle 790 for a key 792. When the correct key 792 is inserted into receptacle 790, steering lock 780 may be placed in one of a locked configuration and an unlocked configuration. In the unlocked configuration, a lock member 794, illustratively a peg, is retracted into base member 782. In a locked configuration, lock member 794 is biased to extend from base member 782.

Referring to FIG. 45, when wheel 110 is in line with wheel 112 (front wheel 110 is parallel with centerline plane 116) peg 794 is positioned over top surface 796. If wheel 110 is turned to the right, lock member 794 may be extended beyond top surface 796, such that an attempted rotation of wheel 110 back in line with wheel 112 is prevented by the contact of lock member 794 with a first lock surface 798. In a similar manner, if wheel 110 is turned to the left, lock member 794 may be extended beyond top surface 796, such that an attempted rotation of wheel 110 back in line with wheel 112 is prevented by the contact of lock member 794 with a second lock surface 797. In one embodiment, lock member 794 is spring biased such that steering lock 780 may be placed in the locked configuration while lock member 794 is contacting surface 796 and then locked due to the biasing of lock member 794 to extend when wheel 110 is sufficiently rotated to either the left or the right. In one embodiment, lock member 794 may only be placed in the locked configuration when lock member 794 is not positioned above top surface 796; thus requiring the proper rotation of wheel 110 to the left or right first.

Referring to FIGS. 9 and 18, lock core 786 is accessible from the operator position for both vehicle 10 and vehicle 20, respectively.

Figure 46:
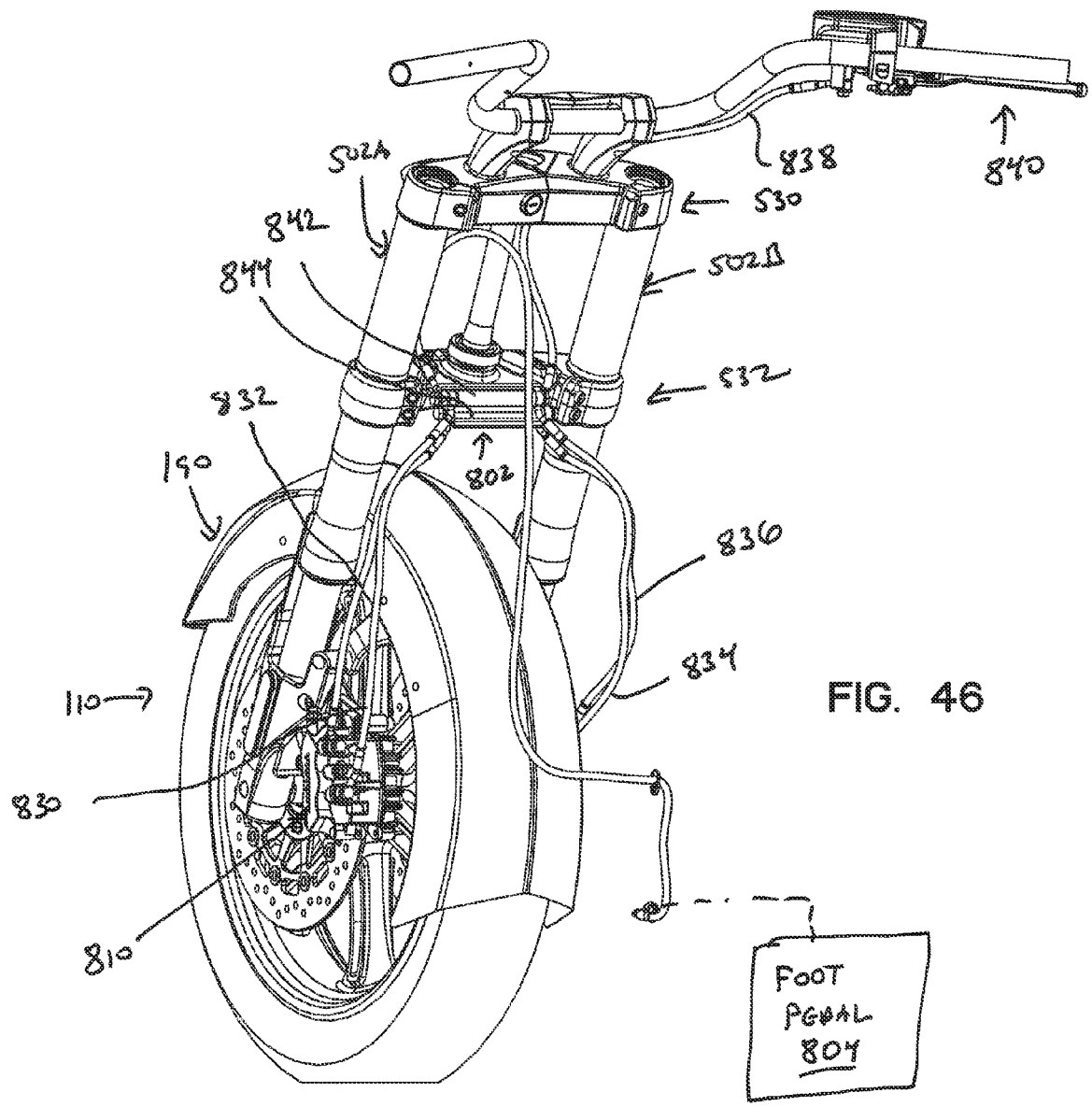
FIG. 46 illustrates the mounting of a brake manifold to a rear side of the lower triple clamps.
Figure 47:
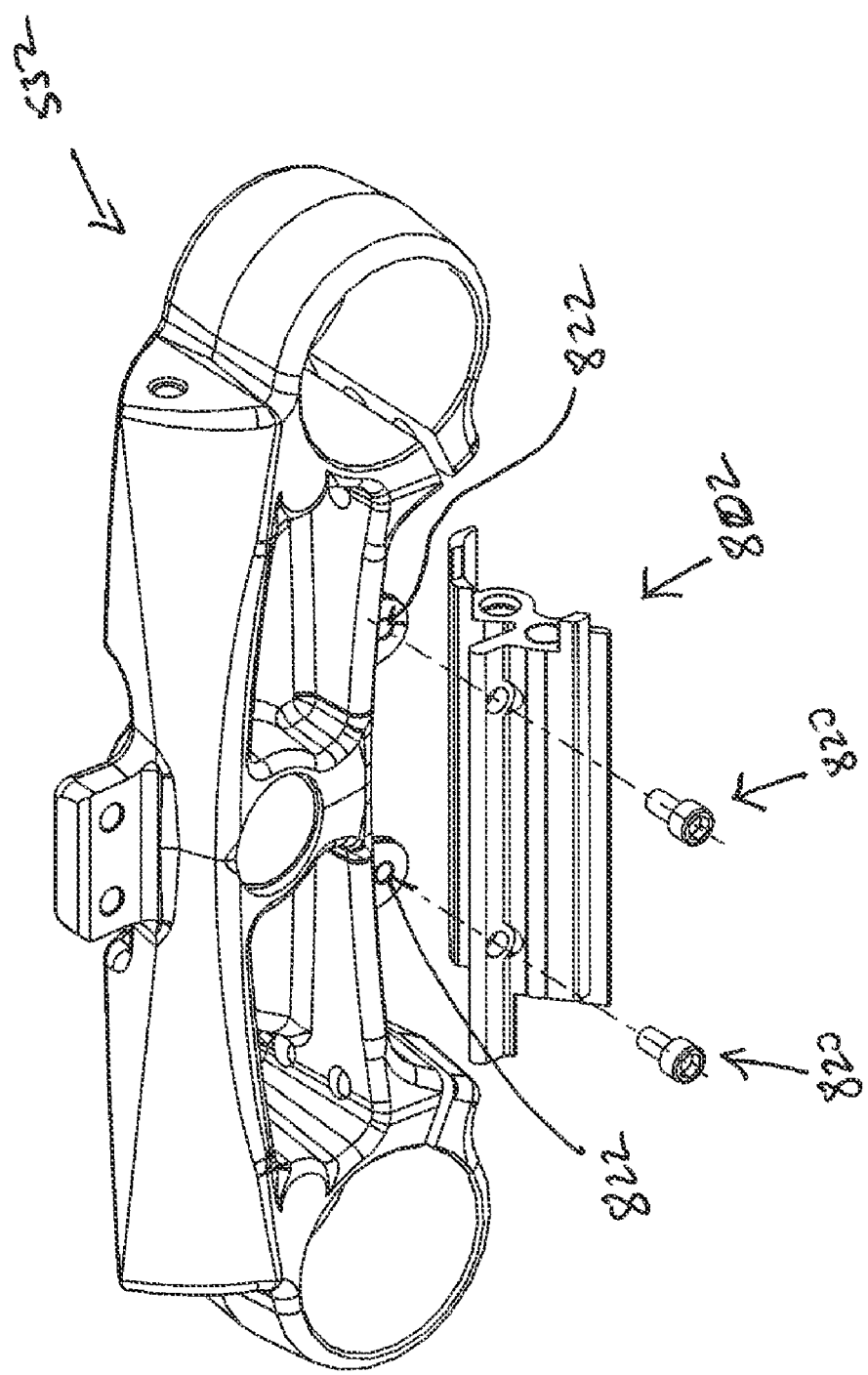
FIG. 47 illustrates an exploded view of the brake manifold and the lower triple clamp.

Referring to FIGS. 46 and 47, in one embodiment, two-wheeled vehicle 100 includes a linked brake system 800 which includes a manifold 802 coupled to lower triple clamp 532. In linked brake system 800, a foot pedal brake input 804 is coupled to manifold 802 so that actuation of foot pedal brake input 804 not only actuates the rear brakes 808 (see FIG. 6) which are not coupled to manifold 802 but also front brakes 810 through the connection with manifold 802. The right side portion of front brakes 810 is shown in FIG. 4. Thus, an actuation of foot pedal brake input 804 applies braking force to both rear brakes 808 and front brakes 810.

As shown in FIG. 47, manifold 802 is coupled to a rear side of lower triple clamp 532 with couplers which thread into openings 822. As such, all of the lines from front brakes 810 to manifold 802 remain generally static as the relative placement of manifold 802 and front brakes 810 does not change.

Referring to FIG. 46, manifold 802 has four brake lines which are connected to the front brake calipers 810. Brake lines 830 and 832 connect to the left front brake calipers 810 and brake lines 834 and 836 connect to the right front brake calipers 810. A brake line 837 connects manifold 802 to foot brake pedal 804. A brake line 838 connects manifold 802 to a hand brake input 840. Brake lines 830 and 834 communicate fluid to the respective brake calipers 810 to actuate a center piston in the respective brake calipers 810 while brake lines 832 and 836 communicate fluid to the respective brake calipers 810 to actuate front and rear pistons in the respective brake units 810. Brake lines 830 and 834 are in fluid communication with brake line 837 through an upper fluid channel 842 in manifold 802. As such, the center pistons of each brake unit 810 are responsive to an input from foot brake pedal 804. Brake lines 832 and 836 are in fluid communication with brake line 838 through a lower fluid channel 844 in manifold 802. As such, the front and rear pistons of each brake unit 810 are responsive to an input from hand brake pedal 840.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A two-wheeled vehicle, comprising:
a front wheel rotatable about a first axis;
a rear wheel generally positioned in line with the front wheel along a longitudinal plane of the two-wheeled vehicle;
a frame supported by the front wheel and the rear wheel;
a prime mover coupled to the frame and operably coupled to the rear wheel to power the rear wheel;
a straddle seat supported by the frame, the straddle seat having a support surface;
a steering system rotatably coupled to the frame and coupled to the front wheel; and
a pair of highway bars, each of the highway bars having a first, non-cylindrical, solid cross-section at a first height defined by an intersection with one of a first horizontal plane passing through the first axis, a second horizontal plane passing through a top of the front wheel, and a third horizontal plane located halfway between the first horizontal plane and the second horizontal plane, each of the highway bars being coupled to the frame and positioned rearward of a vertical plane passing through the first axis of the front wheel and forward of the rear wheel.

2. The two-wheeled vehicle of claim 1, wherein each of the highway bars includes a second solid cross-section at a second height defined by another one of the first horizontal plane, the second horizontal plane, and the third horizontal plane.

3. The two-wheeled vehicle of claim 2, wherein each of the highway bars includes a third solid cross-section at a third height defined by the last of the first horizontal plane, the second horizontal plane, and the third horizontal plane.

4. The two-wheeled vehicle of claim 2, wherein each of the highway bars has a concave cross-section corresponding to at least one of the first solid cross-section and the second solid cross-section.

5. The two-wheeled vehicle of claim 1, wherein each of the highway bars is solid between a pair of the first horizontal plane, the second horizontal plane, and the third horizontal plane.

6. The two-wheeled vehicle of claim 1, wherein the pair of highway bars include a first highway bar positioned on a first side of the longitudinal plane and extending laterally from the frame and a second highway bar positioned on a second side of the longitudinal plane and extending laterally from the frame, the first highway bar being coupled to the frame at a first location and the second highway bar being coupled to the frame at a second location, the second location being spaced apart from the first location.

7. The two-wheeled vehicle of claim 6, wherein the first highway bar and the second highway bar are angled towards the front wheel of the two-wheeled vehicle.

8. The two-wheeled vehicle of claim 6, wherein the first highway bar and the second highway bar are each forged.

9. The two-wheeled vehicle of claim 8, wherein the first highway bar includes a first forged component coupled to the frame and a second forged component coupled to the first forged component.

10. The two-wheeled vehicle of claim 6, further comprising a first removable cover coupled to the first highway bar and a second removable cover coupled to the second highway bar.

11. The two-wheeled vehicle of claim 1, wherein each highway bar includes a upper portion, a lower portion, and an intermediate portion, the upper portion being coupled to the frame at a first location, the lower portion being coupled to the frame at a second location, the intermediate portion extending forward of the first location and the second location.

12. A two-wheeled vehicle, comprising:
a front wheel rotatable about a first axis;
a rear wheel generally positioned in line with the front wheel along a longitudinal plane of the two-wheeled vehicle;
a frame supported by the front wheel and the rear wheel;
a prime mover coupled to the frame and operably coupled to the rear wheel to power the rear wheel;
a straddle seat supported by the frame, the straddle seat having a support surface;
a steering system rotatably coupled to the frame and coupled to the front wheel;
a first highway bar coupled to the frame, positioned rearward of a vertical plane passing through the first axis of the front wheel and forward of the rear wheel, positioned on a first side of the longitudinal plane and extending from the frame in a first direction away from the longitudinal plane;
a second highway bar coupled to the frame, positioned rearward of a vertical plane passing through the first axis of the front wheel and forward of the rear wheel, positioned on a second side of the longitudinal plane and extending from the frame in a second direction away from the longitudinal plane;
a first removable cover removably coupled to the first highway bar; and
a first accessory mounted to the first highway bar, the first accessory being operatively coupled to an operator input of the vehicle through at least a first wire, the first wire being at least partially covered by the first removable cover.

13. The two-wheeled vehicle of claim 12, further comprising a second removable cover removably coupled to the second highway bar and a second accessory mounted to the second highway bar, the second accessory being operatively coupled to the operator input of the vehicle through at least a second wire, the second wire being at least partially covered by the second removable cover.

14. The two-wheeled vehicle of claim 12, wherein the first wire is located between the first highway bar and the first removable cover in a channel provided in one of the first highway bar and the first removable cover.

15. The two-wheeled vehicle of claim 12, wherein the first removable cover is made of a polymeric material.

16. A two-wheeled vehicle, comprising:
a front wheel rotatable about a first axis;

a rear wheel generally positioned in line with the front wheel along a longitudinal plane of the two-wheeled vehicle;

a frame supported by the front wheel and the rear wheel;

a prime mover coupled to the frame and operably coupled to the rear wheel to power the rear wheel;

a straddle seat supported by the frame, the straddle seat having a support surface;

a steering system rotatably coupled to the frame and coupled to the front wheel;

a pair of accessories supported by the front wheel and the rear wheel; and a pair of highway bars coupled to the frame and positioned rearward of a vertical plane passing through the first axis of the front wheel and forward of the rear wheel, wherein a first accessory of the pair of accessories is a foot peg mounted to a left side highway bar of the pair of highway bars at a location which is completely not visible from a left side view of the two-wheeled vehicle, the left side view being from a direction perpendicular to the longitudinal plane of the two-wheeled vehicle.

17. The two-wheeled vehicle of claim 16, wherein the first accessory includes a bracket, the bracket being mounted to the left side highway bar at the location which is completely not visible from the left side view of the two-wheeled vehicle, wherein the first accessory is coupled to the bracket.

18. The two-wheeled vehicle of claim 16, wherein the foot peg is moveable between a stored position and a use position, wherein in the use position the foot peg extends laterally outward from the left highway bar.

19. The two-wheeled vehicle of claim 16, wherein the bracket is mounted to the left side highway bar in a first orientation to position the foot peg at a first height and is mounted to the left side highway bar in a second orientation to position the foot peg at a second height, the second height being different from the first height.

* * * * *